(12) United States Patent
Ito et al.

(10) Patent No.: US 7,473,446 B2
(45) Date of Patent: Jan. 6, 2009

(54) RETARDER AND CIRCULAR POLARIZER

(75) Inventors: Tadashi Ito, Minami-ashigara (JP); Hiroshi Takeuchi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 485 days.

(21) Appl. No.: 10/522,558

(22) PCT Filed: Aug. 1, 2003

(86) PCT No.: PCT/JP03/09804

§ 371 (c)(1),
(2), (4) Date: Oct. 11, 2005

(87) PCT Pub. No.: WO2004/015464

PCT Pub. Date: Feb. 19, 2004

(65) Prior Publication Data

US 2006/0083867 A1    Apr. 20, 2006

(30) Foreign Application Priority Data

Aug. 7, 2002 (JP) .............................. 2002-229922

(51) Int. Cl.
C09K 19/00 (2006.01)
C09K 19/52 (2006.01)
(52) U.S. Cl. ...................... 428/1.1; 428/1.2; 428/1.3; 430/20; 252/299.1
(58) Field of Classification Search .................. 430/20, 430/270.1; 428/1.1; 252/299.1
See application file for complete search history.

(56) References Cited

U.S. PATENT DOCUMENTS 5,622,648 A    4/1997   Parri et al.
6,400,433 B1   6/2002   Arakawa et al.
6,824,838 B2 * 11/2004   Kawata et al. ............. 428/1.31

FOREIGN PATENT DOCUMENTS

| EP | 0 928 984 | 7/1999 |
|---|---|---|
| EP | 1 170 353 | 1/2002 |
| GB | 2 329 899 | 4/1999 |
| GB | 2 330 360 | 4/1999 |
| JP | 2000 206331 | 7/2000 |
| JP | 2001 004837 | 1/2001 |
| WO | 95/22586 | 8/1995 |
| WO | 97/00600 | 1/1997 |
| WO | 98/00475 | 1/1998 |
| WO | 98/52905 | 11/1998 |
| WO | 99/64924 | 12/1999 |

* cited by examiner

Primary Examiner—Geraldina Visconti
(74) Attorney, Agent, or Firm—Buchanan Ingersoll & Rooney PC

(57) ABSTRACT

A retarder comprising a substrate, a first optically anisotropic layer formed of a composition comprising a rod-like liquid-crystal compound substantially generating a phase difference of π at 550 nm, and a second optically anisotropic layer formed of a composition comprising a rod-like liquid-crystal compound substantially generating a phase difference of π/2 at 550 nm is disclosed. At least either one of the rod-like liquid-crystal compounds is denoted by Formula (I) $Q^1$-$L^1$-$A^1$-$L^3$-M-$L^4$-$A^2$-$L^2$-$Q^2$: where $Q^1$ and $Q^2$ denote polymerizable groups; $L^1$ to $L^4$ denote single bonds or divalent linking groups provided that at least either of $L^3$ and $L^4$ represents —O—CO—O—; $A^1$ and $A^2$ denote C2-20 spacer groups and M denotes a mesogen group; and an in-plane slow axis of the second layer and an in-plane slow axis of the first layer cross substantially at 60 degrees.

14 Claims, 11 Drawing Sheets

RETARDER AND CIRCULAR POLARIZER

FIELD OF THE INVENTION

The present invention relates to a retarder useful as a quarter wave plate used for reflective-type liquid-crystal display devices, write pickups for optical disks, or anti-reflective films. In particular, the present invention relates to a retarder comprising two optically anisotropic layers which can be respectively prepared by applying a composition comprising a rod-like liquid-crystal compound on or above a surface of a substrate, and a circular polarizer which can be prepared by lamination of the retarder and a linear polarizing film in a roll-to-roll manner.

RELATED ART

Quarter wave plates can be used for various purposes and have already been practically used. However, most of quarter wave plates achieve λ/4 only at a specific wavelength though they are called quarter wave plates. JPA No. 1998-68816 and JPA No. 1998-90521 (the term "JPA" as used herein means an "unexamined published Japanese patent application") disclose retarders obtained by laminating two optically anisotropic polymer films. In the retarder described in JPA No. 1998-68816, a quarter-wave plate generating a quarter wavelength phase difference and a half-wave plate generating a half wavelength phase difference are laminated so that their optic axes are crossed. In the retarder described in JPA No. 1998-90521, at least two retarders having a retardation value of 160-320 nm are laminated at an angle such that their slow axes are neither parallel nor orthogonal to each other. The retarders described in both documents specifically having laminate structures of two polymer films. Both documents explain that λ/4 can be achieved in a wide wavelength region by such retarders. However, the preparation processes of the retarders described in JPA No. 1998-68816 and JPA No. 1998-90521 require cutting two polymer films at a predetermined angle and laminating the resulting chips in order to control the optical directions (optic axes or slow axes) of the two polymer films. Such processes including laminating the resulting chips are complex and have other disadvantages such as liability to quality failure due to misalignment, decrease in yield, increase in cost and liability to deterioration due to contamination. Moreover, it is difficult to strictly adjust the retardation value of polymer films to a desired value.

On the other hand, a broadband quarter wave plate comprising at least two optically anisotropic layers respectively formed of a liquid-crystal compound are disclosed in JPA No. 2001-4837, JPA No. 2001-21720 and JPA No. 2000-206331. Especially, the technique disclosed in JPA No. 2001-4837, in which the same liquid-crystal compounds can be used in the optically anisotropic layers, is also attractive in terms of production costs. Quarter wave plate is generally integrated with a linear polarizer film and incorporated into reflective-type, liquid-crystal display devices as a component of a circular polarizer, so that productivity of the circular polarizer plate may remarkably be improved if the circular polarizer can be prepared in such a way that the quarter wave plate as described in the aforementioned Publications or the like, which is prepared by applying a liquid-crystal compound to a surface of a long substrate, is laminated with a long polarizer film in a roll-to-roll manner to thereby continuously produce a rolled-long circular polarizer plate.

Investigations by the present inventors, however, revealed that layers formed of aligned rod-like molecules of the conventional liquid-crystal compounds tend to have defects or to lower in-plane accuracy of the liquid-crystal orientation as the bandwidth of a retarder becomes to be wider. It was also found that the optical axis of one of the liquid-crystal molecular layer disclosed in the JPA No. 2001-4837 required an alignment layer rubbed at an angle of as large as 75 degrees relative to the longitudinal direction of the substrate, and this was likely to lower accuracy in the liquid-crystal orientation. Extensive studies on the causes of these problems by the present inventors revealed that the former problem was ascribable to a low solubility of the rod-like liquid-crystal compound, and the latter was ascribable to that the rubbing of the alignment layer at an angle of 75 degrees could not produce a sufficient restrictive force on the orientation of liquid-crystal molecules. Additionally we found that for obtaining half wave plates or quarter wave plates, rod-like molecules of the liquid-crystal compounds employed in them are required to be aligned homogeneously with a high degree of accuracy, however, the rod-like liquid-crystal molecules tend to be tilted in various directions at an area near to an air-interface. And such tendency is a factor of the later problem.

SUMMARY OF THE INVENTION

One object of the present invention is to provide a retarder and a circular polarizer capable of functioning in a broad band, that is, in the visible light wave length region, of contributing to thinning and of contributing to reduction of planar defects occurring as a side effect with widening bandwidth. Other object of the present invention is to provide a circular polarizer readily producible by roll-to-roll laminating of the retarder with a polarizer film. Other object of the present invention is to provide a circular polarizer contributing to improvement in image quality of the displayed images when applied to any image display devices.

In one aspect, the present invention provides a retarder comprising:

a substrate, and on or above the substrate a first optically anisotropic layer formed of a composition comprising a rod-like liquid-crystal compound, in which the rod-like molecules are aligned homogeneously, and substantially generating a phase difference of π at 550 nm, and a second optically anisotropic layer formed of a composition comprising a rod-like liquid-crystal compound, in which the rod-like molecules are aligned homogeneously, and substantially generating a phase difference of π/2 at 550 nm;

wherein at least one of the rod-like liquid-crystal compounds is denoted by Formula (I) below;

$$Q^1\text{-}L^1\text{-}A^1\text{-}L^3\text{-}M\text{-}L^4\text{-}A^2\text{-}L^2\text{-}Q^2 \qquad \text{Formula (I)}$$

where, $Q^1$ and $Q^2$ respectively denote a polymerizable group; $L^1$, $L^2$, $L^3$ and $L^4$ respectively denote a single bond or a divalent linking group provided that at least either of $L^3$ and $L^4$ represents —O—CO—O—; $A^1$ and $A^2$ respectively denote C2-20 spacer group, and M denotes a mesogen group; and an in-plane slow axis of the second optically anisotropic layer and an in-plane slow axis of the first optically anisotropic layer cross substantially at 60 degrees.

As embodiments of the present invention, there are provided the retarder wherein M in the Formula (I) is a group denoted by —(—$W^1$-$L^5$)$_n$-$W^2$—, where $W^1$ and $W^2$ respectively denote a divalent alicyclic group, divalent aromatic group or divalent heterocyclic group; $L^5$ denotes a single bond or a linking group; and n is 1, 2 or 3; the retarder wherein the substrate has a longitudinal direction, the in-plane slow axis of the first optically anisotropic layer and the longitudinal direction of the transparent substrate cross substantially at +30 degrees; and the in-plane slow axis of the second optically anisotropic layer and the longitudinal direction of the transparent substrate cross substantially at −30 degrees; the retarder wherein a rubbing axis for predetermining an orientation angle of the rod-like molecules in the first optically anisotropic layer and the longitudinal direction of the transparent substrate cross substantially at 30 degrees, and a rubbing axis for predetermining an orientation angle of the rod-like molecules in the second optically anisotropic layer and the longitudinal direction of the transparent substrate cross substantially at −30 degrees; the retarder wherein a surface of the first optically anisotropic layer has the rubbing axis for predetermining an orientation angle of the rod-like molecules in the second optically anisotropic layer; and the retarder wherein at least one of the optically anisotropic layers comprises a compound denoted by Formula (V):

$$(Hb\text{-}L^2\text{-})_n B^1 \qquad \text{Formula (V)}$$

where Hb denotes a C6-40 aliphatic group or oligosiloxanoxy group having a C4-40 aliphatic group; $L^2$ represents a divalent linking group selected from the group consisting of —O—, —S—, —CO—, —NR$^5$—, —SO$_2$—, an alkylene group, alkenylene group, arylene group and any combinations thereof; $R^5$ represents a hydrogen atom or a C1-6 alkyl group; n represents an integer from 2 to 12; and $B^1$ represents an n-valent group containing at least three cyclic structures, so that the rod-like molecules in the layer are aligned homogenously with a not greater than 10 degrees tilt angle relative to a layer plane.

In another aspect, the present invention provides a circular polarizer comprising:

a linear polarizer film having a transparent axis substantially inclined at +45 degrees or −45 degrees relative to a longitudinal direction thereof, a substrate having a longitudinal direction, a first optically anisotropic layer formed of a composition comprising a rod-like liquid-crystal compound, in which the rod-like molecules are aligned homogeneously, and substantially generating a phase difference of π at 550 nm, and a second optically anisotropic layer formed of a composition comprising a rod-like liquid-crystal compound, in which the rod-like molecules are aligned homogeneously, and substantially generating a phase difference of π/2 at 550 nm;

wherein at least one of the rod-like liquid-crystal compounds is denoted by Formula (I) below;

$$Q^1\text{-}L^1\text{-}A^1\text{-}L^3\text{-}M\text{-}L^4\text{-}A^2\text{-}L^2\text{-}Q^2 \qquad \text{Formula (I)}$$

where, $Q^1$ and $Q^2$ respectively denote a polymerizable group; $L^1$, $L^2$, $L^3$ and $L^4$ respectively denote a single bond or a divalent linking group provided that at least either of $L^3$ and $L^4$ represents —O—CO—O—; $A^1$ and $A^2$ respectively denote a C2-20 spacer group, and M denotes a mesogen group;

the transparent axis of the linear polarizer film and the longitudinal direction of the substrate cross substantially at +45 degrees or −45 degrees; and an in-plane slow axis of the second optically anisotropic layer and an in-plane slow axis of the first optically anisotropic layer cross substantially at 60 degrees.

As embodiments of the present invention, there are provided the circular polarizer wherein M in the Formula (I) is a group denoted by denotes is denoted by —(—W$^1$-L$^5$)$_n$-W$^2$—, where W$^1$ and W$^2$ respectively denote a divalent alicyclic group, divalent aromatic group or divalent heterocyclic group; $L^5$ denotes a single bond or a linking group; and n is 1, 2 or 3; the circular polarizer wherein the in-plane slow axis of the first optically anisotropic layer and a longitudinal direction of the substrate cross substantially at +30 degrees and the in-plane slow axis of the second optically anisotropic layer and the longitudinal direction of the substrate cross substantially at −30 degrees; the circular polarizer wherein a rubbing axis for predetermining an orientation angle of the rod-like molecules in the first optically anisotropic layer and the longitudinal direction of the substrate cross substantially at +30 degrees; and a rubbing axis for predetermining an orientation angle of the rod-like molecules in the second optically anisotropic layer and the longitudinal direction of the substrate cross substantially at −30 degrees; the circular polarizer wherein a surface of the first optically anisotropic layer has the rubbing axis for predetermining an orientation angle of the rod-like molecules in the second optically anisotropic layer; and the retarder wherein at least one of the optically anisotropic layers comprises a compound denoted by Formula (V):

$$(Hb\text{-}L^2\text{-})_n B^1 \qquad \text{Formula (V)}$$

where Hb denotes a C6-40 aliphatic group or oligosiloxanoxy group having a C4-40 aliphatic group; $L^2$ represents a divalent linking group selected from the group consisting of —O—, —S—, —CO—, —NR$^5$—, —SO$_2$—, an alkylene group, alkenylene group, arylene group and any combinations thereof; $R^5$ represents a hydrogen atom or a C1-6 alkyl group; n represents an integer from 2 to 12; and $B^1$ represents an n-valent group containing at least three cyclic structures, so that the rod-like molecules in the layer are tilted at not greater than 10 degrees relative to a layer plane.

In the present specification, the term of "substantially" for an angle means that the angle is in the range of an exact angle ±5°. Preferably, the difference from the exact angle is less than 4°, and more preferably less than 3°. In the present specification, signs of "+" and "−" for the angle do not limit the rightward direction and leftward direction respectively, and are used for only relatively expressing angles in directions differing with each other. In the present specification, "as low axis" means a direction showing a maximum refractive index.

DETAILED DESCRIPTION OF THE INVENTION

[Optical Characteristics of Retarder]

Figure 1:
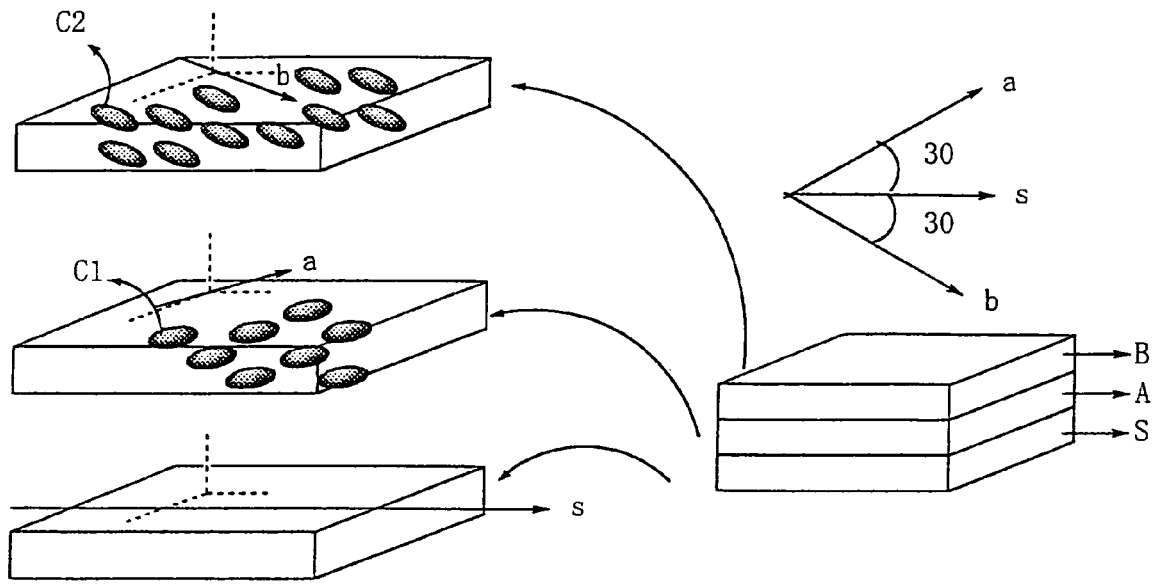
FIG. 1 is a schematic drawing of an exemplary retarder of the present invention.

The retarder of the present invention comprises a first optically anisotropic layer formed of a composition comprising a liquid-crystal compound, in which the rod-like molecules are aligned homogeneously; and a second optically anisotropic layer formed of a composition comprising a liquid-crystal compound, in which the rod-like molecules are aligned homogeneously. One of these two optically anisotropic layers may generate a phase difference of $\pi$ substantially at a specific wavelength, and the other may generate a phase difference of $\pi/2$ substantially at the wavelength. In order to obtain a $\pi$ phase difference at a wavelength ($\lambda$) through an optically anisotropic layer, it is necessary to prepare the layer so as to adjust the measured retardation of the layer to $\lambda/2$ at the $\lambda$. In order to obtain a $\pi/2$ phase difference at a wavelength ($\lambda$) through an optically anisotropic layer, it is necessary to prepare the layer so as to adjust the measured retardation of the layer to $\lambda/4$ at the $\lambda$. It is preferable that the optically anisotropic layers can generate $\pi$ and $\pi/2$ phase differences respectively at 550 nm, which is mostly the middle of visible light range. That is, the first optically anisotropic layer desirably has a retardation in the range from 240 to 290 nm, preferably from 250 to 280 nm, at 550 nm. The second optically anisotropic layer desirably has a retardation in the range from 110 to 145 nm, preferably from 120 to 140 nm, at 550 nm.

In the specification, a retardation (Re) of an anisotropic layer means an in-pale retardation when light incident along the normal line direction of the layer. Specifically, a retardation is the value defined by the following formula:

$$Re = (nx - ny) \times d$$

In the formula, nx and ny denote the in-plane major refractive indexes of the optically anisotropic layer, and d (nm) denotes the thickness of the layer.

The thickness of the first and second optically anisotropic layers can arbitrarily be determined within a range in which the individual layers can exhibit desired retardation values. In an exemplary case where the layers are prepared with an identical species of rod-like liquid-crystal compound, the thickness of the first optically anisotropic layer generating a phase difference of $\pi$ is preferably twice as thick as the thickness of the second optically anisotropic layer generating a phase difference of $\pi/2$. Although preferable ranges for the thickness of the individual optically anisotropic layers may differ depending on the rod-like liquid-crystal compounds to be used, it is preferably 0.1 to 10 micro meters in general, more preferably 0.2 to 8 micro meters, and still more preferably 0.5 to 5 micro meters. According to the present invention, the retarder is successfully thinned by forming the individual optically anisotropic layers so as to align homogeneously the liquid-crystal molecules contained therein.

It is to be noted now that the term of "homogeneous alignment" in the context of the present specification is used for not only homogeneous alignment in an absolute sense but also for any alignments inclined at a tilt angle of 10 degrees or around.

[Constitutions of Retarder and Circular Polarizer Plate]

FIG. 1 is a schematic drawing showing a representative constitution of the retarder of the present invention. As shown in FIG. 1, the basic retarder of the present invention comprises a long transparent substrate (S) and the first optically anisotropic layer (A), and further comprises the second optically anisotropic layer (B). The first optically anisotropic layer (A) generates a phase difference of $\pi$. The second optically anisotropic layer (B) generates a phase difference of $\pi/2$. The longitudinal direction of the substrate (S) and the slow axis (a) of the first optically anisotropic layer (A) cross at 30 degrees. The slow axis (b) of the second optically anisotropic layer (B) and the slow axis (a) of the first optically anisotropic layer (A) cross at an angle ($\gamma$) of 60 degrees. Both of the first and second optically anisotropic layers (A) and (B) shown in FIG. 1 respectively contain rod-like liquid-crystal molecules (c1 and c2). The rod-like liquid-crystal molecules c1 and c2 are aligned homogeneously. The longitudinal axes of the rod-like, liquid-crystal molecules (c1 and c2) correspond to the slow axes (a and b) of the optically anisotropic layers.

Figure 2:
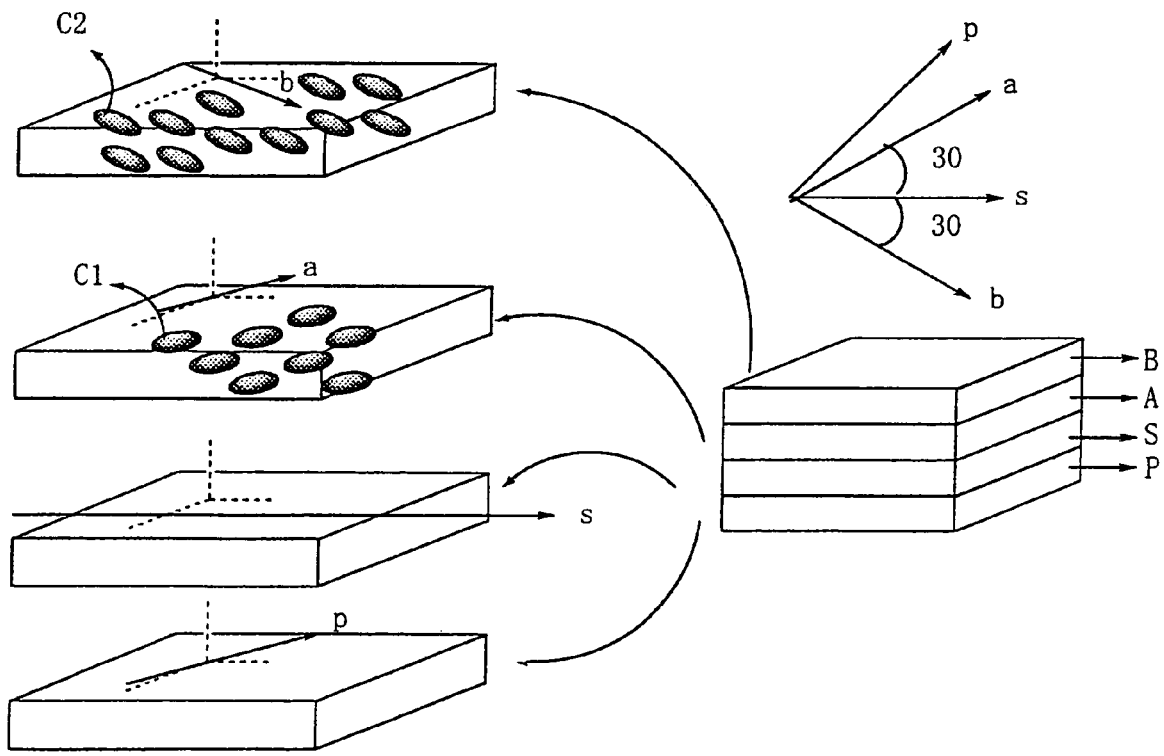
FIG. 2 is a schematic drawing of a circular polarizer plate of the present invention.

FIG. 2 is a schematic drawing showing a representative constitution of the circular polarizer of the present invention. The circular polarizer shown in FIG. 2 comprises the transparent substrate (S), the first and second optically anisotropic layers (A) and (B) as same as shown in FIG. 1, and further comprises a polarizer film (P). The polarizing transparent axis (p) of the polarizer film (P) and the longitudinal direction (s) of the transparent substrate (S) cross at 45 degrees, the polarizing transparent axis (p) and the slow axis (a) of the first optically anisotropic layer (A) cross at 15 degrees, and similar to as illustrated in FIG. 1, the slow axis (a) of the first optically anisotropic layer (A) and the slow axis (b) of the second optically anisotropic layer (B) cross at 60 degrees. Also the first optically anisotropic layer (A) and the second optically anisotropic layer (B) shown in FIG. 2 respectively contain the rod-like liquid-crystal molecules (c1 and c2). The rod-like liquid-crystal molecules (c1 and c2) are aligned homogeneously. The longitudinal axes of the rod-like liquid-crystal molecules (c1 and c2) correspond to the in-plane slow axes (a and b) of the optically anisotropic layers (A and B).

For the convenience sake, exemplary constitutions of the retarder and circular polarizer plate in which the first optically anisotropic layer (A) (phase difference=$\pi$) is disposed closer to the transparent substrate (S) and the second optically anisotropic layer (B) (phase difference=$\pi/2$) is disposed on the outer side are respectively shown in FIG. 1 and FIG. 2, it is also allowable to change the positions of the first and second optically anisotropic layers (A) and (B). A preferable constitution is, however, such as disposing the first optically anisotropic layer (A) (phase difference=$\pi$) closer to the transparent substrate (S) and the second optically anisotropic layer (B) (phase difference=$\pi/2$) on the outer side.

[Optically Anisotropic Layer]

In the retarder and circular polarizer plate of the present invention, a rod-like liquid-crystal compound denoted by the formula (I) below is used for preparing at least one of the first and second optically anisotropic layers. It is also allowable to use the rod-like liquid-crystal compound denoted by the formula (I) below for both of the optically anisotropic layers.

The rod-like liquid-crystal compounds used in the first and second optically anisotropic layers may be identical or different each other.

  Formula (I)

In the Formula (I), $Q^1$ and $Q^2$ respectively denote a polymerizable group; $L^1$, $L^2$, $L^3$ and $L^4$ respectively denote a single bond or a divalent linking group provided that at least either of $L^3$ and $L^4$ denotes —O—CO—O—. $A^1$ and $A^2$ respectively denote a C2-20 spacer group; and M denotes a mesogen group.

The polymerizable rod-like liquid-crystal compound denoted by the formula (I) will be described in detail.

In the formula (I), $Q^1$ and $Q^2$ respectively denote a polymerizable group. The polymerizable groups may be addition polymerizable (ring opening polymerizable) or condensation polymerizable. Preferably, $Q^1$ and $Q^2$ respectively denote a group capable of addition polymerization or condensation polymerization. The examples of the polymerizable groups are shown below.

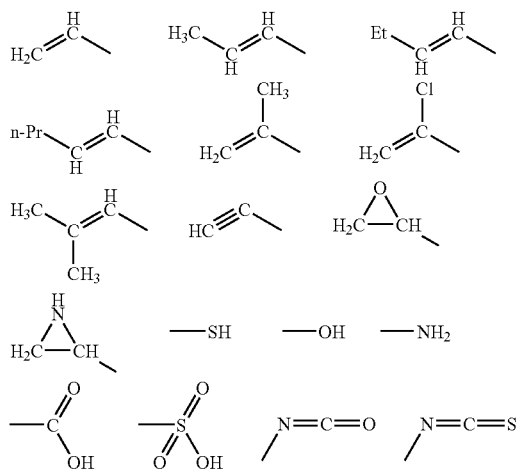

The divalent linking group respectively denoted by $L^1$, $L^2$, $L^3$ and $L^4$ is preferably the one selected from the group consisting of —O—, —S—, —CO—, —NR²—, —CO—O—, —O—CO—O—, —CO—NR²—, —NR²—CO—, —O—CO—, —O—CO—NR²—, —NR²—CO—O—, —NR²—CO—NR²— and single bond. $R^2$ represents a C1-7 alkyl group or a hydrogen atom. At least either of $L^3$ and $L^4$ expresses —O—CO—O— (carbonate group).

Among groups denoted by a combination of $Q^1$ and $L^1$ or by a combination of $Q^2$ and $L^2$, the preferable examples include $CH_2$=CH—CO—O—, $CH_2$=C($CH_3$)—CO—O— and $CH_2$=C(Cl)—CO—O—, and more preferable example is $CH_2$=CH—CO—O—.

$A^1$ and $A^2$ respectively denote a C2-20 spacer group, and preferably C2-12 aliphatic group, and more preferably alkylene group. The spacer group is preferably a chain group, and may contain oxygen atoms or sulfur atoms not adjacent with each other. The spacer group may have a substitutive group, and may more specifically be substituted by a halogen atom (fluorine, chlorine, bromine), cyano, methyl or ethyl.

The mesogen group denoted by M may selected from any known mesogen groups. The preferable examples thereof are denoted by the formula (II) below.

  Formula (II)

In the Formula (II), $W^1$ and $W^2$ respectively denote a divalent alicyclic group, divalent aromatic group or divalent heterocyclic group. $L^5$ is a single bond or a linking group, and the linking group. The examples of the linking group denoted by $L^5$ include those shown as the specific examples denoted by $L^1$ to $L^4$ in the above-described the formula (I), $CH_2$—O— and —O—$CH_2$—. "n" is an integer of 1, 2 or 3.

The examples of $W^1$ and $W^2$ include cyclohexane-1,4-diyl, 1,4-phenylene, pyrimidine-2,5-diyl, pyridine-2,5-diyl, 1,3,4-thiadiazole-2,5-diyl, 1,3,4-oxathiadiazole-2,5-diyl, naphthalene-2,6-diyl, naphthalene-1,5-diyl, thiophene-2,5-diyl and pyridazine-3,6-diyl. 1,4-Cyclohexanediyl may exist in trans- and cis-stereoisomers, where either of them, and any mixture in an arbitrary mixing ratio can be used in the present invention. The trans form is more preferable. $W^1$ and $W^2$ may independently have substitutive group, and the specific examples of the substitutive group include halogen atom (fluorine, chlorine, bromine, iodine), cyano, C1-10 alkyl groups (e.g., methyl, ethyl, propyl), C1-10 alkoxy groups (e.g., methoxy, ethoxy), C1-10 acyl groups (e.g., formyl, acetyl), C1-10 alkoxycarbonyl groups (e.g., methoxycarbonyl, ethoxycarbonyl), C1-10 acyloxy groups (e.g., acetyloxy, propionyloxy), nitro, trifluoromethyl, and difluoromethyl.

The preferable examples of the mesogen group denoted by the above-described the formula (II) are shown below, however, the mesogen group is not limited to these examples. The mesogen group may be substituted by any substitutive groups described in the above.

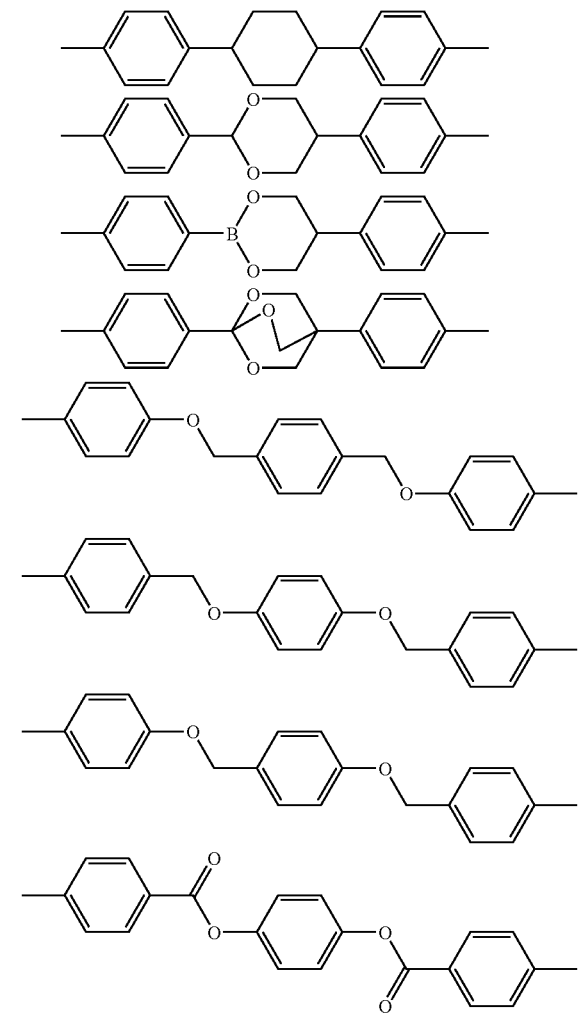

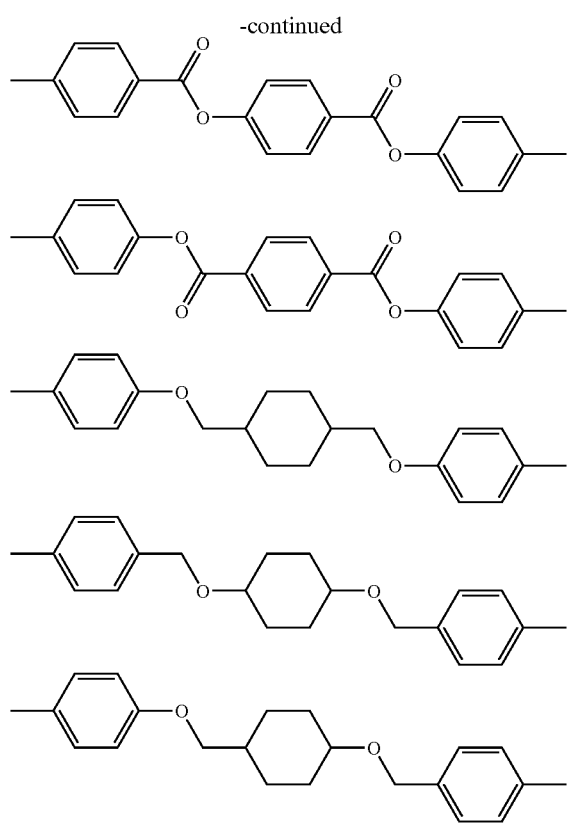
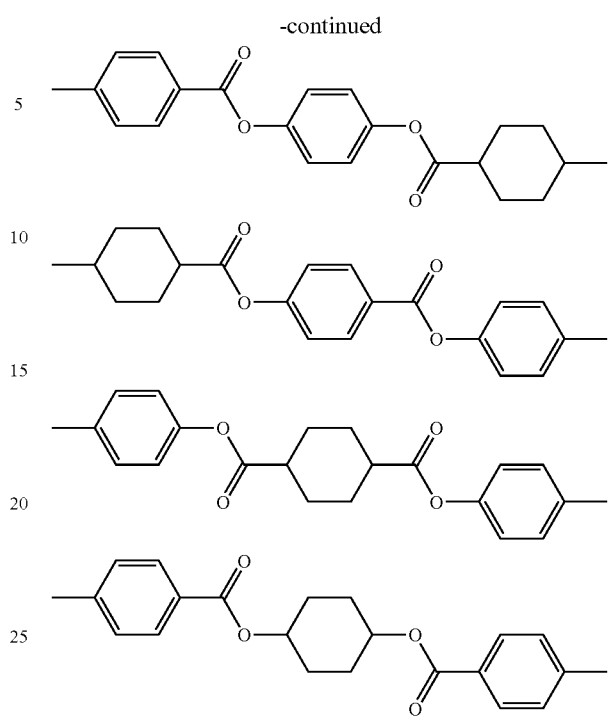
The specific examples of the compounds denoted by the Formula (I) will be shown below, where it is to be understood that the present invention is by no means limited thereto.
I-1
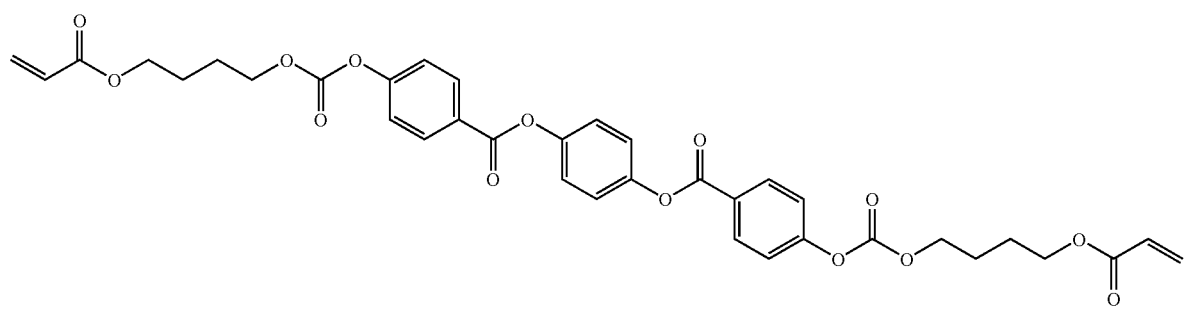
I-2
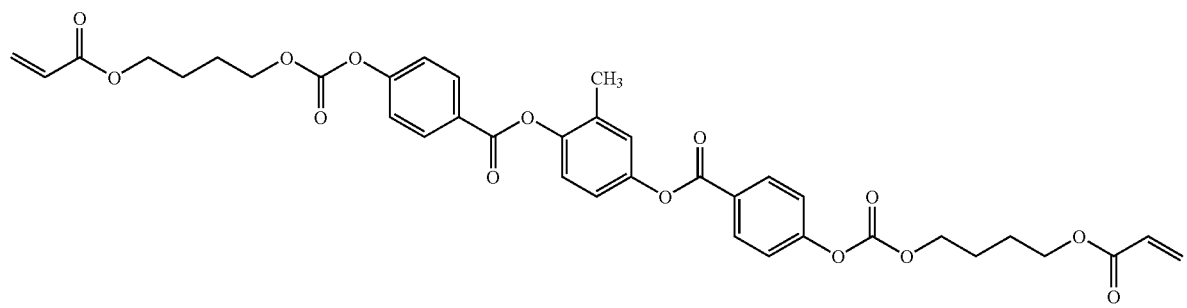

I-3
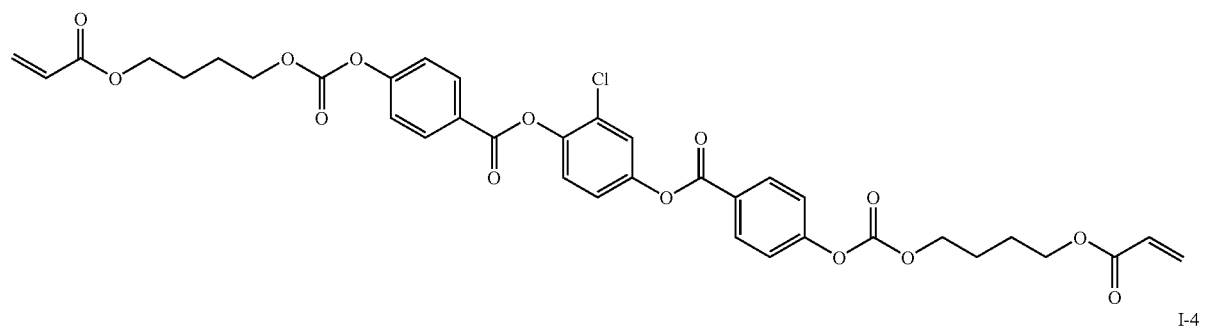
I-4
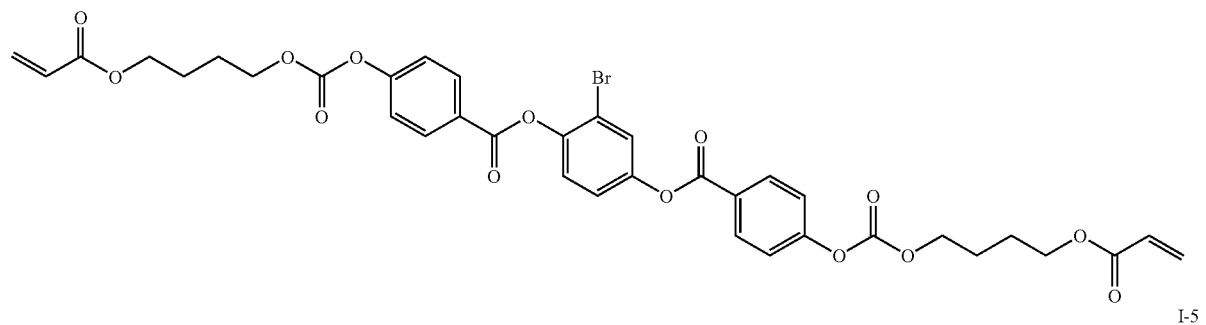
I-5
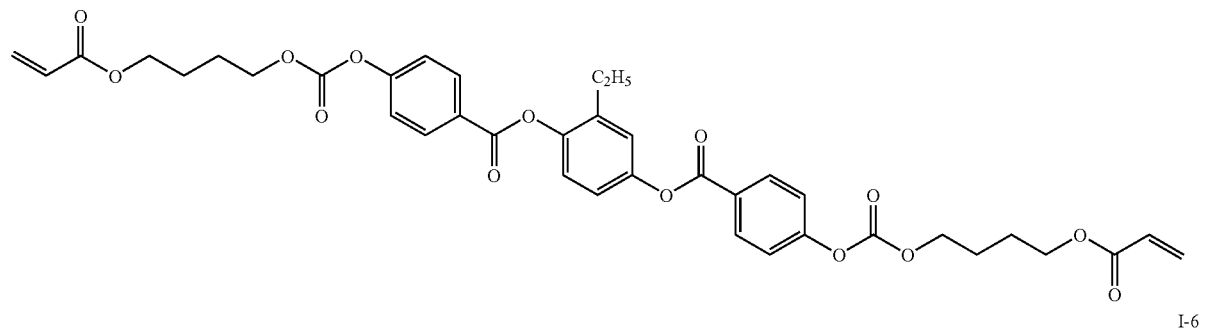
I-6
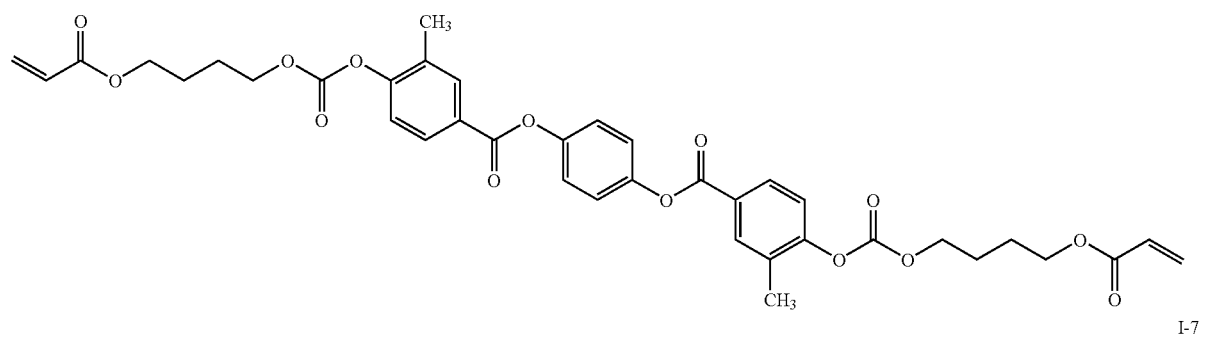
I-7
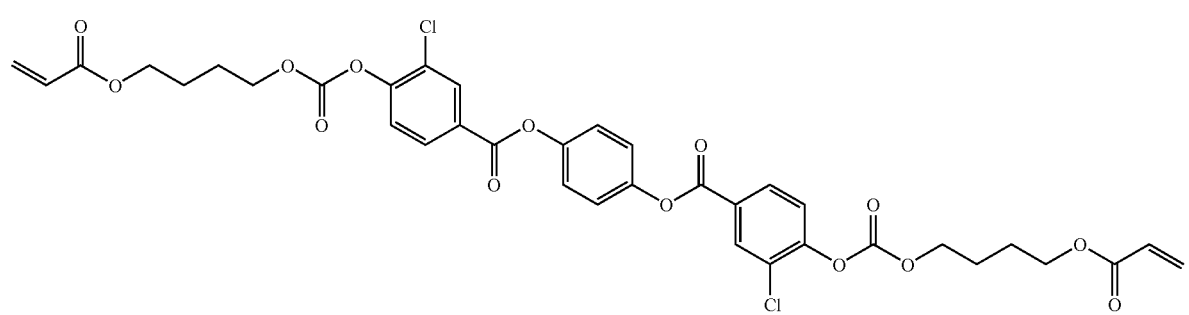

-continued
I-8
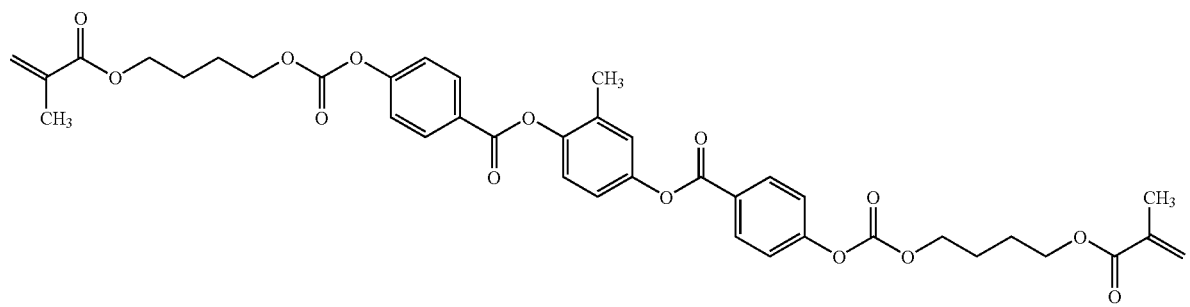
I-9
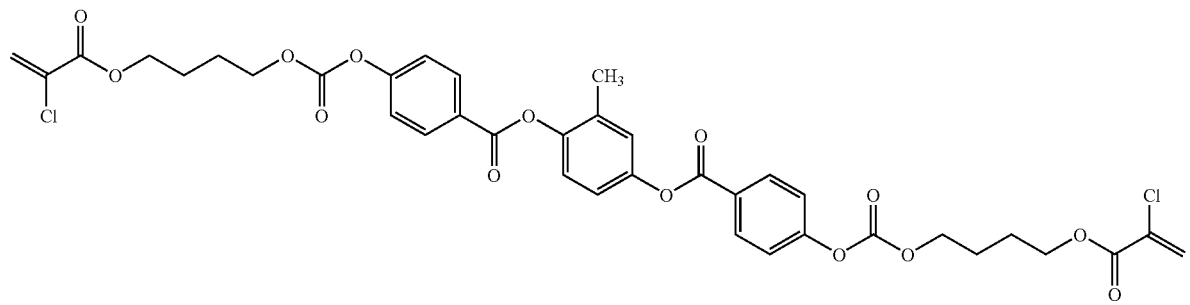
I-10
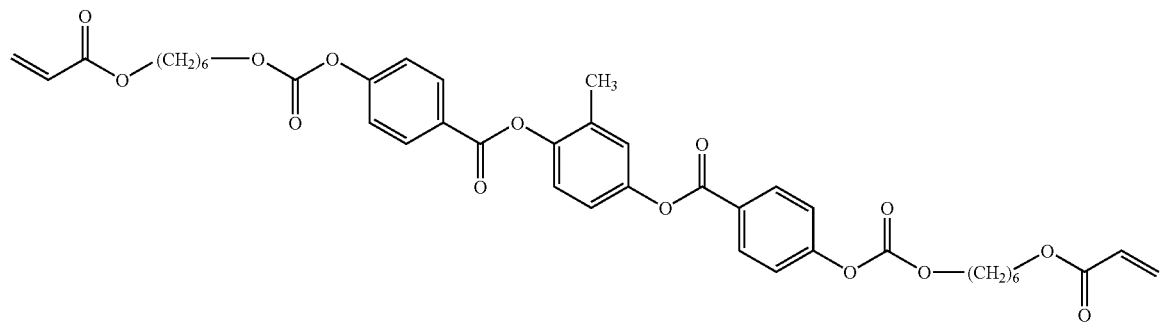
I-11
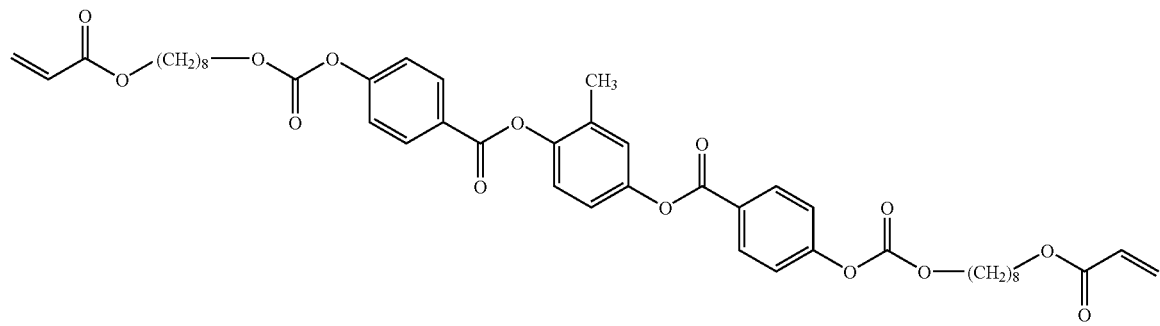

I-12
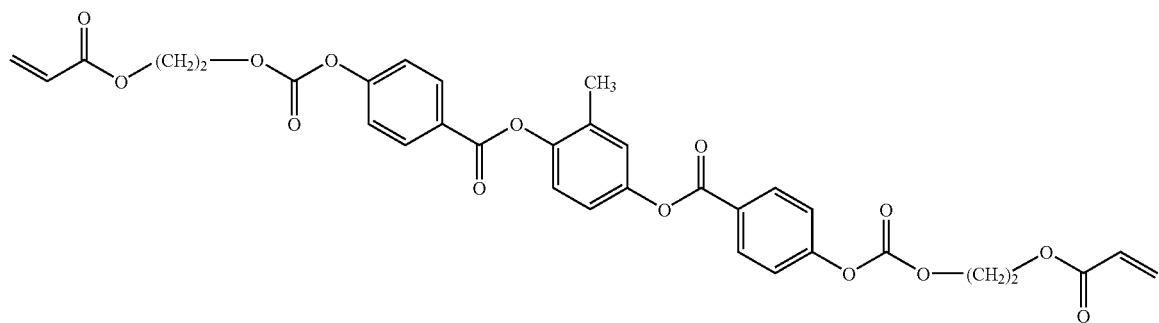
I-13
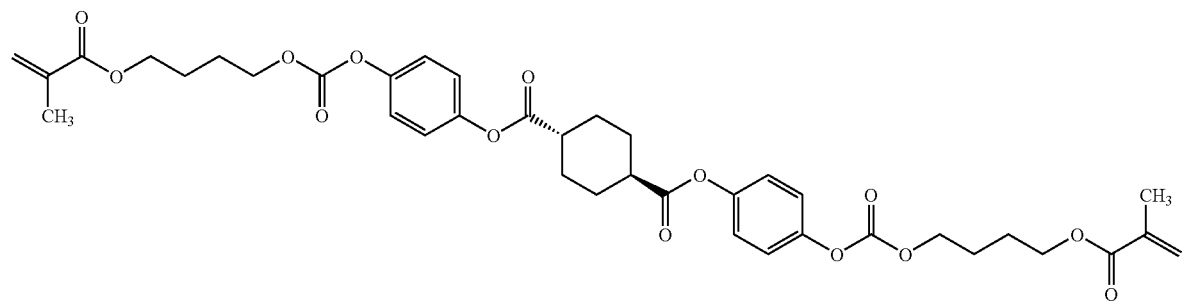
I-14
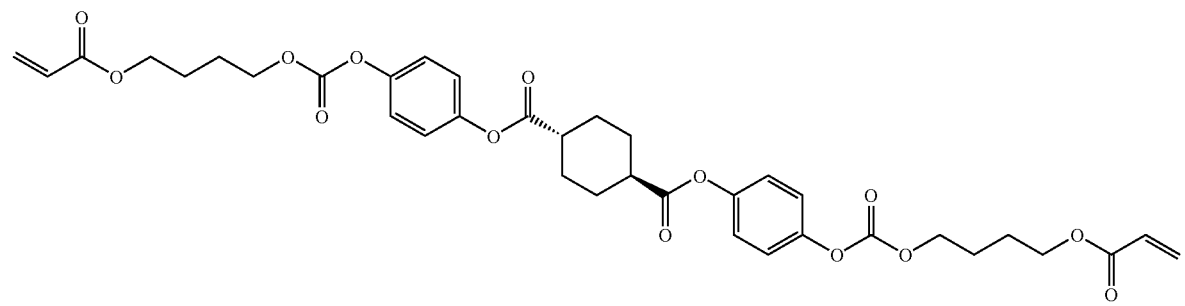
I-15
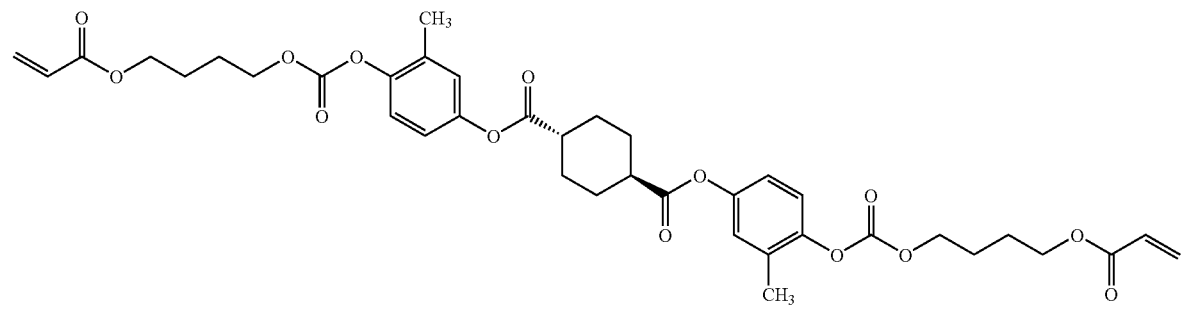

-continued
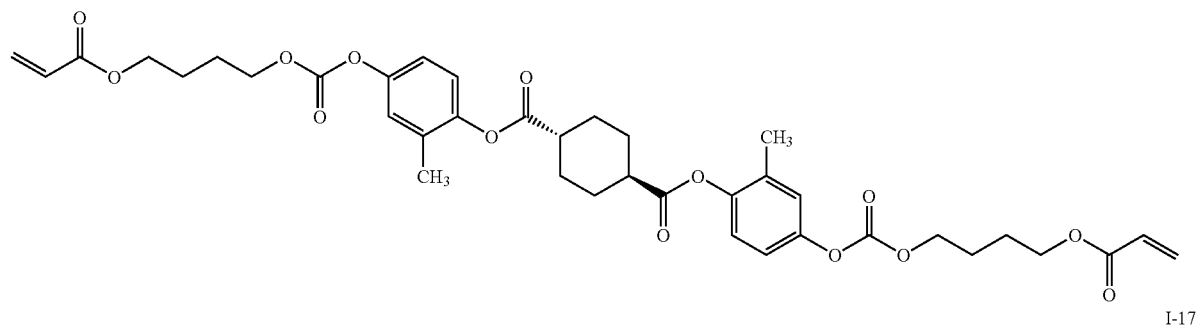
I-16
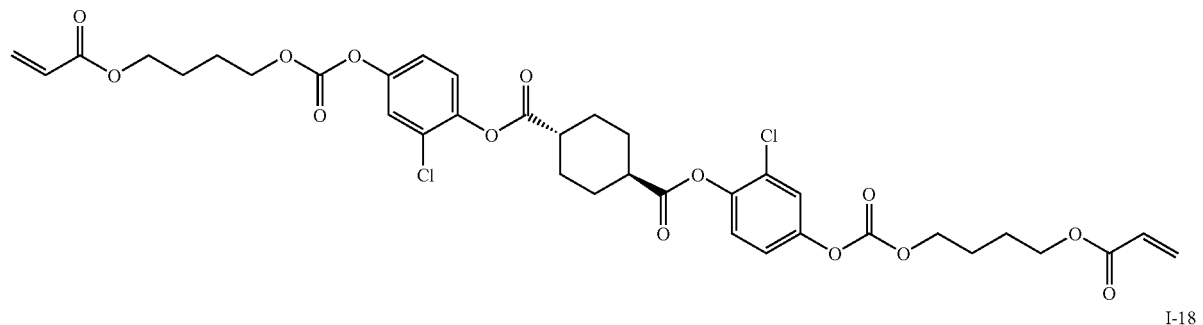
I-17
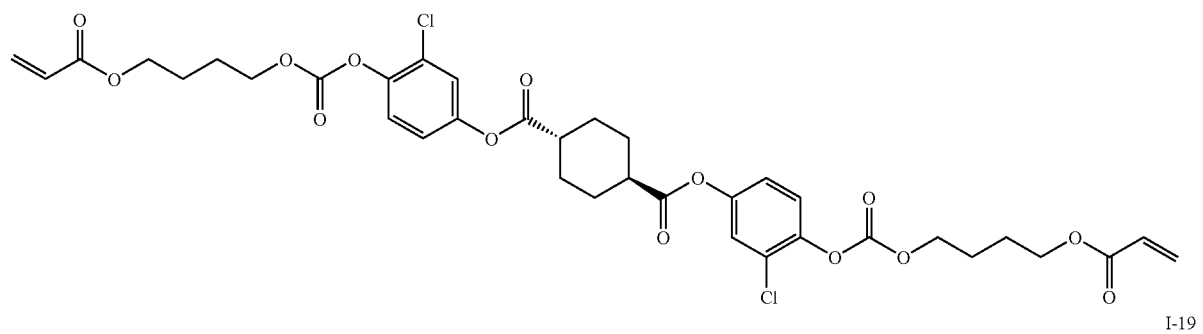
I-18
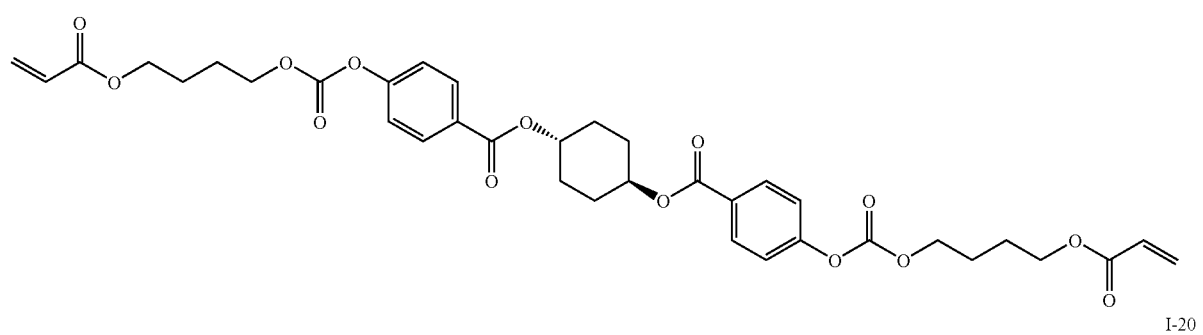
I-19
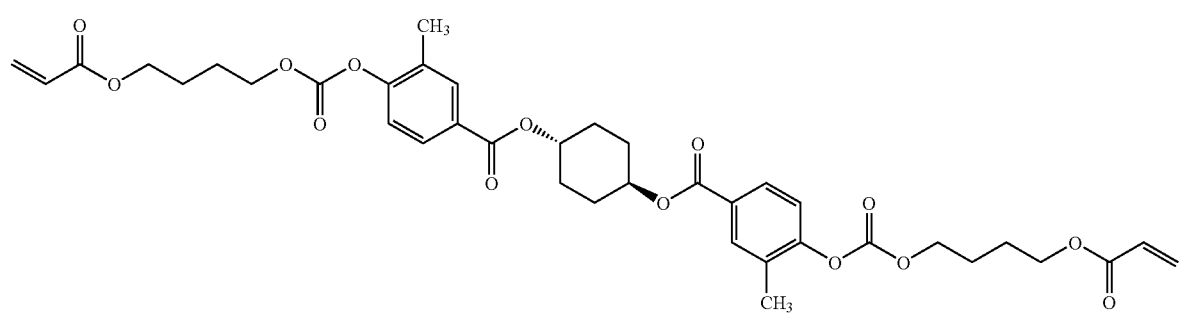
I-20

-continued

I-21

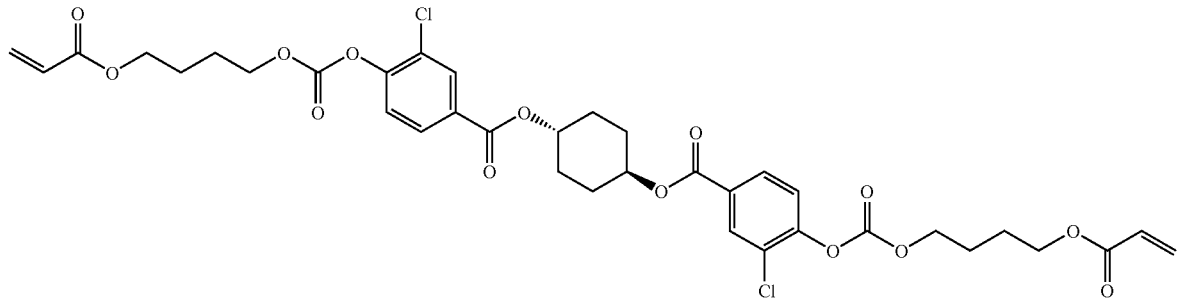

The compounds denoted by the formula (I) may be synthesized by the processes described in Published Japanese Translation of PCT International Publication for Patent Applications No. 11-513019.

In the optically anisotropic layers, the rod-like molecules are desirably aligned in a substantially uniformly manner, more desirably fixed in a substantially uniformly aligned manner, and most preferably fixed by polymerization reaction. According to the present invention, the rod-like molecules in the optically anisotropic layers are desirably aligned in a manner such as an angle between the in-plane slow axis of the each optically anisotropic layer and the longitudinal direction of the transparent substrate is substantially +30 degrees or −30 degrees. The rod-like molecules in the optically anisotropic layers are desirably aligned homogeneously.

Rod-like liquid-crystal compounds other than those denoted by the Formula (I) may be used in the combination with the compound denoted by the Formula (I) for preparing the layers. The examples of such rod-like liquid-crystal compounds include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Not only low-molecular-weight liquid-crystal compounds as mentioned above but also high-molecular-weight liquid-crystal compounds can be used.

The rod-like liquid-crystal molecules may be fixed in an alignment state by polymerization. The examples of the polymerizable rod-like liquid-crystal compound include those described in "Makromol. Chem., Vol. 190, p. 2255(1989)"; "Advanced Materials Vol. 5, p. 107 (1993)"; U.S. Pat. Nos. 4,683,327, 5,622,648 and 5,770,107; International Publications WO95/22,586, WO95/24,455, WO97/00,600, WO98/23,580 and WO98/52905; JPA No. 1989-272551, JPA No. 1994-16616, JPA No. 1995-110469 and JPA No. 1999-80081; and Japanese Patent Application No. 2001-64627.

The optically anisotropic layers are desirably prepared by applying a composition (coating solution) comprising a rod-like liquid-crystal compound, and if necessary additives, to a surface of an alignment layer. Any organic solvents may be used for preparing the coating solution. The examples of the organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination. The coating solution can be applied by known techniques (e.g., extrusion coating, direct gravure coating, reverse gravure coating, die coating).

The rod-like molecules in the layers are desirably fixed in an alignment state, preferably fixed by the polymerization reaction of the polymerizable groups included in the liquid-crystal molecules. The polymerization reaction may be carried out in a manner of a thermal polymerization reaction with a thermal polymerization initiator or in a manner of a photo-polymerization reaction with a photo-polymerization initiator. Photo-polymerization reaction is preferred. The examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), poly-nuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JPA No. 1985-105667 and U.S. Pat. No. 4,239,850) and oxadiazole compounds (described in U.S. Pat. No. 4,212,970).

The amount of the photo-polymerization initiator to be used is preferably 0.01 to 20% by weight, more preferably 0.5 to 5% by weight on the basis of solids in the coating solution. Irradiation for polymerizing the liquid-crystal molecules preferably uses UV rays. The irradiation energy is preferably 20 mJ/cm$^2$ to 50 J/cm$^2$, and more preferably 100 to 800 mJ/cm$^2$. Irradiation may be performed under heating to accelerate the photo-polymerization reaction.

The thickness of the optically anisotropic layer is preferably 0.1 to 10 micro meters, more preferably 0.5 to 5 micro meters.

[Alignment Controlling Additives at Air Interface Side]

In general, rod-like liquid-crystal molecules can be aligned homogenously in the area near to the alignment layer interface, and on the other hand, they tend to be aligned with a certain level of tilt angles in the area near to the air interface. It is effective to use an additive to suppress such their tendencies, and it is particularly preferable to use the additives denoted by the formula (V) below. The amount of the additive is desirably from 0.01 to 5 wt % with respect to the amount of the liquid-crystal compound.

$$(Hb-L^{52}-)_n B^{51} \quad \text{Formula (V)}$$

In the Formula (V), Hb represents a C6-40 aliphatic group, or oligosiloxanoxy group having a C6-40 aliphatic group. Hb is preferably a C6-40 aliphatic group, more preferably a fluorine-substituted C6-40 aliphatic group or a branched C6-40 aliphatic group, and most preferably a fluorine-substituted C6-40 alkyl group or a branched C6-40 alkyl group.

Among the aliphatic groups, chain aliphatic groups are preferred to rather than cyclic aliphatic groups. The chain aliphatic groups may have a straight or branched chain structure. The number of carbon atoms of the aliphatic group is preferably 7 to 35, more preferably 8 to 30, still more preferably 9 to 25, and most preferably 10 to 20.

In the specification, the term of "aliphatic group" is a general term for a substituted or non-substituted alkyl group, substituted or non-substituted alkenyl group and substituted or non-substituted alkynyl group. The aliphatic group is desirably a substituted or non-substituted alkyl group, or substituted or non-substituted alkenyl group, and preferably a substituted or non-substituted alkyl group.

The examples of the substituent of the aliphatic group include halogen atoms, hydroxy, cyano, nitro, alkoxy group, substituted alkoxy group (e.g., oligoalkoxy group), alkenyloxy group (e.g., vinyloxy), acyl group (e.g., acryloyl, methacryloyl), acyloxy group (e.g., acryloyloxy, benzoyloxy), sulfamoyl group, sulfamoyl groups substituted with aliphatic groups and epoxy alkyl group (e.g., epoxy ethyl). Among them, halogen atoms are desirable, and fluorine is more desirable, as substituent. Fluorinated aliphatic group is an aliphatic group in which part or all of the hydrogen atoms have been substituted with fluorine atoms. 50 to 100 percent of the hydrogen atoms in the aliphatic group are desirably substituted with fluorine atoms, with 60 to 100 percent substitution being preferred, 80 to 100 percent substitution being of even greater preference and 85 to 100 percent substitution being of even much greater preference.

The number of the carbon atoms included in the oligosiloxanoxy group having an aliphatic group is desirably from 7 to 35, preferably from 8 to 30, more preferably from 9 to 25 and much more preferably from 10 to 20. The oligosiloxanoxy group having an aliphatic group can be denoted by the following formula:

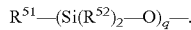

$R^{51}—(Si(R^{52})_2—O)_q—.$

In the formula, $R^{51}$ is hydrogen, hydroxy or aliphatic group; $R^{52}$ is hydrogen, aliphatic group or alkoxy group; and q is an integer from 1 to 12. A chain aliphatic group is preferred to a cyclic aliphatic group as the aliphatic group denoted by $R^{51}$ or $R^{52}$. The chain aliphatic group may have a straight chain or branched chain structure. The number of the carbon atoms included in the aliphatic group is desirably from 1 to 12, preferably from 1 to 8, more preferably from 1 to 6 and much more preferably from 1 to 4.

The aliphatic group denoted respectively by $R^{51}$ or $R^{52}$ is a substituted or non-substituted alkyl group, substituted or non-substituted alkenyl group, or substituted or non-substituted alkynyl group. As the aliphatic group, a non-substituted alkyl group, substituted alkyl group, non-substituted alkenyl group and substituted alkenyl group are preferred, and a non-substituted and substituted alkyl group are more preferred.

The aliphatic group denoted respectively by $R^{51}$ or $R^{52}$ may be substituted with at least one of substituent such as a halogen atom, hydroxy, cyano, nitro, alkoxy group, substituted alkoxy group (e.g., oligoalkoxy), alkenyloxy group (e.g., vinyloxy), acyl group (e.g., acryloyl, methacryloyl), acyloxy group (e.g., acryloyl oxy, benzoyl oxy), sulfamoyl, sulfamoyl group substituted with aliphatic group or epoxy alkyl group (e.g., epoxy ethyl).

The alkoxy group denoted by $R^{52}$ may have a cyclic or straight or branched chain structure. The number of the carbon atoms included in the alkoxy group is desirably from 1 to 12, preferably from 1 to 8, more preferably from 1 to 6 and more preferably from 1 to 4.

The specific examples of Hb are shown below.
Hb1: n-$C_{16}H_{33}$—
Hb2: n-$C_{20}H_{41}$—
Hb3: n-$C_6H_{13}$—CH(n-$C_4H_9$)—$CH_2$—$CH_2$—
Hb4: n-$C_{12}H_{25}$—
Hb5: n-$C_{11}H_{37}$—
Hb6: n-$C_{14}H_{29}$—
Hb7: n-$C_{15}H_{31}$—
Hb8: n-$C_{10}H_{21}$—
Hb9: n-$C_{10}H_{21}$—CH(n-$C_4H_9$)—$CH_2$—$CH_2$—
Hb10: n-$C_8F_{17}$—
Hb11: n-$C_8H_{17}$—
Hb12: $CH(CH_3)_2$—{$C_3H_6$—$CH(CH_3)$}$_3$—$C_2H_4$—
Hb13: $CH(CH_3)_2$—{$C_3H_6$—$CH(CH_3)$}$_2$—$C_3H_6$—C($CH_3$)=CH—$CH_2$—
Hb14: n-$C_8H_{17}$—CH(n-$C_6H_{13}$)—$CH_2$—$CH_2$—
Hb15: n-$C_6H_{13}$—CH($C_2H_5$)—$CH_2$—$CH_2$—
Hb16: n-$C_8F_{17}$—CH(n-$C_4F_9$)—$CH_2$—
Hb17: n-$C_8F_{17}$—CF(n-$C_6F_{13}$)—$CF_2$—$CF_2$—
Hb18: n-$C_3F_7$—CF($CF_3$)—$CF_2$—
Hb19: $Si(CH_3)_3$—{$Si(CH_3)_2$—O}$_6$—O—
Hb20: $Si(OC_3H_7)(C_{16}F_{33})(C_2H_4$—$SO_2$—NH—$C_8F_{17}$)—O—

In the Formula (V), $L^{52}$ is a single bond or divalent linking group. The divalent linking group is desirably a divalent linking group selected from the group consisting of -alkylene-, -fluorinated alkylene-, —O—, —S—, —CO—, —NR—, —$SO_2$— and any combinations thereof. R is a hydrogen atom or C1-20 alkyl group. R is desirably a hydrogen atom or C1-12 alkyl group. The number of the carbon atoms included in the alkylene or the fluorinated alkylene is desirably from 1 to 40, preferably from 1 to 30, more preferably from 1 to 20, much more preferably from 1 to 15 and further much more preferably from 1 to 12.

The specific examples of $L^{52}$ are shown below. They are connected on the left to Hb and on the right to $B^{51}$.
$L^{52}$10: single bond
$L^{52}$11: —O—
$L^{52}$12: —O—CO—
$L^{52}$13: —CO—$C_4H_8$—O—
$L^{52}$14: —O—$C_2H_4$—O—$C_2H_4$—O—
$L^{52}$15: —S—
$L^{52}$16: —N(n-$C_{12}H_{25}$)—
$L^{52}$17: —$SO_2$—N(n-$C_3H_7$)—$CH_2CH_2$—O—
$L^{52}$18: —O—{CF($CF_3$)—$CF_2$—O}$_3$—CF($CF_3$)—

In the Formula (V), n is an integer from 2 to 12. n is desirably an integer from 2 to 9, preferably from 2 to 6, more preferably 2, 3 or 4 and much more preferably 3 or 4.

In the Formula (V), $B^{51}$ is an n-valent group showing an excluded volume effect and comprising at least three rings. $B^{51}$ is desirably an n-valent group denoted by Formula (V-a).

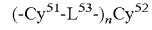

$(-Cy^{51}-L^{53}-)_nCy^{52}$          Formula (V-a)

In the Formula (V-a), $Cy^{51}$ is a divalent cyclic group. $Cy^{51}$ is desirably a divalent aromatic hydrocarbon group or a divalent heterocyclic divalent group and more preferably a divalent aromatic hydrocarbon group.

In the specification, the term of "divalent aromatic hydrocarbon group" is a general term for a substituted or non-substituted arylene group. The examples of the arylene group include benzene-diyl, indene-diyl, naphthalene-diyl, fluorine-diyl, phenanthrene-diyl, anthracene-diyl and pyrane-diyl. The divalent aromatic hydrocarbon group is desirably benzene-diyl or naphthalene-diyl.

The examples of the substituent of the substituted arylene group include an aliphatic group, aromatic hydrocarbon group, heterocyclic group, halogen atom, alkoxy group (e.g., methoxy, ethoxy, methoxy-ethoxy), aryloxy group (e.g., phenoxy), arylazo group (e.g., phenylazo), alkylthio group (e.g., methylthio, ethylthio, propylthio), alkylamino group (e.g., methylamino, propylamino), acyl group (e.g., acetyl, propanoyl, octanoyl, benzoyl), acyloxy group (e.g., acetoxy, pivaloyloxy, benzoyloxy), hydroxy, mercapto, amino, carboxy, sulfo, carbamoyl, sulfamoyl and ureido.

The divalent aromatic hydrocarbon group bonded to another aromatic hydrocarbon group through a single, vinylene or ethynylene bond may show the above-mentioned ability of promoting alignment of liquid-crystal molecules. The divalent aromatic hydrocarbon group may have a group of Hb-L$^{52}$- as a substituent.

The hetero ring included in the divalent heterocyclic group denoted by Cy$^{51}$ is desirably five-, six- or seven-membered, preferably five- or six-membered, and more preferably six-membered. The hetero atom constituting the hetero ring is desirably nitrogen, oxygen or sulfur. The hetero ring desirably has aromaticity. Aromatic hetero rings are usually unsaturated rings and desirably has maximum double bondings. The examples of the hetero ring include a furan ring, thiophene ring, pyrrole ring, pyrroline ring, pyrrolizine ring, oxazole ring, isoxazole ring, thiazole ring, isothiazole ring, imidazole ring, imidazoline ring, imidazolidine ring, pyrazole ring, pyrazolidine ring, triazole ring, furazan ring, tetrazole ring, pyrane ring, thiine ring, pyridine ring, piperidine ring, oxazine ring, morpholine ring, thiazine ring, pyridazine ring, pyrimidine ring, pyrazine ring, piperazine ring and triazine ring.

The hetero rings may be condensed with other hetero rings, aliphatic rings or aryl rings. The examples of the condensed hetero rings include a benzofuran ring, isobenzofuran ring, benzothiophenering, indolering, indolinering, isoindole ring, benzoxazole ring, benzothiazole ring, indazole ring, benzoimidazole ring, chromene ring, chromane ring, isochromane ring, quinoline ring, isoquinoline ring, cinnoline ring, phthalazine ring, quinazoline ring, quinoxaline ring, di-benzofuran ring, carbazole ring, xanthene ring, acridine ring, phenanthridine ring, phenanthroline ring, phenazine ring, phenoxazine ring, thianthrene ring, indolizine ring, quinolidine ring, quinuclidine ring, naphthridine ring, purine ring and pteridine ring.

The divalent heterocyclic group may have at least one substituent. The examples of the substituent for the divalent heterocyclic group are identical with those for the substituted arylene group.

The divalent heterocyclic group, Cy$^{51}$, may connected to the L$^{53}$ or the cyclic group denoted by Cy$^{52}$, when L$^{53}$ is a single bond, through a hetero atom such as nitrogen constituting a piperidine ring. The hetero atom linking them may form an onium salt such as an oxonium, sulfonium or ammonium.

The cyclic Cy$^{51}$ and Cy$^{52}$ may form a planar structure, that is, a discotic structure, as a whole. In such a case, the above-mentioned ability of promoting alignment of liquid-crystal molecules can be obtained.

The specific examples of Cy$^{51}$ are shown below. When the plural groups corresponding to Hb-L$^{52}$- are bonded to a divalent aromatic hydrocarbon group or a divalent heterocyclic group, one of the plural groups can be regarded as Hb-L$^{52}$- and other can be regarded as substituent of the aromatic hydrocarbon group or the heterocyclic group.

The number of the carbon atoms included in the oligosiloxanoxy group having an aliphatic group is desirably from 7 to 35, preferably from 8 to 30, more preferably from 9 to 25 and much more preferably from 10 to 20. The oligosiloxanoxy group having an aliphatic group can be denoted by the following formula:

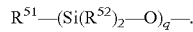

In the formula, R$^{51}$ is hydrogen, hydroxy or aliphatic group; R$^{52}$ is hydrogen, aliphatic group or alkoxy group; and q is an integer from 1 to 12. A chain aliphatic group is preferred to a cyclic aliphatic group as the aliphatic group denoted by R$^{51}$ or R$^{52}$. The chain aliphatic group may have a straight chain or branched chain structure. The number of the carbon atoms included in the aliphatic group is desirably from 1 to 12, preferably from 1 to 8, more preferably from 1 to 6 and much more preferably from 1 to 4.

The aliphatic group denoted respectively by R$^{51}$ or R$^{52}$ is a substituted or non-substituted alkyl group, substituted or non-substituted alkenyl group, or substituted or non-substituted alkynyl group. As the aliphatic group, a non-substituted alkyl group, substituted alkyl group, non-substituted alkenyl group and substituted alkenyl group are preferred, and a non-substituted and substituted alkyl group are more preferred.

The aliphatic group denoted respectively by R$^{51}$ or R$^{52}$ may be substituted with at least one of substituent such as a halogen atom, hydroxy, cyano, nitro, alkoxy group, substituted alkoxy group (e.g., oligoalkoxy), alkenyloxy group (e.g., vinyloxy), acyl group (e.g., acryloyl, methacryloyl), acyloxy group (e.g., acryloyl oxy, benzoyl oxy), sulfamoyl, sulfamoyl group substituted with aliphatic group or epoxy alkyl group (e.g., epoxy ethyl).

The alkoxy group denoted by R$^{52}$ may have a cyclic or straight or branched chain structure. The number of the carbon atoms included in the alkoxy group is desirably from 1 to 12, preferably from 1 to 8, more preferably from 1 to 6 and more preferably from 1 to 4.

The specific examples of Hb are shown below.
Hb1: n-C$_{16}$H$_{33}$—
Hb2: n-C$_{20}$H$_{41}$—
Hb3: n-C$_6$H$_{13}$—CH(n-C$_4$H$_9$)—CH$_2$—CH$_2$—
Hb4: n-C$_{12}$H$_{25}$—
Hb5: n-C$_{11}$H$_{37}$—
Hb6: n-C$_{14}$H$_{29}$—
Hb7: n-C$_{15}$H$_{31}$—
Hb8: n-C$_{10}$H$_{21}$—
Hb9: n-C$_{10}$H$_{21}$—CH(n-C$_4$H$_9$)—CH$_2$—CH$_2$—
Hb10: n-C$_8$F$_{17}$—
Hb11: n-C$_8$H$_{17}$—
Hb12: CH(CH$_3$)$_2$—{C$_3$H$_6$—CH(CH$_3$)}$_3$—C$_2$H$_4$—
Hb13: CH(CH$_3$)$_2$—{C$_3$H$_6$—CH(CH$_3$)}$_2$—C$_3$H$_6$—C(CH$_3$)=CH—CH$_2$—
Hb14: n-C$_8$H$_{17}$—CH(n-C$_6$H$_{13}$)—CH$_2$—CH$_2$—
Hb15: n-C$_6$H$_{13}$—CH(C$_2$H$_5$)—CH$_2$—CH$_2$—
Hb16: n-C$_8$F$_{17}$—CH(n-C$_4$F$_9$)—CH$_2$—
Hb17: n-C$_8$F$_{17}$—CF(n-C$_6$F$_{13}$)—CF$_2$—CF$_2$—
Hb18: n-C$_3$F$_7$—CF(CF$_3$)—CF$_2$—
Hb19: Si(CH$_3$)$_3$—{Si(CH$_3$)$_2$—O}$_6$—O—
Hb20: Si(OC$_3$H$_7$)(C$_{16}$F$_{33}$)(C$_2$H$_4$—SO$_2$—NH—C$_8$F$_{17}$)—O—

In the Formula (V), L$^{52}$ is a single bond or divalent linking group. The divalent linking group is desirably a divalent linking group selected from the group consisting of -alkylene-, -fluorinated alkylene-, —O—, —S—, —CO—, —NR—, —SO$_2$— and any combinations thereof. R is a hydrogen atom or C1-20 alkyl group. R is desirably a hydrogen atom or C1-12 alkyl group. The number of the carbon atoms included in the alkylene or the fluorinated alkylene is desirably from 1 to 40, preferably from 1 to 30, more preferably from 1 to 20, much more preferably from 1 to 15 and further much more preferably from 1 to 12.

The specific examples of $L^{52}$ are shown below. They are connected on the left to Hb and on the right to $B^{51}$.

$L^{52}10$: single bond
$L^{52}11$: —O—
$L^{52}12$: —O—CO—
$L^{52}13$: —CO—$C_4H_8$—O—
$L^{52}14$: —O—$C_2H_4$—O—$C_2H_4$—O—
$L^{52}15$: —S—
$L^{52}16$: —N(n-$C_{12}H_{25}$)—
$L^{52}17$: —$SO_2$—N(n-$C_3H_7$)—$CH_2CH_2$—O—
$L^{52}18$: —O—{CF($CF_3$)—$CF_2$—O}$_3$—CF($CF_3$)—

In the Formula (V), n is an integer from 2 to 12. n is desirably an integer from 2 to 9, preferably from 2 to 6, more preferably 2, 3 or 4 and much more preferably 3 or 4.

In the Formula (V), $B^{51}$ is an n-valent group showing an excluded volume effect and comprising at least three rings. $B^{51}$ is desirably an n-valent group denoted by Formula (V-a).

$$(-Cy^{51}-L^{53}-)_n Cy^{52} \quad \text{Formula (V-a)}$$

In the Formula (V-a), $Cy^{51}$ is a divalent cyclic group. $Cy^{51}$ is desirably a divalent aromatic hydrocarbon group or a divalent heterocyclic divalent group and more preferably a divalent aromatic hydrocarbon group.

The divalent aromatic hydrocarbon group is a general term for a substituted or non-substituted arylene group. The examples of the arylene group include benzene-diyl, indene-diyl, naphthalene-diyl, fluorine-diyl, phenanthrene-diyl, anthracene-diyl and pyrane-diyl. The divalent aromatic hydrocarbon group is desirably benzene-diyl or naphthalene-diyl.

The examples of the substituent of the substituted arylene group include an aliphatic group, aromatic hydrocarbon group, heterocyclic group, halogen atom, alkoxy group (e.g., methoxy, ethoxy, methoxy-ethoxy), aryloxy group (e.g., phenoxy), arylazo group (e.g., phenylazo), alkylthio group (e.g., methylthio, ethylthio, propylthio), alkylamino group (e.g., methylamino, propylamino), acyl group (e.g., acetyl, propanoyl, octanoyl, benzoyl), acyloxy group (e.g., acetoxy, pivaloyloxy, benzoyloxy), hydroxy, mercapto, amino, carboxy, sulfo, carbamoyl, sulfamoyl and ureido.

The divalent aromatic hydrocarbon group bonded to another aromatic hydrocarbon group through a single, vinylene or ethynylene bond may show the above-mentioned ability of promoting alignment of liquid-crystal molecules. The divalent aromatic hydrocarbon group may have a group of Hb-$L^{52}$- as a substituent.

The hetero ring included in the divalent heterocyclic group denoted by $Cy^{51}$ is desirably five-, six- or seven-membered, preferably five- or six-membered, and more preferably six-membered. The hetero atom constituting the hetero ring is desirably nitrogen, oxygen or sulfur. The hetero ring desirably has aromaticity. Aromatic hetero rings are usually unsaturated rings and desirably has maximum double bondings. The examples of the hetero ring include a furan ring, thiophene ring, pyrrole ring, pyrroline ring, pyrrolizine ring, oxazole ring, isoxazole ring, thiazole ring, isothiazole ring, imidazole ring, imidazoline ring, imidazolidine ring, pyrazole ring, pyrazolidine ring, triazole ring, furazan ring, tetrazole ring, pyrane ring, thiine ring, pyridine ring, piperidine ring, oxazine ring, morpholine ring, thiazine ring, pyridazine ring, pyrimidine ring, pyrazine ring, piperazine ring and triazine ring.

The hetero rings may be condensed with other hetero rings, aliphatic rings or aryl rings. The examples of the condensed hetero rings include a benzofuran ring, isobenzofuran ring, benzothiophene ring, indole ring, indoline ring, isoindole ring, benzoxazole ring, benzothiazole ring, indazole ring, benzoimidazole ring, chromene ring, chromane ring, isochromane ring, quinoline ring, isoquinoline ring, cinnoline ring, phthalazine ring, quinazoline ring, quinoxaline ring, di-benzofuran ring, carbazole ring, xanthene ring, acridine ring, phenanthridine ring, phenanthroline ring, phenazine ring, phenoxazine ring, thianthrene ring, indolizine ring, quinolidine ring, quinuclidine ring, naphthridine ring, purine ring and pteridine ring.

The divalent heterocyclic group may have at least one substituent. The examples of the substituent for the divalent heterocyclic group are identical with those for the substituted arylene group.

The divalent heterocyclic group, $Cy^{51}$, may connected to the $L^{53}$ or the cyclic group denoted by $Cy^{52}$, when $L^{53}$ is a single bond, through a hetero atom such as nitrogen constituting a piperidine ring. The hetero atom linking them may form an onium salt such as an oxonium, sulfonium or ammonium.

The cyclic $Cy^{51}$ and $Cy^{52}$ may form a planar structure, that is, a discotic structure, as a whole. In such a case, the above-mentioned ability of promoting alignment of liquid-crystal molecules can be obtained.

The specific examples of $Cy^{51}$ are shown below. When the plural groups corresponding to Hb-$L^{52}$- are bonded to a divalent aromatic hydrocarbon group or a divalent heterocyclic group, one of the plural groups can be regarded as Hb-$L^{52}$- and others can be regarded as substituent of the aromatic hydrocarbon group or the heterocyclic group.

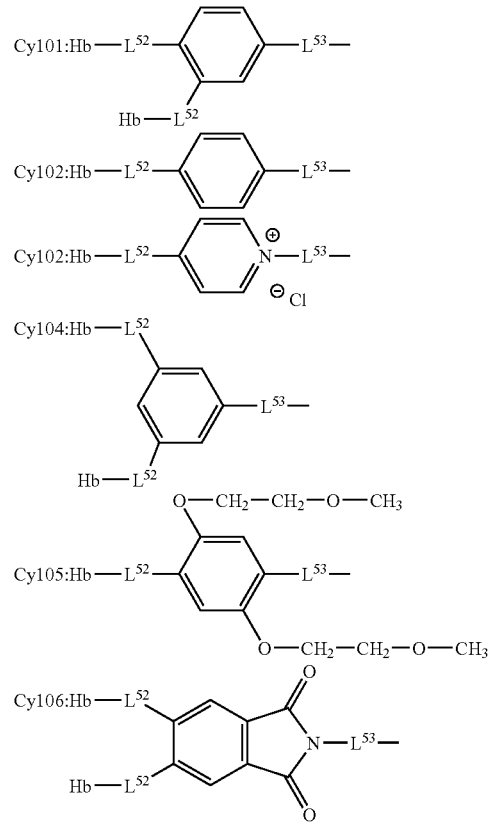

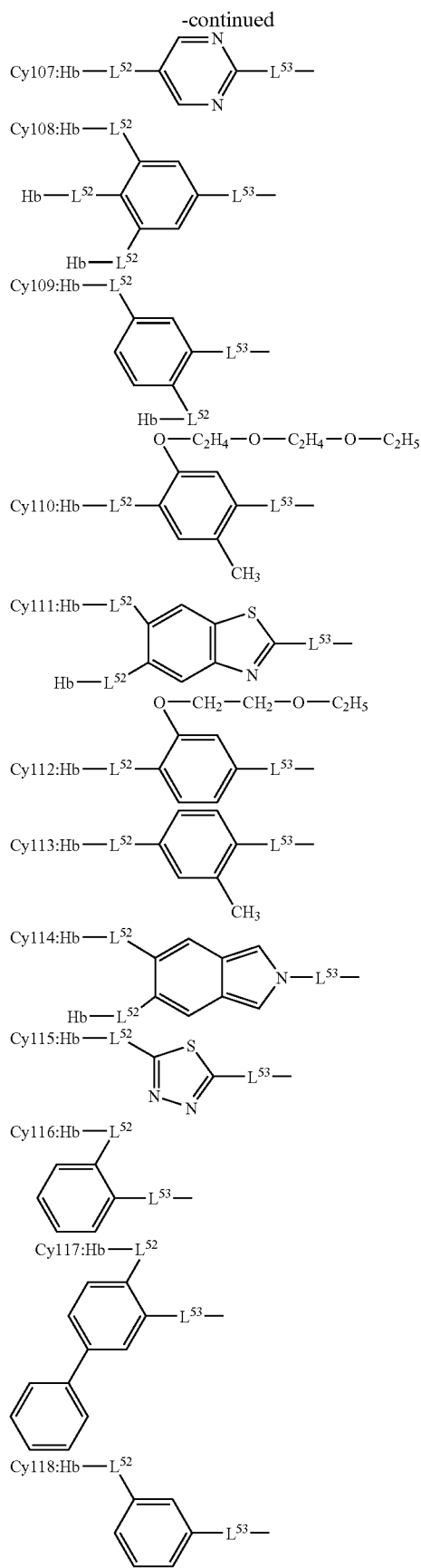
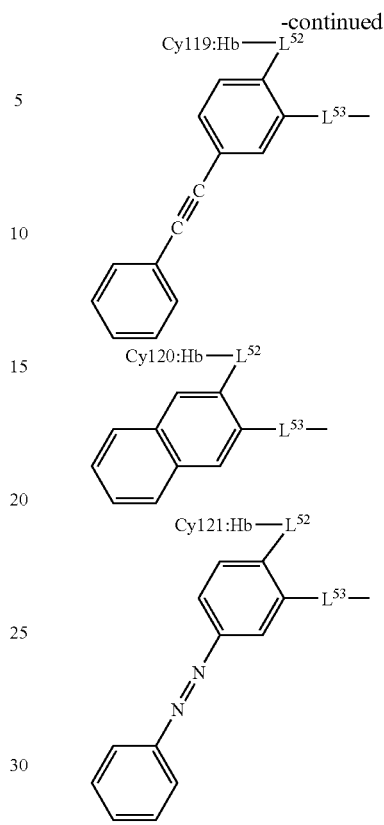

In the Formula (V-a), $L^{53}$ is a divalent linking group selected from the group consisting of a single bond, -alkylene-, -alkenylene-, -alkynylene-, —O—, —S—, —CO—, —NR—, —SO$_2$— and any combinations thereof. R is a hydrogen atom or C1-30 alkyl group. $L^{53}$ is desirably a divalent linking group selected from the group consisting of —O—, —S—, —CO—, —NR—, —SO$_2$— and any combinations thereof. R is desirably a hydrogen atom or C1-20 alkyl group, preferably a hydrogen atom or C1-15 alkyl group, and more preferably a hydrogen atom or C1-12 alkyl group.

The number of the carbon atoms included in the alkylene group is desirably from 1 to 40, preferably from 1 to 30, more preferably from 1 to 15 and much more preferably from 1 to 12.

The number of the carbon atoms included in the alkenylene group is desirably from 2 to 40, preferably from 2 to 30, more preferably from 2 to 15 and much more preferably from 2 to 12.

The specific example of $L^{53}$ are shown below. In the following examples, the left end of an exemplified group is bonded to Cy$^{51}$ and the right end is bonded to Cy$^{52}$.

$L^{20}$: single bond
$L^{21}$: —S—
$L^{22}$: —NH—
$L^{23}$: —NH—SO$_2$—NH—
$L^{24}$: —NH—CO—NH—
$L^{25}$: —SO$_2$—
$L^{26}$: —O—NH—
$L^{27}$: —C≡C—
$L^{28}$: —CH=CH—S—
$L^{29}$: —CH$_2$—O—
$L^{30}$: —N(CH$_3$)—
$L^{31}$: —CO—O—

In the Formula (V-a), n is an integer from 2 to 12, desirably from 2 to 9, preferably from 2 to 6, more preferably 2, 3 or 4, and much more preferably 3 or 4.

In the Formula (V-a), $Cy^{52}$ is an n-valent cyclic group. $Cy^{52}$ is desirably an n-valent aromatic hydrocarbon group or n-valent heterocyclic group.

The examples of the aromatic hydrocarbon ring included in the aromatic hydrocarbon group denoted by $Cy^{52}$ include a benzene ring, indene ring, naphthalene ring, fluorine ring, phenanthrene ring, anthracene ring and pyrene ring. Among them, a benzene ring and naphthalene ring are preferred and a benzene ring is more preferred.

The aromatic hydrocarbon group denoted by $Cy^{52}$ may have at least one substituent. The examples of the substituent include an aliphatic group, aromatic hydrocarbon group, heterocyclic group, halogen atom, alkoxy group (e.g., methoxy, ethoxy, methoxy-ethoxy), aryloxy group (e.g., phenoxy), arylazo group (e.g., phenylazo), alkylthio group (e.g., methylthio, ethylthio, propylthio), alkylamino group (e.g., methylamino, propylamino), arylamino group (e.g., phenylamino), acyl group (e.g., acetyl, propanoyl, octanoyl, benzoyl), acyloxy group (e.g., acetoxy, pivaloyloxy, benzoyloxy), hydroxy, mercapto, amino, carboxy, sulfo, carbamoyl, sulfamoyl and ureido.

The hetero ring included in the divalent heterocyclic group denoted by $Cy^{52}$ is desirably five-, six- or seven-membered, preferably five- or six-membered, and more preferably six-membered. The hetero atom constituting the hetero ring is desirably nitrogen, oxygen or sulfur. The hetero ring desirably has aromaticity. Aromatic hetero rings are usually unsaturated rings and desirably has maximum double bondings. The examples of the hetero ring include a furan ring, thiophene ring, pyrrole ring, pyrroline ring, pyrrolizine ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyrane ring, thiine ring, pyridine ring, piperidine ring, oxazine ring, morpholine ring, thiazine ring, pyridazine ring, pyrimidine ring, pyrazine ring, piperazine ring and triazine ring. Among them, triazine ring is preferred and 1,3,5-triazine ring is more preferred.

Although the hetero rings may be condensed with other hetero rings, aliphatic rings or aryl rings, monocyclic hetero rings are preferred.

The specific examples of $Cy^{52}$ are shown below.

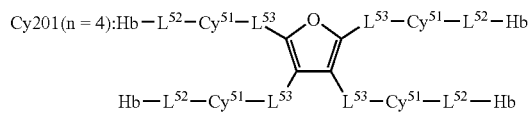

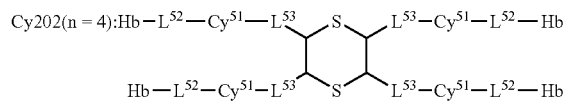

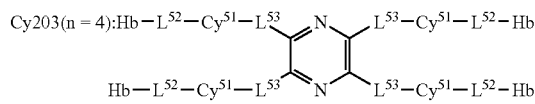

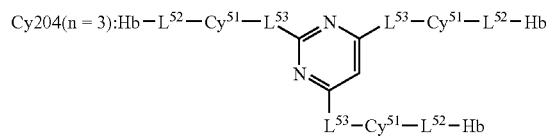

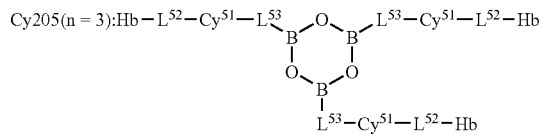

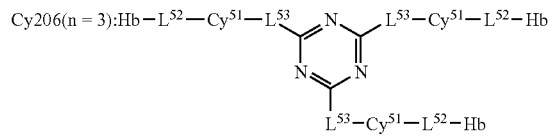

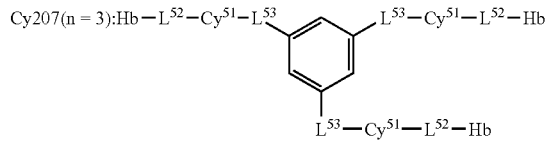

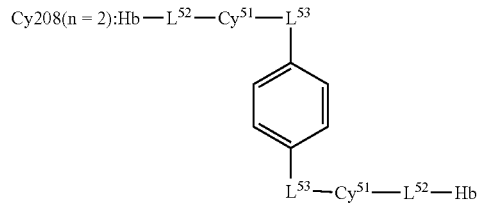

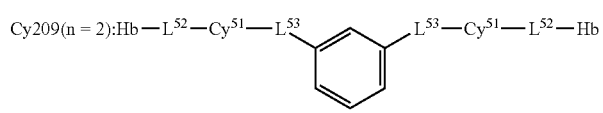

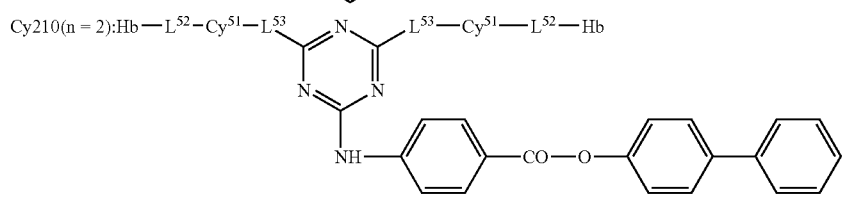

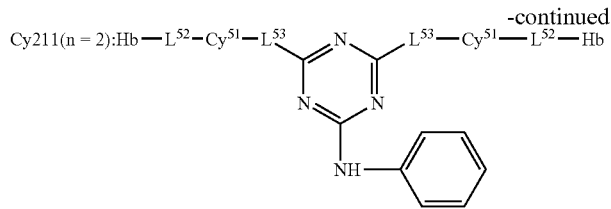
The alignment promoter is a compound comprising the aforementioned hydrophobic group (Hb), the linking group ($L^{52}$) and the group (Bu) showing an excluded volume effect. There is no specific limitation on the combinations thereof.
The specific examples of the alignment promoters denoted by the Formula (V) are shown below.
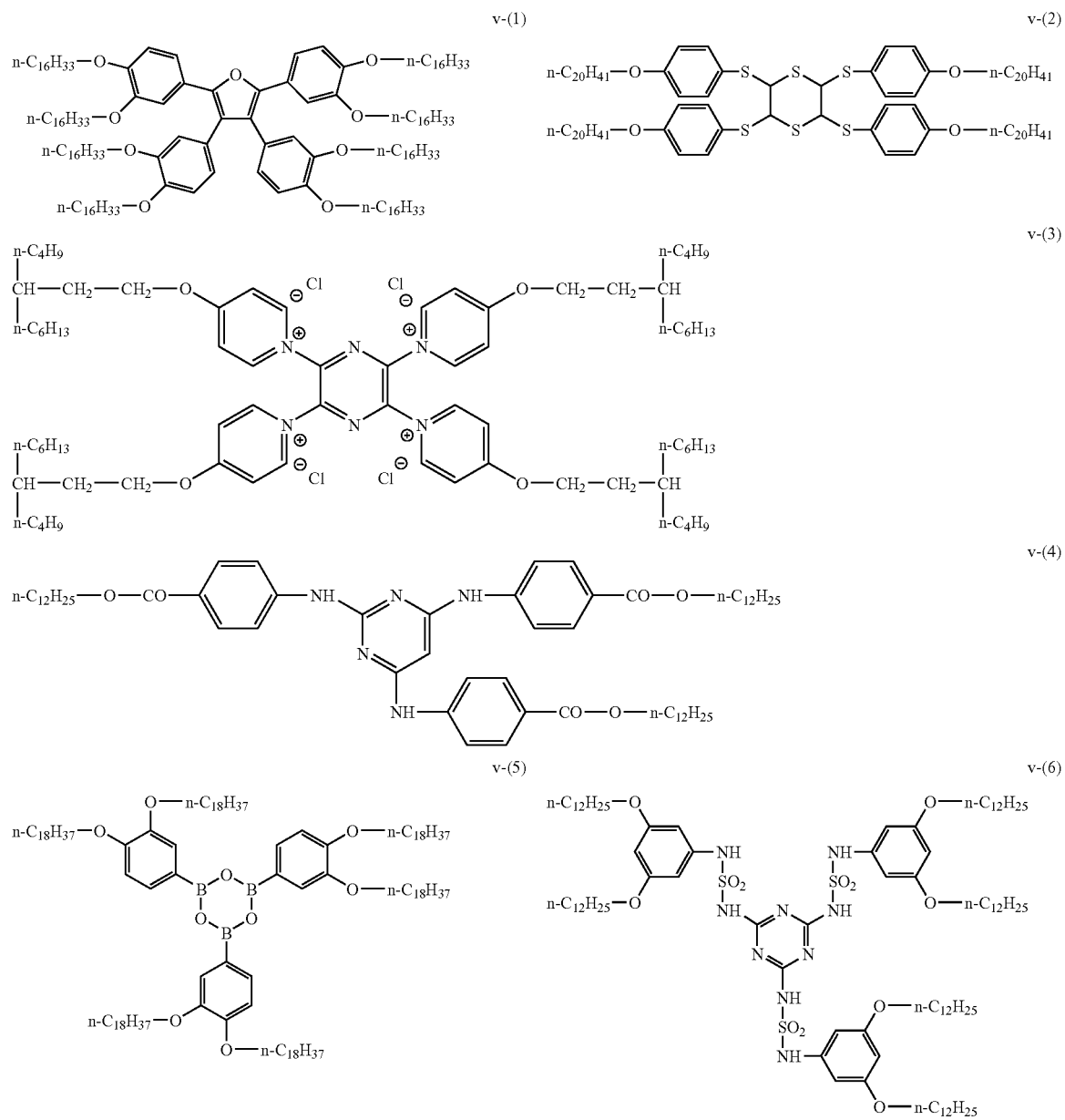

-continued
v-(7)
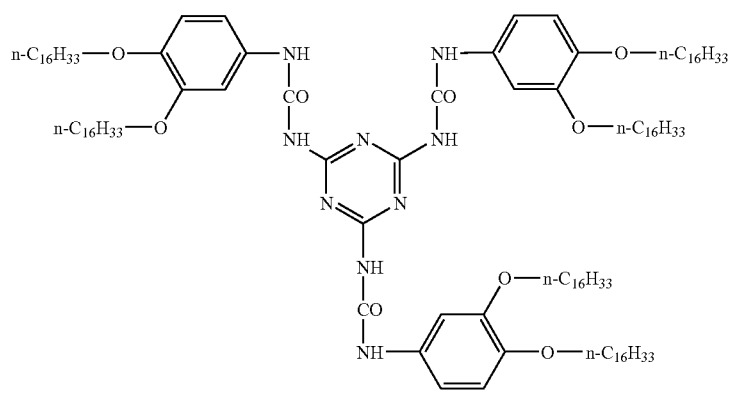
v-(8)
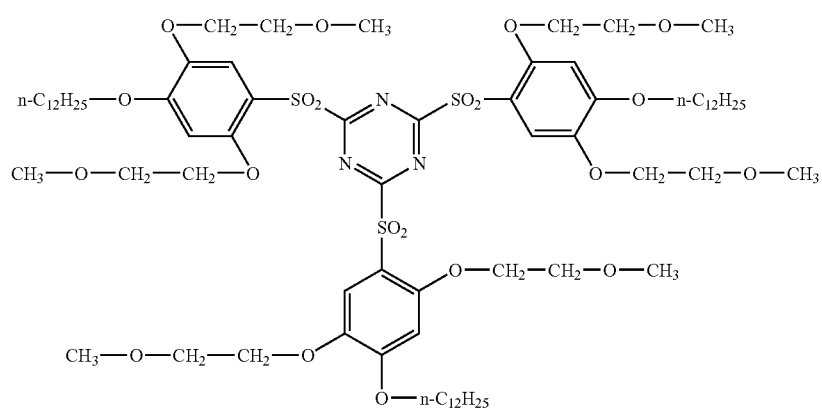
v-(9)
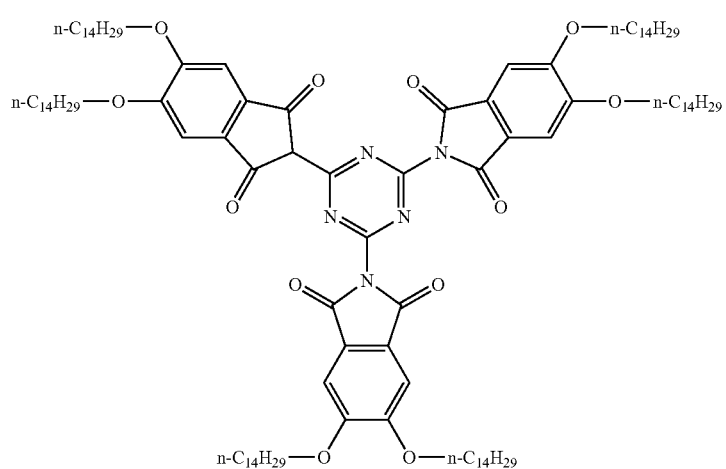
v-(10)
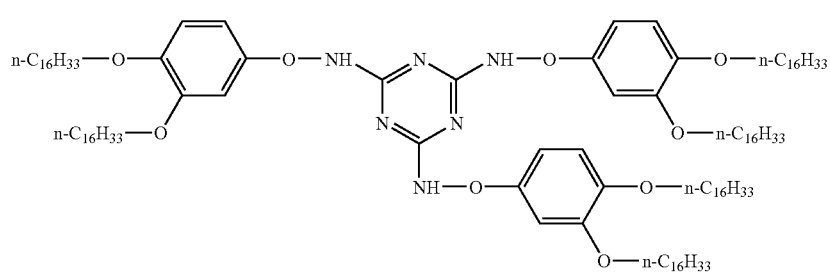

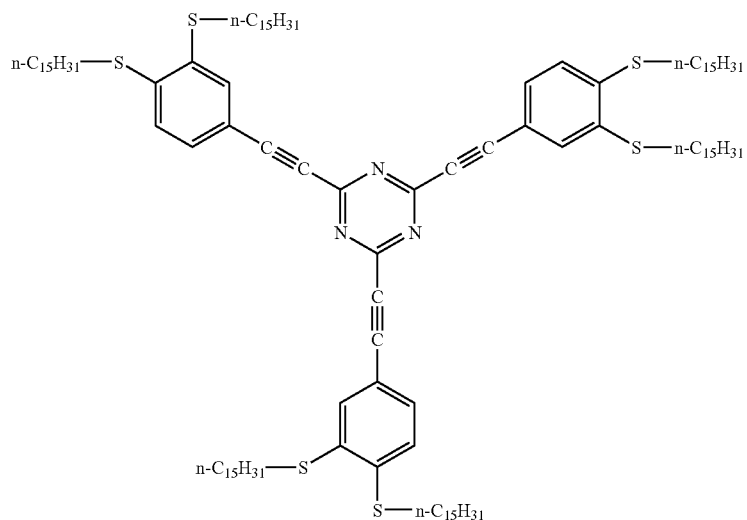
v-(11)
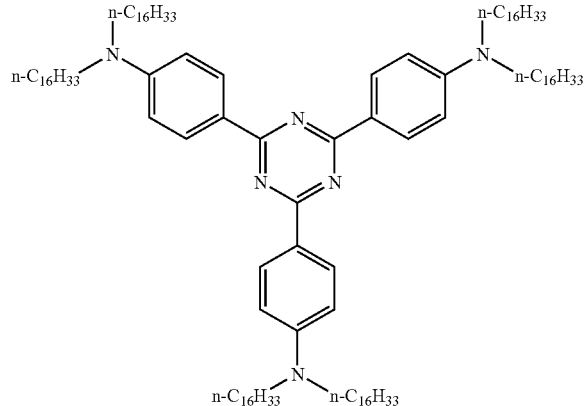
v-(12)
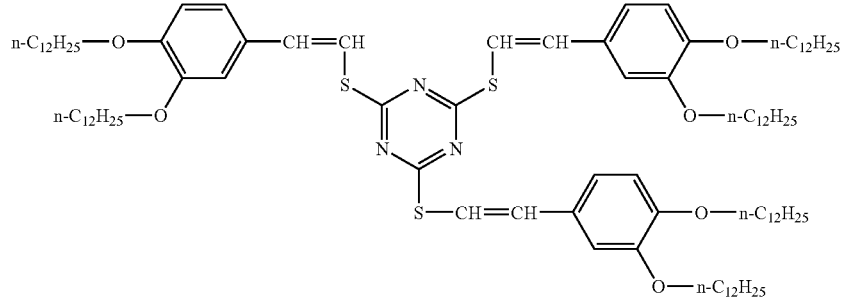
v-(13)
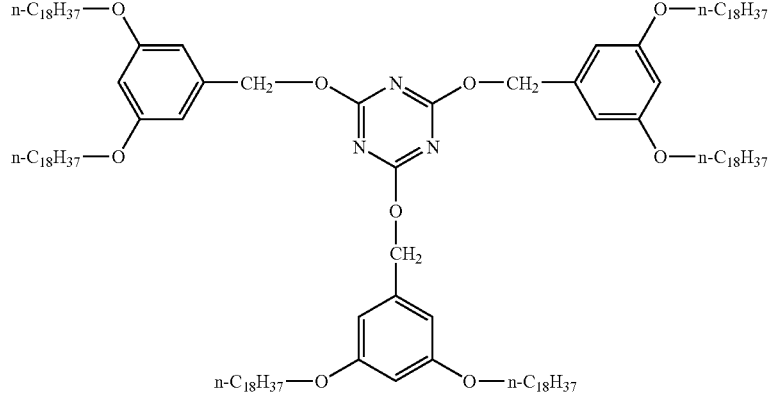
v-(14)

-continued
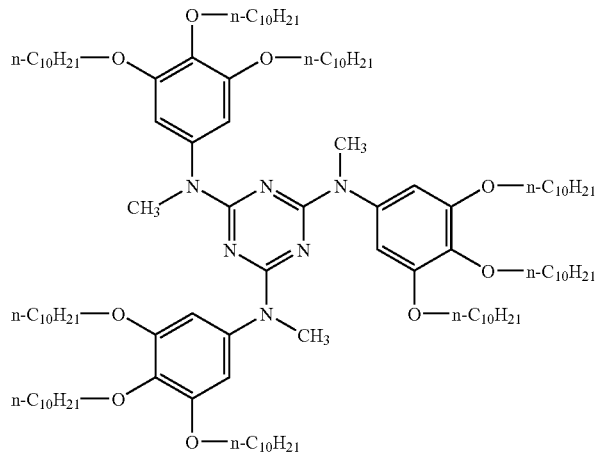
v-(15)
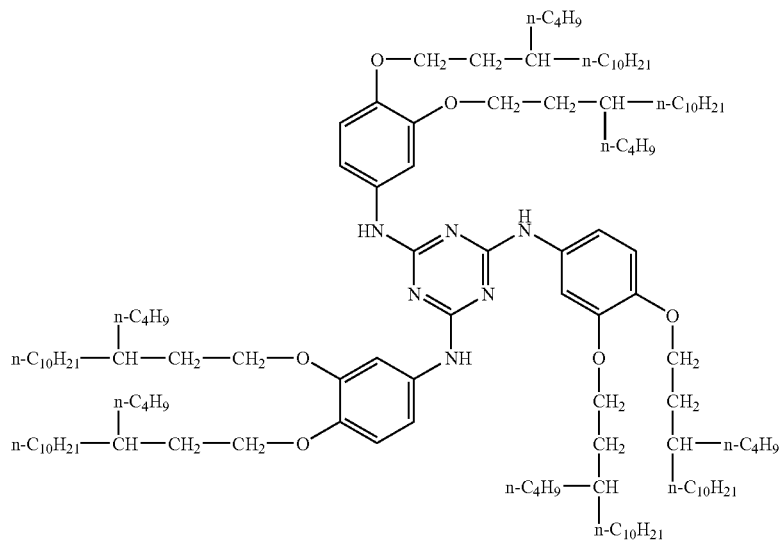
v-(16)
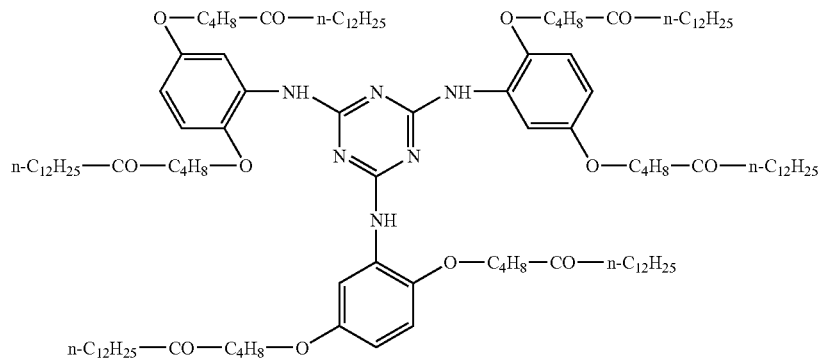
v-(17)

-continued
v-(18)
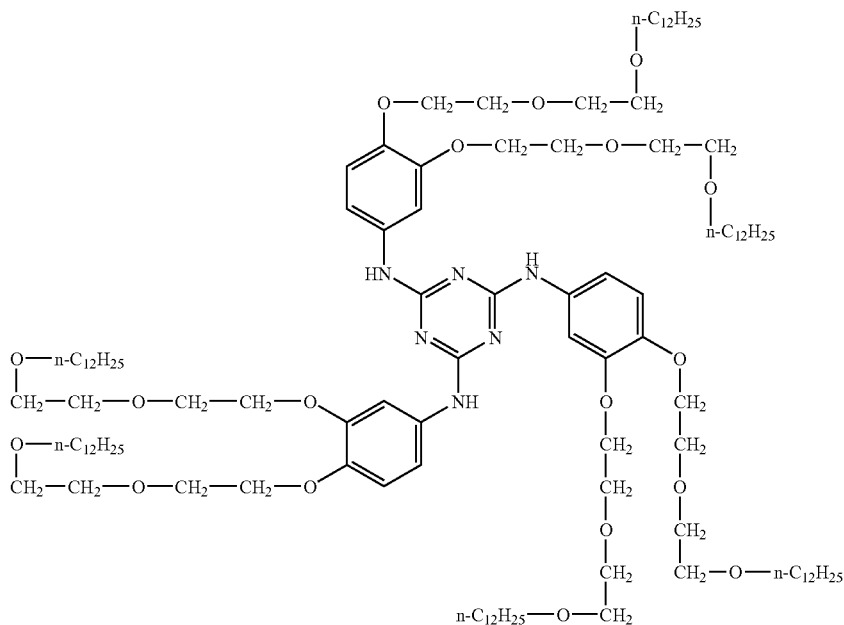
v-(19)
v-(20)
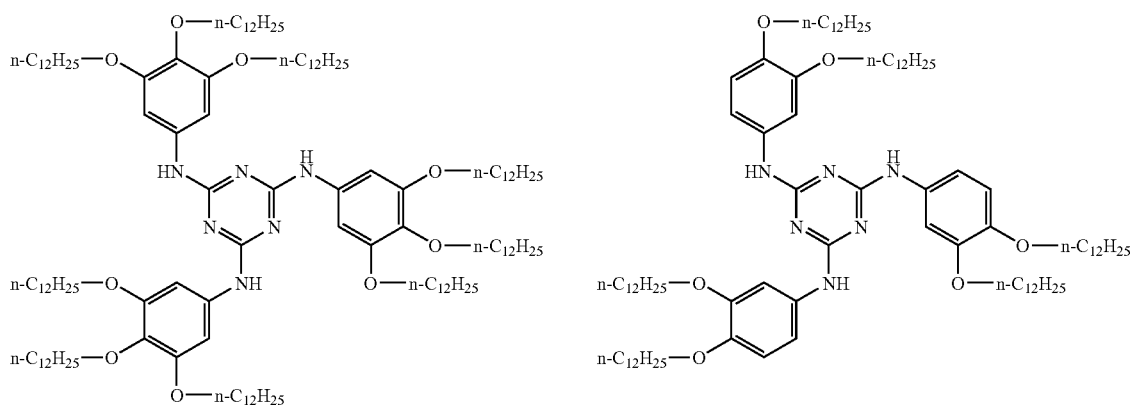
v-(21)
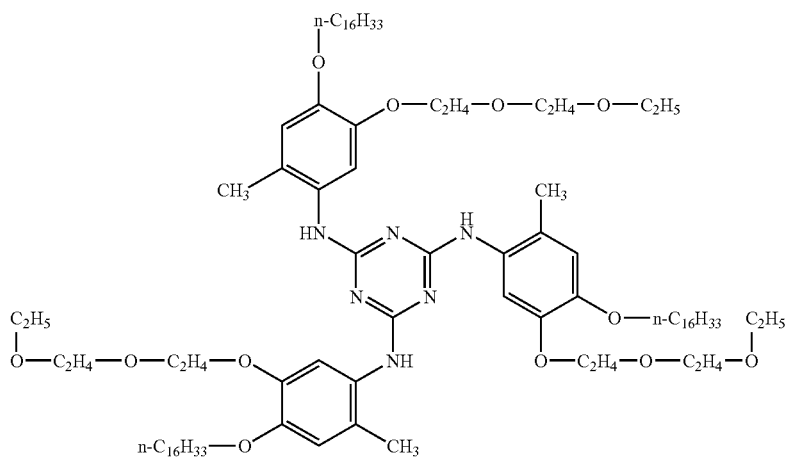

-continued
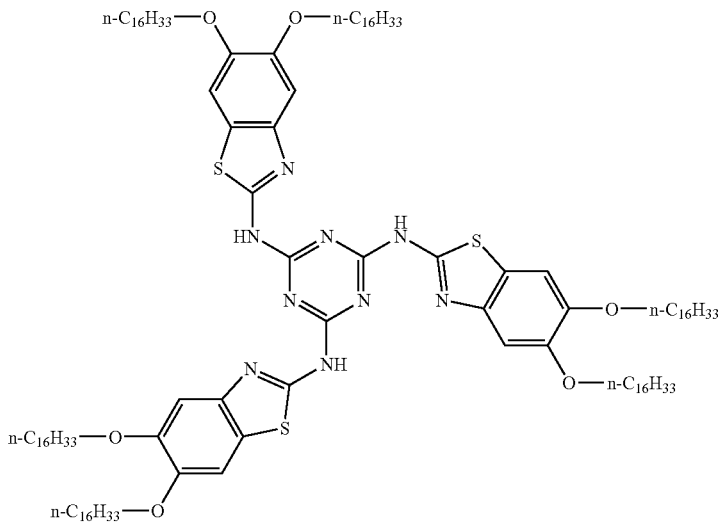
v-(22)
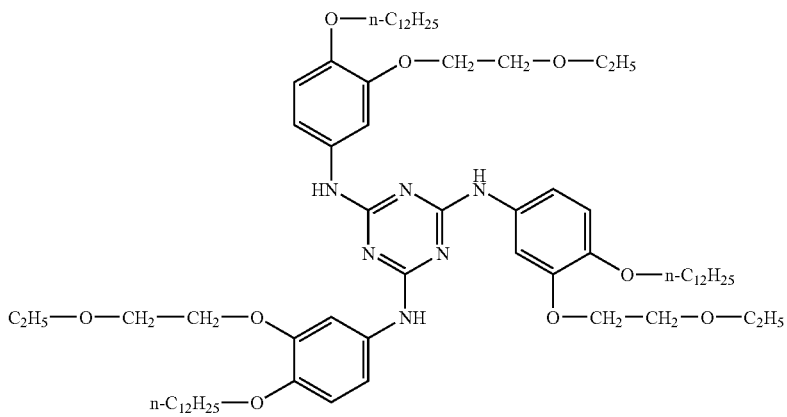
v-(23)
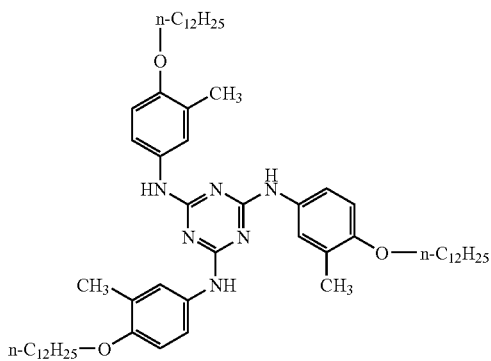
v-(24)
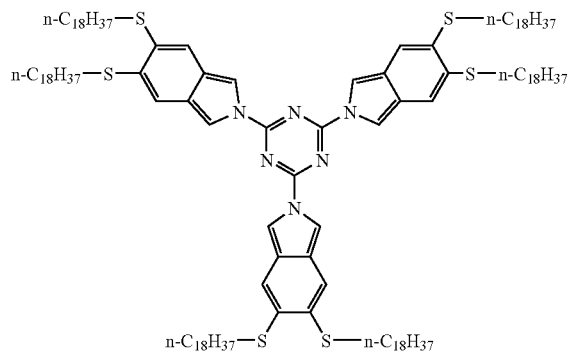
v-(25)

-continued
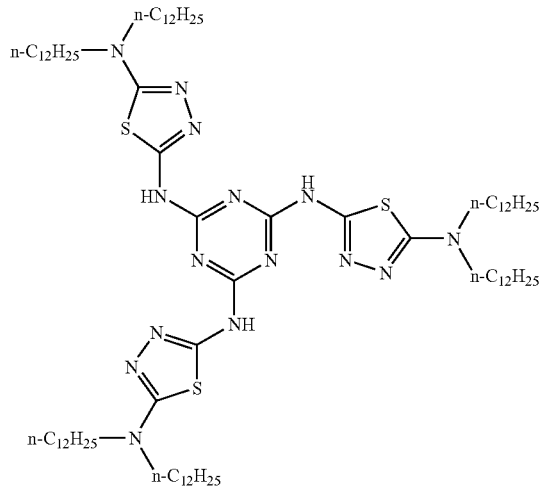
v-(26)
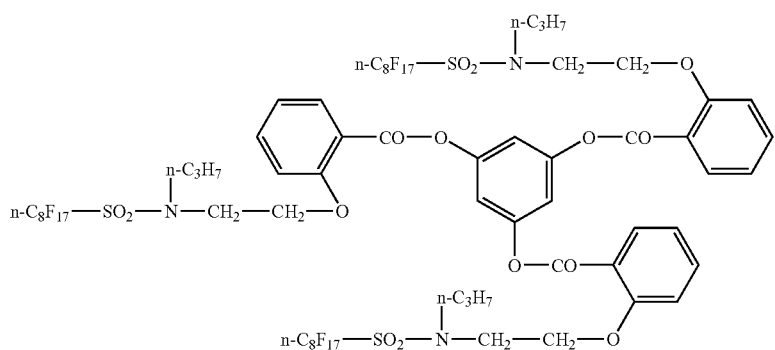
v-(27)
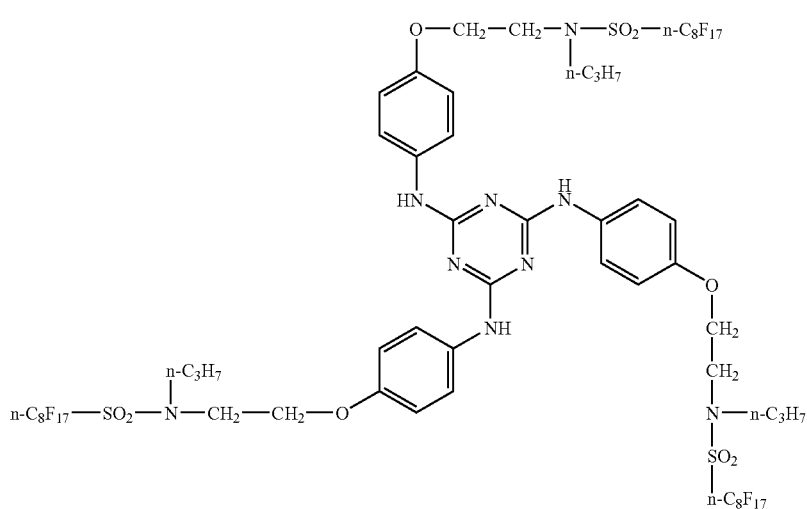
v-(28)

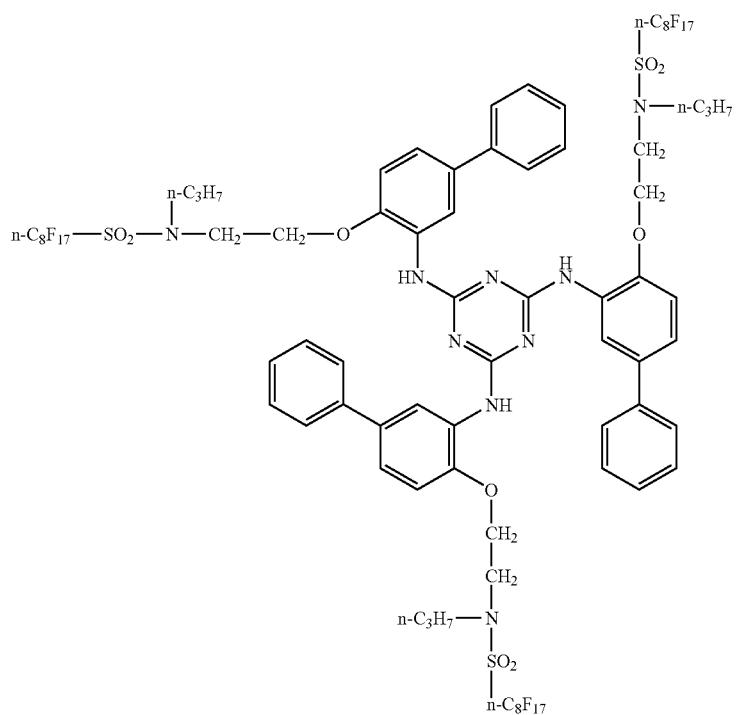
v-(29)
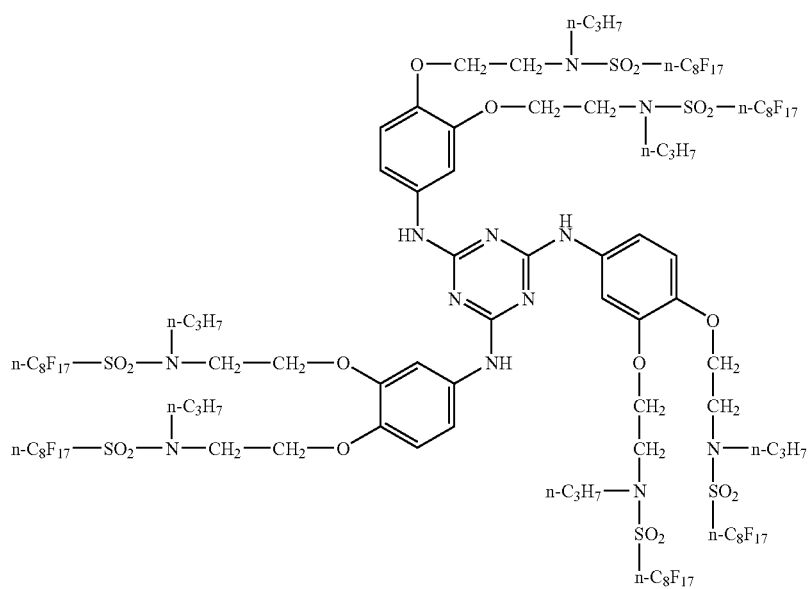
v-(30)

-continued
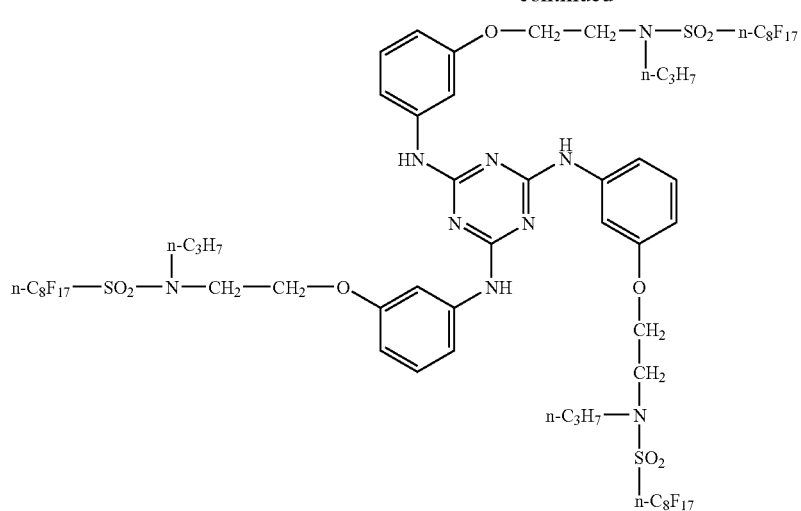
v-(31)
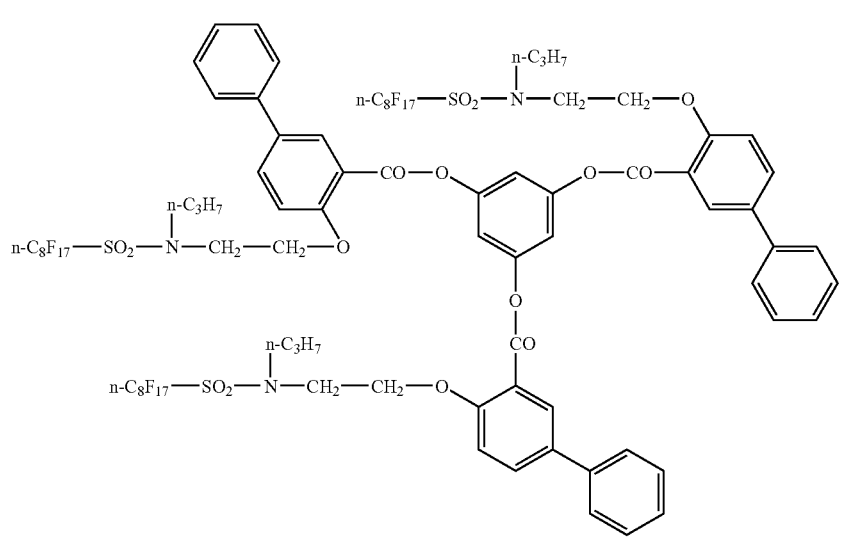
v-(32)
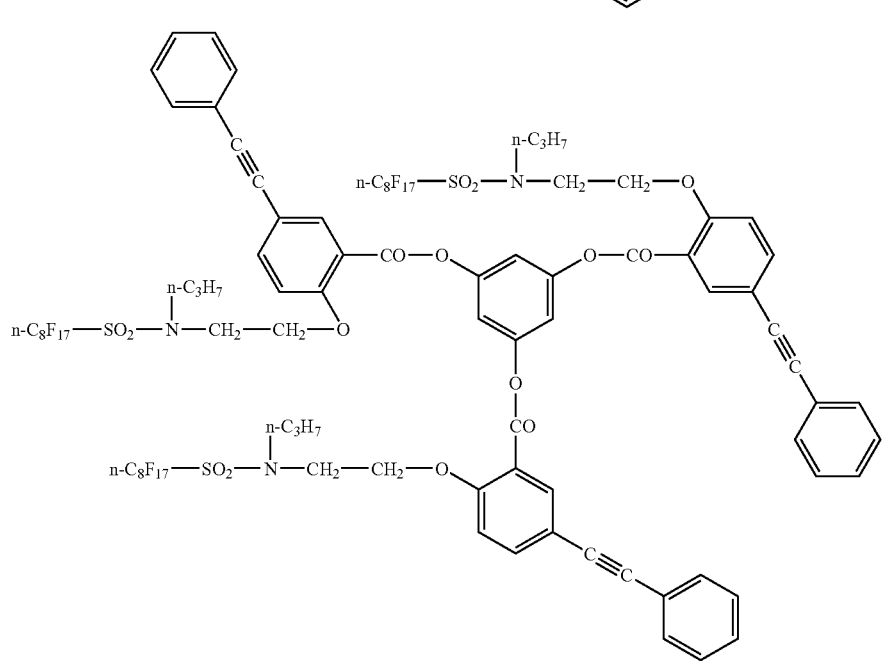
v-(33)

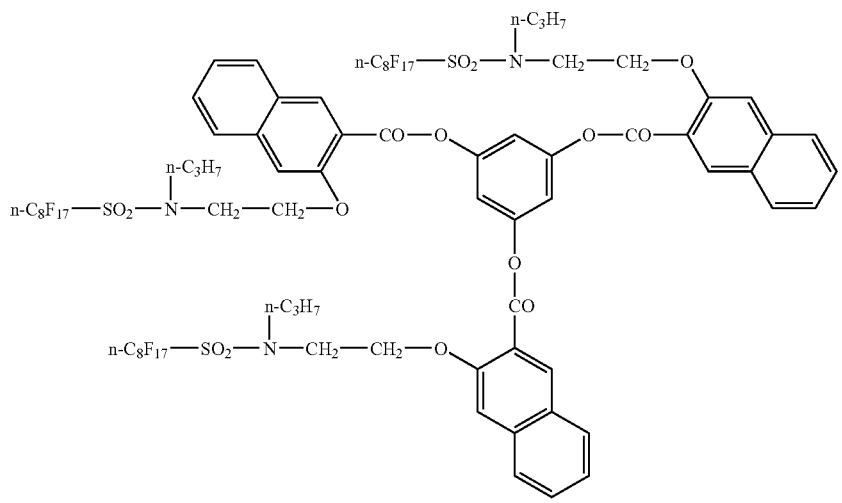
v-(34)
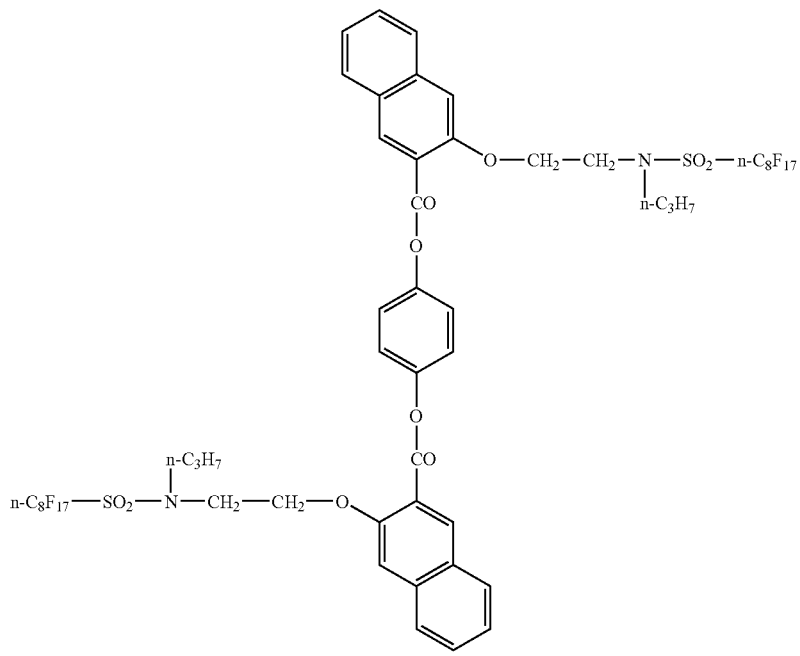
v-(35)
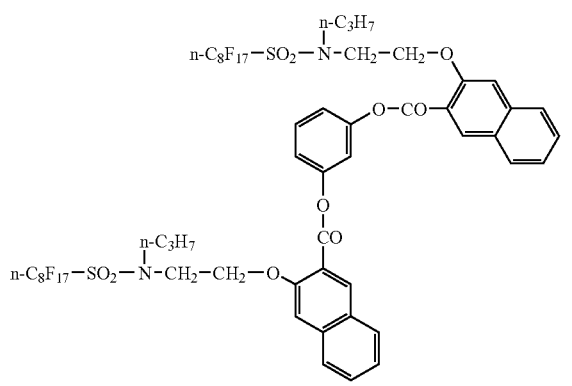
v-(36)
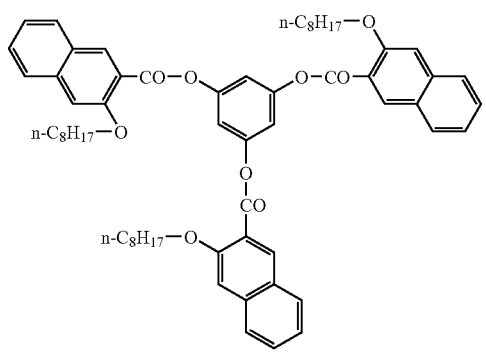
v-(37)

-continued
v-(38)
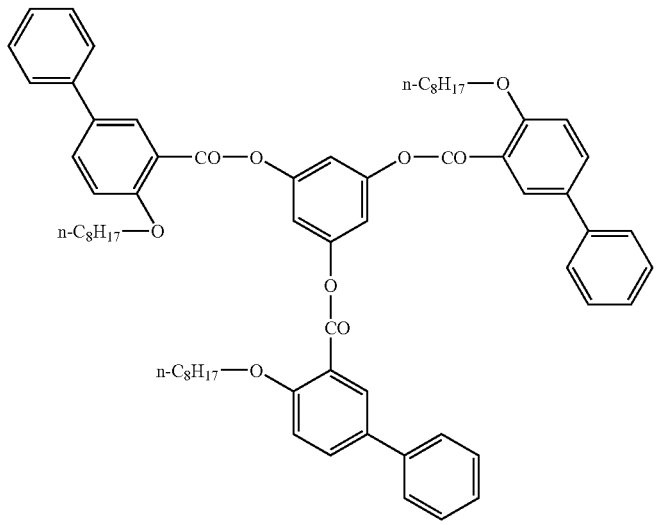
v-(39)
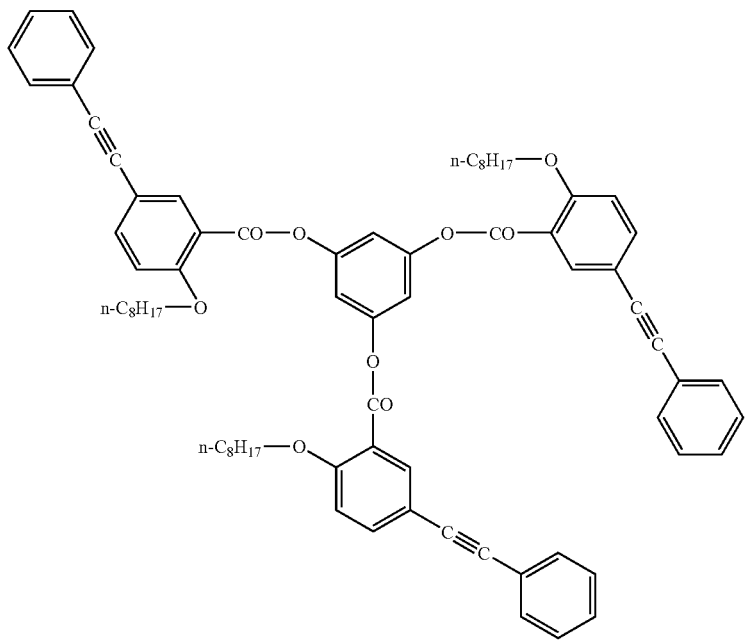
v-(40)
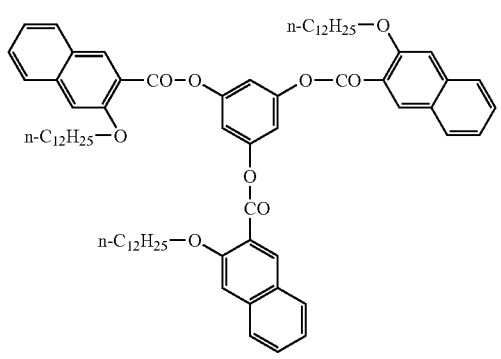
v-(41)
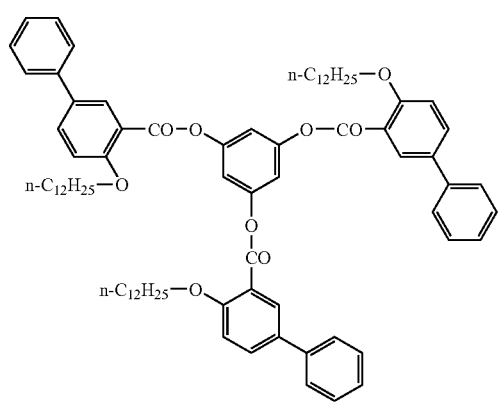

v-(42)
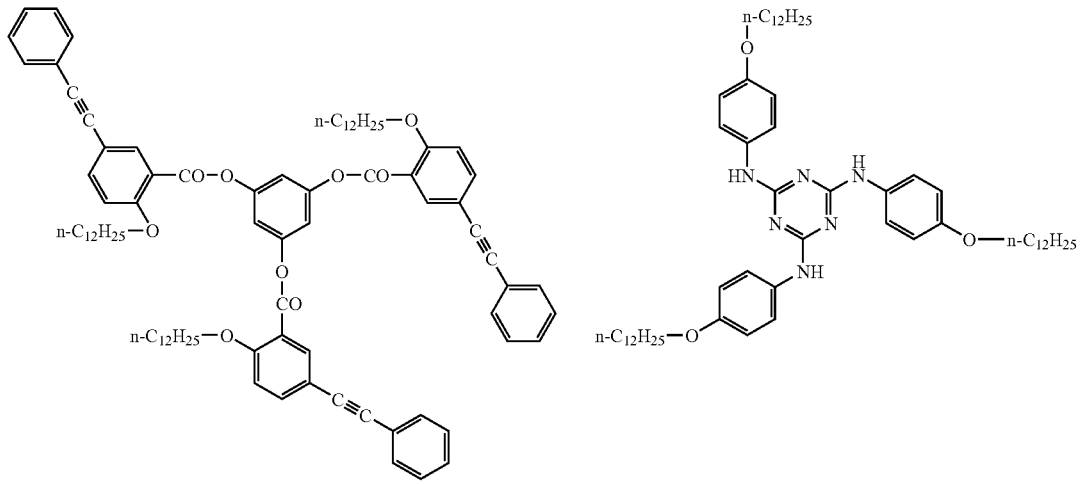
v-(43)
v-(44)
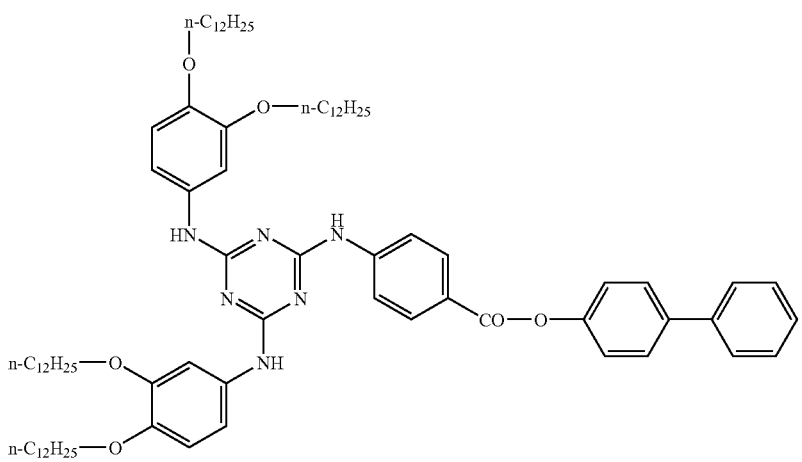
v-(45)
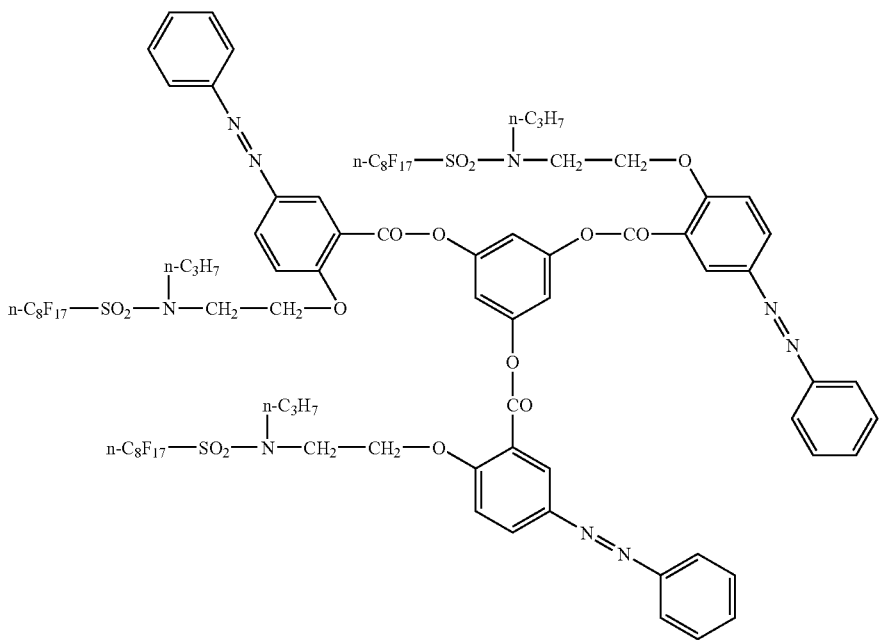

v-(46) 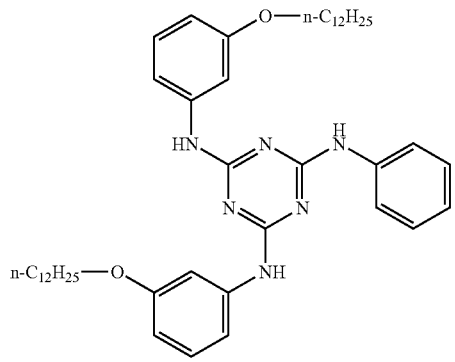

v-(47) 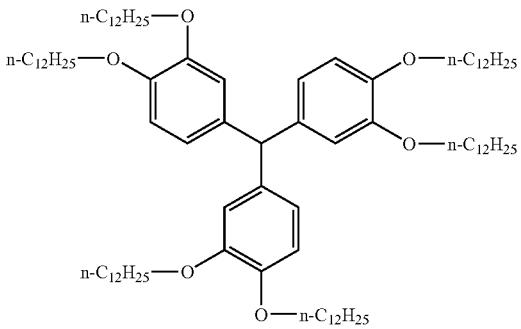

[Alignment Layer]

For aligning rod-like liquid-crystal molecules so as to prepare the optically anisotropic layers respectively, alignment layers may be used. There have been provided alignment layers formed of various materials by various methods such as subjecting a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film). Alignment layers having an alignment effect under an electric or magnetic field or irradiation are also known. According to the present invention, the alignment layer prepared by subjecting a film of a polymer to a rubbing treatment is desirable as an alignment layer for the lower layer. The rubbing treatment is performed by rubbing the surface of the polymer layer in a direction several times with paper or a cloth. In general, rod-like liquid-crystal molecules in a layer formed on an alignment layer are aligned in a direction depending on the rubbing direction of the alignment layer. Thus, it is possible to control the alignment direction of the rod-like liquid-crystal molecules by adjusting the rubbing direction of the alignment layer. When homogeneous alignment layers, which are capable of aligning liquid-crystal molecules in a homogeneous alignment state, are employed in the present invention for the first and second optically anisotropic layer, preferably, one of them has a rubbing axis inclined +30 degrees relative to the longitudinal direction and the other has a rubbing axis inclined −30 degrees relative to the longitudinal direction.

Materials for preparing the alignment layer are not specifically limited and may be selected depending on desired liquid-crystal alignment (especially a mean tilt angle). In order to align the liquid-crystal molecules homogeneously, a polymer used in preparing an alignment layer is desirably selected so as not to lower the surface energy of the alignment layer. Specific examples of the polymers are described in various literatures relating to liquid-crystal cells or optical compensation sheets. For improving adhesion between the liquid-crystal compound and the transparent substrate, the alignment layer is desirably formed of a polymer having a polymerizable group. The polymerizable group may be introduced to the polymer as a portion in a side chain of a repeating unit constituting the polymer or as a cyclic substituent group of the polymer. The polymers capable of forming chemical bonds with liquid-crystal molecules at the interface between the alignment layer and the lower layer are desirably used, and alignment layers formed of such polymers are described in JPA No. 1997-152509.

The thickness of the alignment layer is preferably 0.01 to 5 micro meters, and more preferably 0.05 to 1 micro meters.

For preparing a first optically anisotropic layer, the alignment layer may be formed on a temporary substrate and an optically anisotropic layer may be formed by aligning the liquid-crystal compound on the alignment layer and then transferred onto a transparent substrate such as a plastic film. The liquid-crystal compound can maintain an alignment without any alignment layer after being fixed in the alignment. Additionally, for preparing a second optically anisotropic layer on a first optically anisotropic layer, a surface of the first optically anisotropic layer may be subjected to a rubbing treatment directly and a composition comprising a liquid-crystal compound may be applied to the rubbed surface to prepare the second optically anisotropic layer. Thus, the retarder of the present invention doesn't necessarily comprise an alignment layer.

[Substrate]

The substrate is transparent desirably. In particular, the substrate preferably has a transmittance of 80% or more. The substrate with low wave length dispersion is used desirably. In particular, the substrate has an Re400/Re700 ratio of less than 1.2 desirably. The substrate has a small optical anisotropy desirably. In particular, the substrate desirably has an in-plane retardation (Re) of 20 nm or less, and more preferably 10 nm or less. The long substrate has the form of a roll or a rectangular sheet. Preferably, the first and second layers are prepared on a substrate in the form of a roll, thereby forming a multilayer roll, and then the multilayer roll is cut into a desirable size.

Materials for the substrate include, but not specifically limited to, glass plates or polymer films, among which polymer films are preferred to obtain light-weight thin-layer products. Examples of polymers include cellulose esters, polycarbonates, polysulfones, polyether sulfones, polyacrylates and polymethacrylates, preferably cellulose esters, more preferably acetyl cellulose, most preferably triacetyl cellulose. The polymer films are preferably formed by solvent casting. The thickness of the transparent substrate is preferably 20 to 500 micro meters, more preferably 50 to 200 micro meters. The transparent substrate may be subjected to a surface treatment (e.g., glow discharge treatment, corona discharge treatment, UV treatment, flame treatment) to improve adhesion between the transparent substrate and the overlying layer (an adhesive layer, orthogonal alignment layer or optically anisotropic layer). An adhesive layer (undercoat layer) may be provided on the transparent substrate.

[Circular Polarizer Plate]

The retarder of the present invention is most advantageous when it is applied to a quarter wave plate used for reflective-type liquid-crystal display devices, write pickups for optical disks, or anti-reflective films. The quarter wave plate is generally configured as a circular polarizer plate as being combined with a linear polarizer film. Therefore the quarter wave plate configured as a circular polarizer plate as being combined with a linear polarizer film can readily be incorporated into devices such as having functions of reflective-type, liquid-crystal display devices. Known types of the linear polarizer film include iodine-containing polarizer film, dye-containing polarizer film using dichroic dye, and poly-ene containing polarizer film. The iodine-containing polarizer film and dye-containing polarizer film are generally manufactured using poly(vinyl alcohol)-base films.

The present invention employs a linear polarizer film having a transparent axis inclined substantially at +45 degrees or −45 degrees relative to the longitudinal direction of the film (simply referred to as "45° linear polarizer film"). Since usually a linear polarizer film composed of a stretched film has a transparent axis substantially parallel to a stretching direction, a 45° linear polarizer film can be prepared by stretching a film in a direction inclined at 45 degrees relative to the longitudinal direction of the film.

[45° Polarizer Film]

Figure 3:
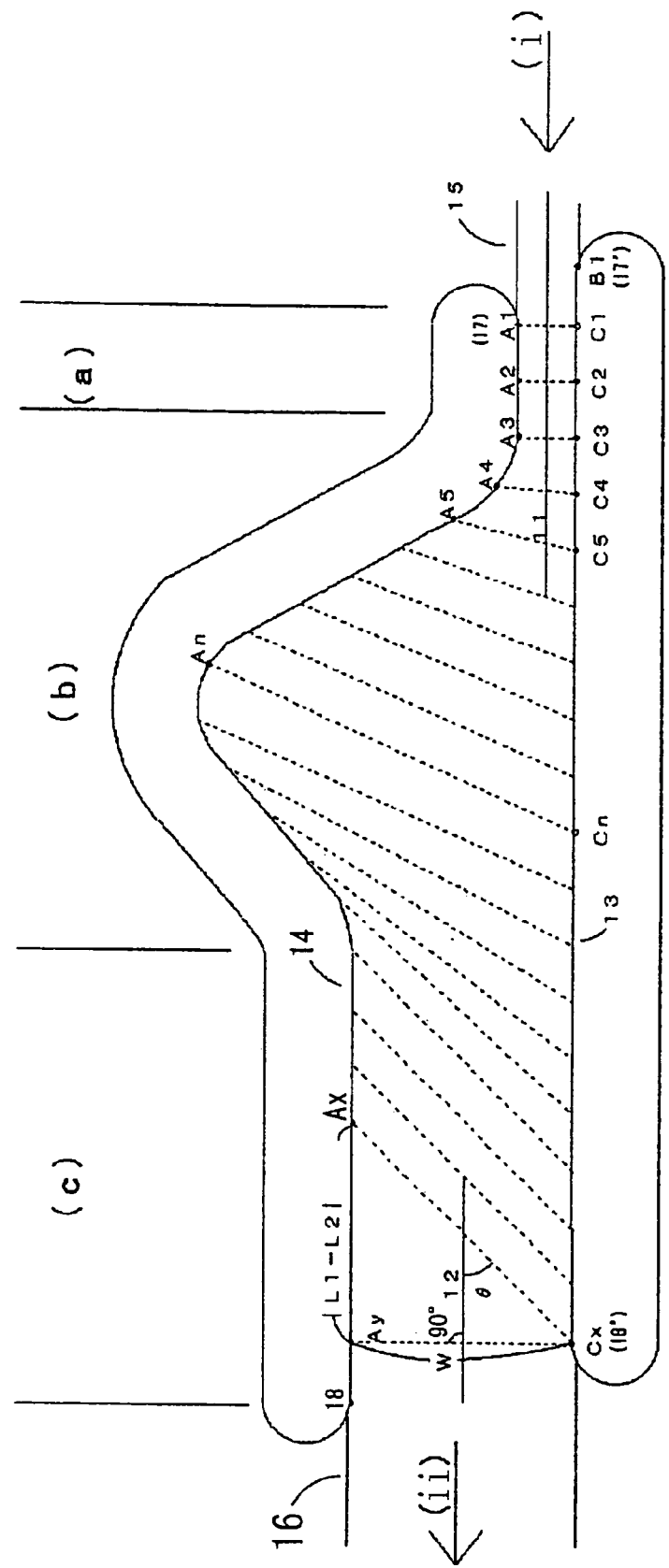
FIG. 3 is a schematic plan view showing an exemplary process of oblique stretching of a polymer film in the method of the present invention.
Figure 4:
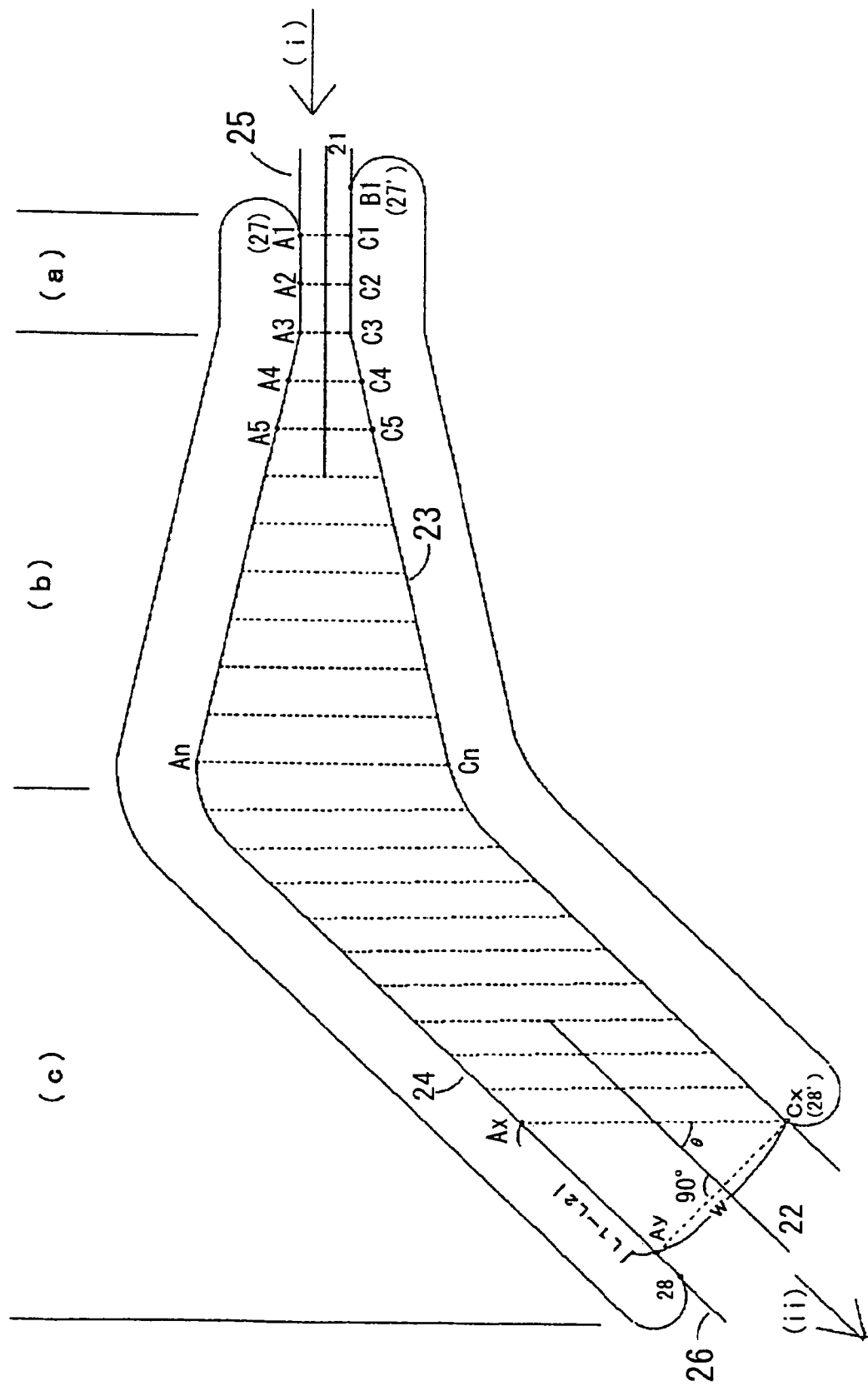
FIG. 4 is a schematic plan view showing another exemplary process of oblique stretching of a polymer film in the method of the present invention.

FIGS. 3 and 4 show schematic plan views of an exemplary process of oblique stretching of a polymer film.

The stretching process comprises a step of introducing a source film indicated by range (a) along the direction of arrow (i); a step of effecting width-wise-direction stretching as indicated by range (b); and a step of feeding the stretched film indicated by range (c) to the next process step, or to the direction of arrow (ii). It is to be understood that any notation of "stretching step" hereinafter indicates the entire process of executing the stretching method including the steps (a) to (c).

The film is continuously fed from direction (i), and is held by a holding means located on the left edge side as viewed from the upstream at point B1 for the first time. At this point of time, the opposite edge of the film is not held yet, so that there is still no tensile force exerted in the width-wise direction. Point B1 is therefore not understood as a substantial starting point for holding in the stretching process.

In the stretching process, the true substantial hold-start point is defined by a point where the both edges of the film are held for the first time. The substantial hold-start point is expressed by a pair of points comprising hold-start point A1 on the further downstream side, and point C1 which falls on the intersection of the line drawn from point A1 substantially normal to the center line 11 (FIG. 3) or 21 (FIG. 4) of the film on the feeding side with a locus 13 (FIG. 3) or 23 (FIG. 4) of the opposite holding means.

When the holding means on both sides travel at a constant speed from these start points, point A1 moves to points A2, A3, . . . , An as being scaled by a unit time, and point C1 similarly moves to points C2, C3, . . . , Cn. That is, a line connecting the points An and Cn, where the referential holding means pass at the same time, expresses the stretching direction at that point of time.

In the stretching process, An gradually falls behind Cn as shown in FIGS. 3 and 4, and this makes the stretching direction incline away from the direction normal to the travel direction. A point where the holding is substantially released in the stretching process is defined by a pair of points comprising point Cx where the film is released from the holding means on the upstream side, and point Ay which falls on the intersection of the line drawn from point Cx substantially normal to the center line 12 (FIG. 3) or 22 (FIG. 4) of the film to be sent to the next process with a locus 14 (FIG. 3) or 24 (FIG. 4) of the opposite holding means.

Final angle of the stretching direction of the film is determined by a ratio of path difference Ay-Ax (i.e., |L1-L2|) of the left and right holding means at the substantial end point (substantial hold-release point) of the stretching process and distance W (distance between Cx and Ay) of the substantial hold-release point. Therefore, an angle of inclination θ of the stretching direction away from the sending direction towards the next process is defined as an angle satisfying the equations below:

$$\tan θ = W/(Ay-Ax), \text{ or}$$

$$\tan θ = W/|L1-L2|$$

Although the upper film end shown in FIGS. 3 and 4 is held after passing point Ay until point 18 (FIG. 3) or 28 (FIG. 4) is reached but the lower end of the film is not held, so that, there is no more tensile force newly generated. Points 18 and 28 are therefore not understood as substantial hold-release points in the present invention.

As described in the above, the substantial hold-start points reside on both edges of the film in this stretching process are not mere points where engagement into the left and right holding means take place. According to more strict expression of the above definition, the two above substantial hold-start points in the stretching process can be defined as a pair of two holding points which reside most upstream among pairs of the holding points respectively allowing that a line connecting either left or right holding point with the other holding point crosses approximately normal to the center line of the film to be sent to the process in which the film is held.

Similarly, the two above substantial hold-release points in the stretching process can more strictly be defined as a pair of two holding points which reside most downstream among pairs of the holding points respectively allowing that a line connecting either left or right holding point with the other holding point crosses approximately normal to the center line of the film to be sent to the next process.

It is to be understood that "approximately normal" stated herein means that the center line of the film and a line connecting the left and right substantial hold-start points or substantial hold-release points cross at 90±0.5 degrees.

For the case where the difference in the left and right paths in the above stretching process is created using a tenter-type stretching machine, a large difference may occur between the point of engagement into the holding means and the substantial hold-start points, or between the point of release from the holding means and the substantial hold-release points, due to mechanical restrictions such as rail length. Purpose of the stretching process can, however, be achieved if the process between the substantial hold-start points and the substantial hold-release points satisfies the relation of (1) |L2−L|>0.4 W.

Angle of inclination of the orientation axis of the stretched film obtained in the above process can be controlled and adjusted based on the ratio of width W of the exit from step (c) and path difference |L1−L2| between two substantial holding means on the left and right.

It is often required for polarizer plates and wave retarder films to have a film oriented at 45° relative to the longitudinal directions thereof. In order to achieve an angle of orientation close to 45 degrees, it is preferable to satisfy the relation of (2)

0.9 W<|L1−L2|<1.1 W, is more preferable to satisfy the relation of (3) 0.97 W<|L1−L2|<1.03 W.

Specific configuration of the stretching process can arbitrarily be designed as shown in FIGS. 3 to 8 considering facility costs and productivity, so far as the relation (1) is satisfied.

An arbitrary value can be adopted for the angle between the film feeding direction (i) into the stretching process and the film sending direction (ii) towards the next process step, where smaller angle is better in view of minimizing the total installation area of the facility including the process steps before and after the stretching process, which is preferably 3 degrees or less, and more preferably 0.5 degrees or less. These values can be attained by exemplary configurations shown in FIGS. 3 and 6.

In such methods where the film traveling direction does not substantially change, it is difficult to obtain an angle of orientation of 45 degrees, suitable for polarizer plates and wave retarder films, relative to the longitudinal directions thereof solely by widening the distance between the holding means. One possible process is such as having a step of once stretching the film, and then shrinking it to thereby increase |L1−L2|, as shown in FIG. 3.

Figure 6:
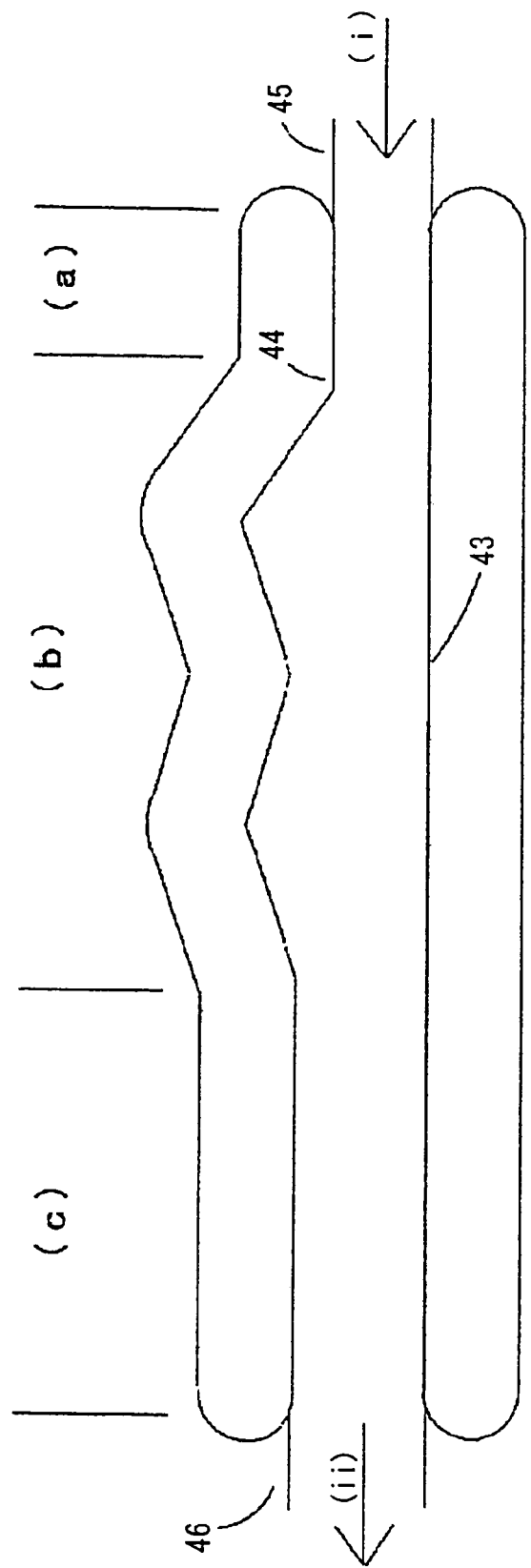
FIG. 6 is a schematic plan view showing another exemplary process of oblique stretching of a polymer film in the method of the present invention.

Stretching ratio is preferably 1.1 to 10.0 times, more preferably 2 to 10 times, and shrinkage ratio thereafter is preferably 10% or more. It is also preferable, as shown in FIG. 6, to repeat stretching-and-shrinkage a plural number of times because |L1−L2| can be increased.

Figure 5:
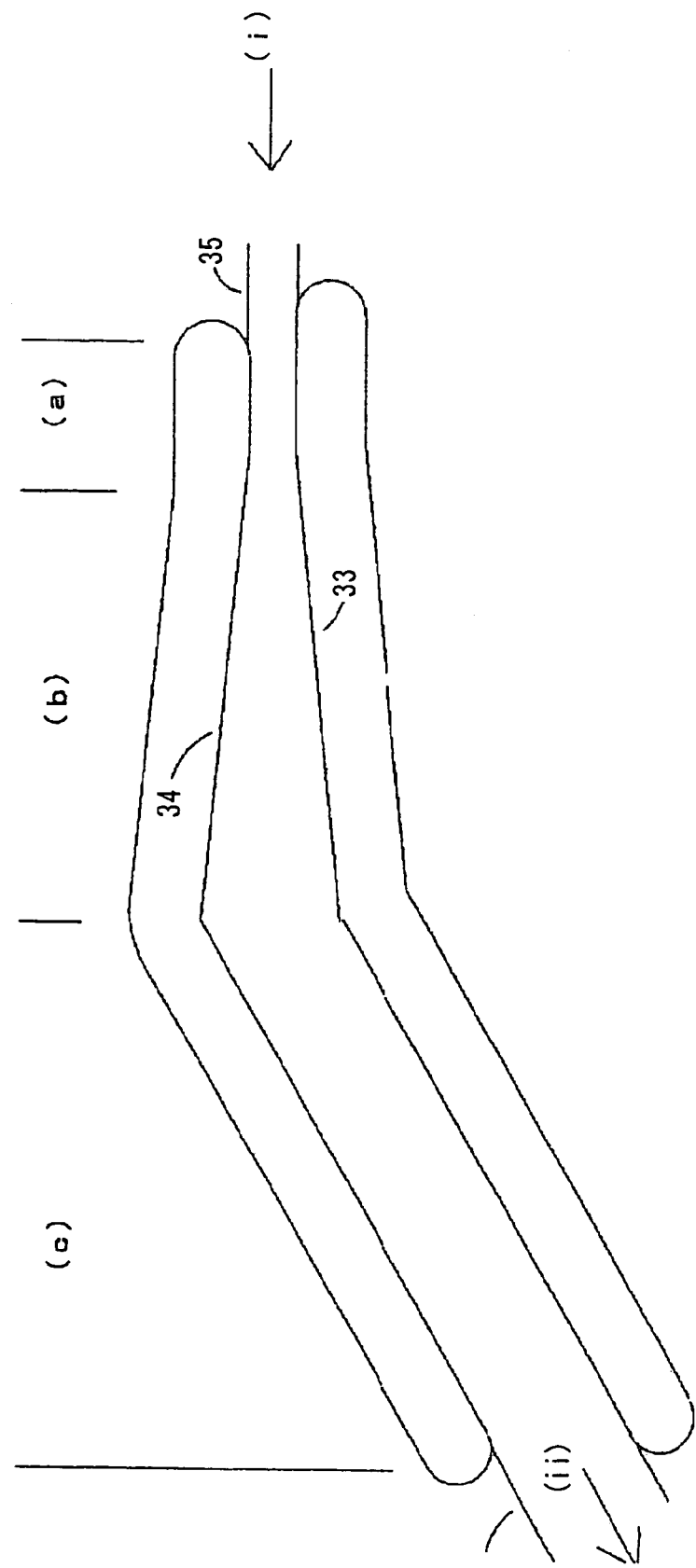
FIG. 5 is a schematic plan view showing another exemplary process of oblique stretching of a polymer film in the method of the present invention.
Figure 7:
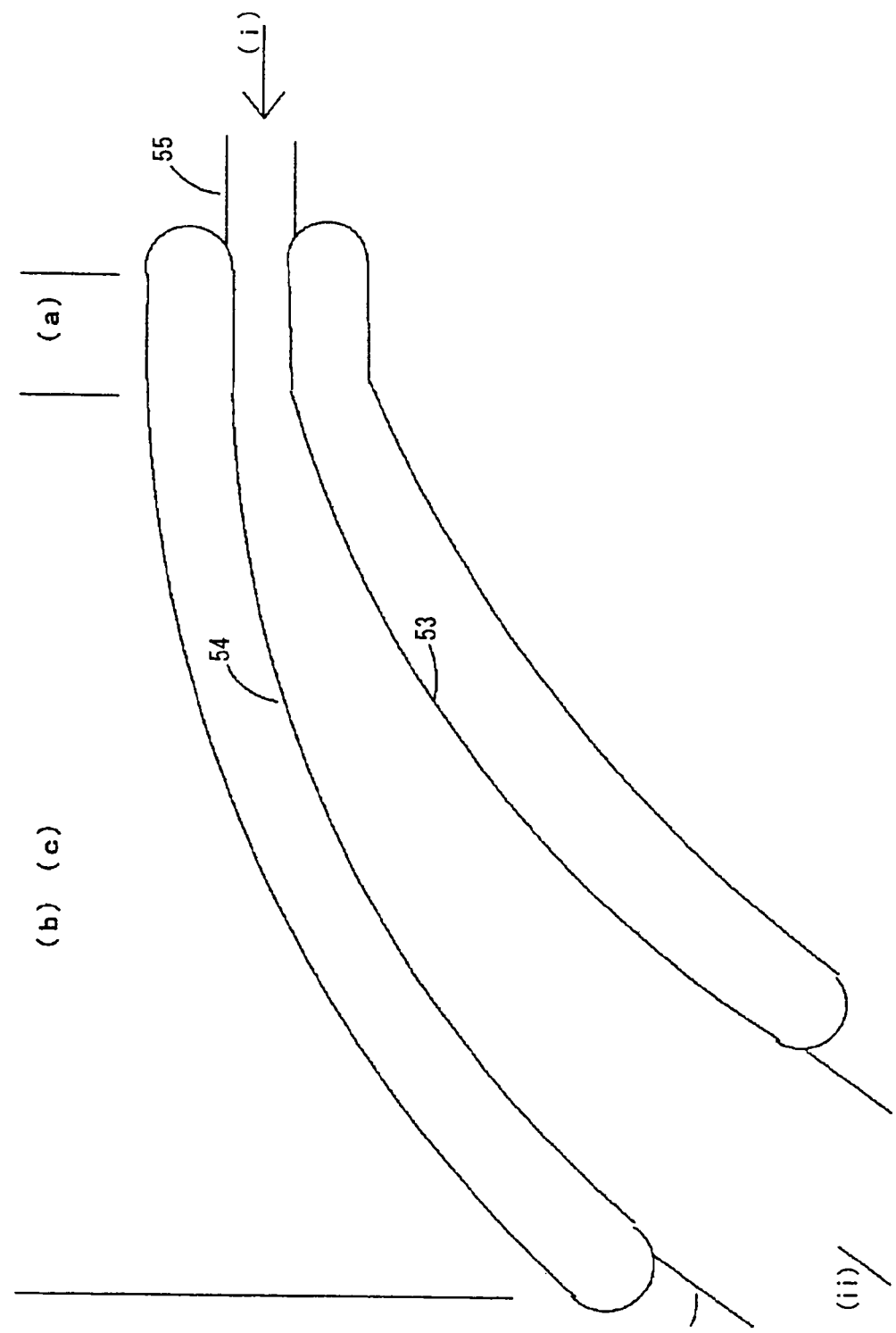
FIG. 7 is a schematic plan view showing another exemplary process of oblique stretching of a polymer film in the method of the present invention.

In view of minimizing the facility costs of the stretching process, a smaller number and a smaller angle of the bend in the loci of the holding means are better. From this viewpoint, as shown in FIGS. 4, 5 and 7, the traveling direction of the film is preferably bent while keeping the film held at both edges thereof, so that the traveling direction of the film at the exit of the process during which both edges of the film are held is inclined at 20 to 70 degrees relative to the substantial stretching direction of the film.

Figure 8:
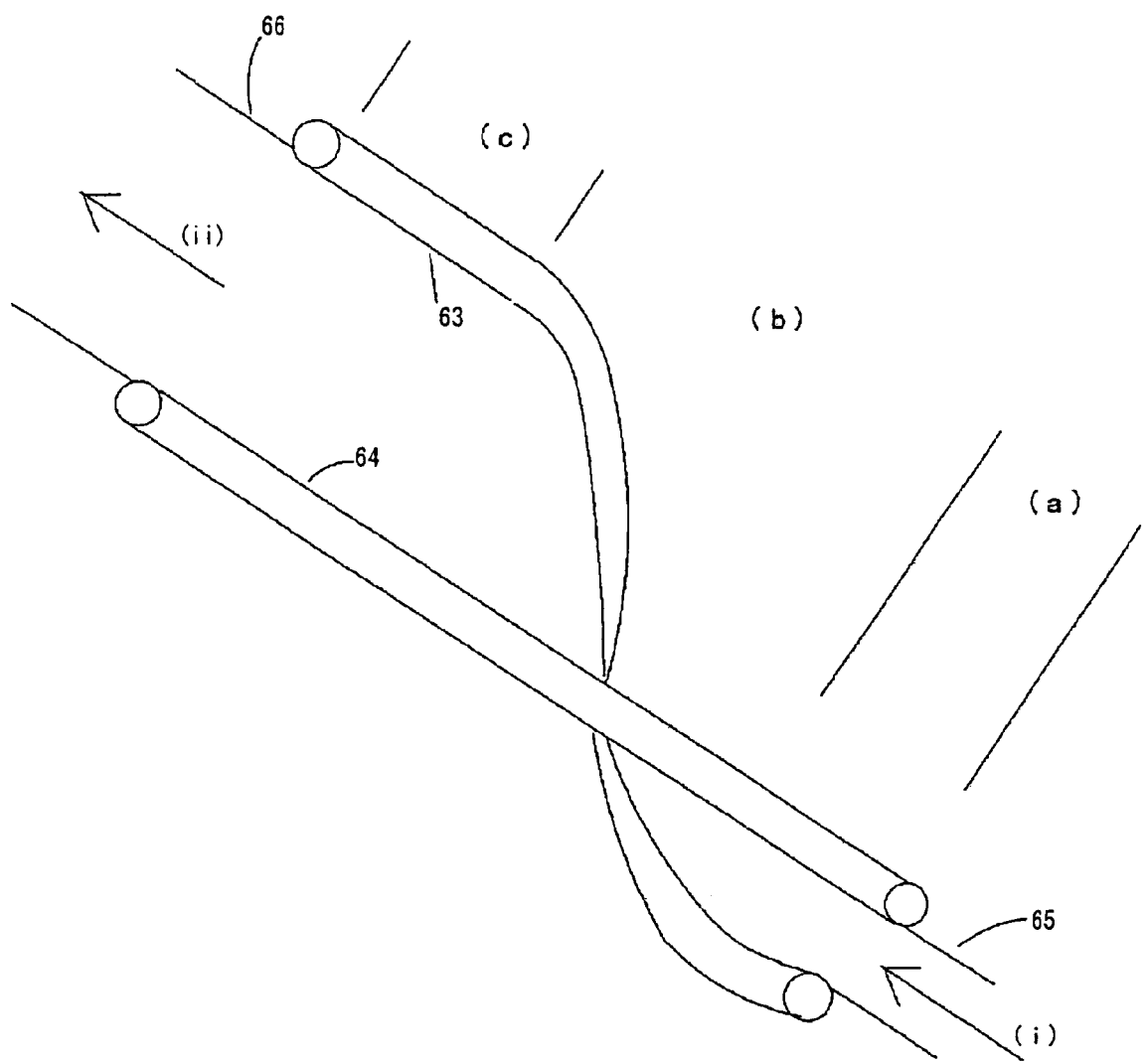
FIG. 8 is a schematic plan view showing another exemplary process of oblique stretching of a polymer film in the method of the present invention.

So-called tenter machines as shown in FIGS. 3 to 7 are preferably used as an apparatus for stretching the film while keeping the both edges thereof held under tension during the stretching. Besides the conventional two-dimensional tenters, it is also allowable to use a tenter as shown in FIG. 8, in which a spiral path difference generates between the holding means on both edges.

Most tenter stretchers are configured so that a chain having clips fixed thereto is guided along the rails, where any laterally-unbalanced stretching process as described in the above may shift the ends of the rails at the entrance and exit of the process as shown in FIGS. 3 and 4, and this may prevent simultaneous engagement or release on both edges. The substantial lengths of path L1, L2 in this case are not expressed merely by a distance between the points of engagement and release but, strictly as described in the above, a length of path over which both edges of the film are held by the holding means.

Because any difference in the traveling speed on both edges of the film at the exit of the stretching process is causative of wrinkle or gather, travel speeds of the holding means on both lateral sides of the film must be substantially equivalent. Allowable difference in the speed is preferably 1% or less, more preferably 0.5% or less, and still more preferably 0.05% or less. The speeds stated herein refers to lengths of loci along which the individual left and right holding means advance per minute. General tenter stretchers have variation in the speed in the order of second or less depending on periodicity of sprocket teeth or frequency of a drive motor, which often amounts several percents. This is, however, not included in the difference in speed in the context of the present invention.

The film tends to cause wrinkle or gather as the path difference between the left-hand side and right-hand side increases. To solve this problem, it is preferable to carry out the stretching while keeping the supportability of the polymer film and keeping the volatile fraction at 5% or above, and then allow the film to shrink to thereby lower the volatile fraction. Possible methods for allowing the film to contain volatile components are such as casting the film so as to take up the solvent or water, such as subjecting the film to immersion, coating or spraying with the solvent or water before the stretching, and such as coating the solvent or water during the stretching. Because hydrophilic polymer films such as polyvinyl alcohol films can usually contain water under a high-temperature, high-humidity atmosphere, volatile components can be included in such films by stretching the films after being conditioned under a high-humidity atmosphere, or by stretching the film under a high-humidity atmosphere. Any other methods are available so far as they can adjust contents of volatile components in the polymer film to as high as 5% or above.

Preferable volatile fraction may differ by species of the polymer film, and can be maximized so far as the supportability of the polymer film is retained at a desirable level. The volatile fraction is preferably within a range from 10 to 100% for polyvinyl alcohol, and 10 to 200% for cellulose acylate. Shrinkage of the stretched polymer film can be effected in either timing of during or after the stretching. While a means for shrinking the film is typified by raising of the temperature so as to remove the volatile contents, any other methods may be allowable so far as they can successfully shrink the film.

As has been described in the above, a preferable embodiment of the stretching process satisfies the conditions that:

(i) the film is stretched by at least 1.1 to 20.0 times in the width-wise direction thereof;

(ii) the difference in the longitudinal traveling speed between the holding means on both edges of the film is 1% or less;

(iii) the traveling direction of the film is bent while both edges thereof are held, so that the traveling direction at the exit of the process is inclined at 20 to 70 degrees relative to the substantial stretching direction; and (iv) the film is stretched while keeping the supportability of the polymer film and a keeping the volatile fraction contained therein at 5% or above, and then shrunk to thereby lower the volatile fraction.

It is often necessary for the rails used for limiting the loci of the holding means in the present invention to have a large bending ratio. For the purpose of avoiding mutual interference between the holding means due to a sharp bending, or local stress concentration, the rails are preferably designed so that the holding means can trace arc loci.

There are no special limitations on the polymer film to be stretched in the present invention, so that films comprising any appropriate thermoplastic polymer are available. Examples of the polymer include PVA, polycarbonate, cellulose acylate and polysulfone.

While thickness of the film before stretching is not specifically limited, it is preferably 1 micro meters to 1 mm from the viewpoints of stability in holding of the film and uniformity in the stretching, where the thickness is more preferably 20 to 200 micro meters.

The stretched films prepared by the above mentioned process may be used in various applications, desirably used as a polarizer film or a retarder film, from the viewpoint of their features such that their orientation axes are inclined relative to the longitudinal direction. In particular, any polarizer films having the orientation axis inclined at 40 to 50 degrees relative to the longitudinal direction are preferably used as a polarizer plate for LCD. More preferable angle of inclination falls within a range from 44 to 46 degrees.

When the above-described process is applied to fabrication of the polarizer film, PVA film is preferably used as the polymer film. While PVA is generally obtained by saponifying poly(vinyl acetate), the PVA may also contain any component co-polymerizable with vinyl acetate, such as unsaturated carboxylic acid, unsaturated sulfonic acid, olefins and vinyl ethers. It is also allowable to use modified PVA containing acetoacetyl group, sulfonic acid group, carboxyl group, oxyalkylene group and the like.

While there are no special limitations on the degree of saponification of PVA, it is preferably adjusted within a range from 80 to 100 mol % in view of solubility and so forth, and more preferably from 90 to 100 mol %. While there are no special limitations also on the degree of polymerization of PVA, it is preferably adjusted within a range from 1,000 to 10,000, and more preferably 1,500 to 5,000.

By dyeing the PVA film, the polarizer film may be prepared and the dyeing process may be proceeded by adsorption from vapor phase or liquid phase. In one exemplary process for the liquid phase adsorption using iodine, the absorption is carried out by immersing a PVA film into an aqueous iodine-potassium iodide solution. Contents of iodine and potassium iodide are preferably 0.1 to 20 g/L and 1 to 100 g/L, respectively, and a weight ratio of iodine and potassium iodide preferably falls within a range from 1 to 100. Time for the dyeing is preferably 30 to 5,000 seconds, and the solution temperature is preferably within a range from 5 to 50° C. The dyeing method is not only limited to immersion, but allows arbitrary means such as coating or spraying of iodine or a dye solution. The dyeing process may precede or follow the stretching process, where the dyeing before the stretching is particularly advantageous because the film is appropriately swollen and to thereby facilitate the stretching. Besides iodine, it is also preferable to use dichroic dyes for the dyeing. Specific examples of the dichroic dyes include dye compounds such as azo dyes, stilbene dyes, pyrazolone dyes, triphenylmethane dyes, quinoline dyes, oxazine dyes, thiazine dyes and anthraquinone dyes. Although those soluble in water are preferable, not limitative thereto. It is also preferable that these dichroic dyes have introduced therein a hydrophilic substitutive group such as sulfonic acid group, amino group and hydroxyl group. Specific examples of the dichroic dyes include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, C.I. Acid Red 37, and those described in Japanese Laid-Open Patent Publication Nos. 1-161202, 1-172906, 1-172907, 1-183602, 1-248105, 1-265205 and 7-261024. These dichroic molecules are used in a form of free acid, alkali metal salt, ammonium salt or salts of amines. Mixing of two or more of these dichroic molecules successfully produces polarizers having various hues. Compounds (dyes) or mixtures of various dichroic molecules designed to exhibit black color when contained in polarizer elements or polarizer plates and when the transparent axes thereof are crossed normal to with each other are preferable, because they are excellent in single-plate transmissivity and in polarization ratio.

In the stretching of PVA for fabricating the polarizer film, it is preferable to add an additive for crosslinking to PVA. In particular for the case where the oblique stretching process of the present invention is adopted, direction of orientation of PVA may be misaligned due to tension in the process unless the PVA film is sufficiently cured at the exit of the stretching process, so that it is preferable to allow the crosslinking agent to be contained in the PVA film by immersion or coating of a solution of such crosslinking agent before or during the stretching process. The crosslinking agents disclosed in the U.S. Reissue Pat. No. 232897 are available for the present invention, where boric acids are most preferably used.

The above-mentioned stretching process is also desirably applicable to fabrication of so-called polyvinylene-base polarizer film, where polarizing function of which is ascribable to conjugated double bonds in the poly-ene structure obtained by dehydrating and dechlorinating PVA and poly (vinyl chloride).

The polarizer film fabricated by the above-mentioned oblique stretching process can be configured without any modification as a polarizer plate and used as the retarder of the present invention, but it is more preferably used as the polarizer plate after being bonded with a protective film on one side or both sides thereof. There are no specific limitations on the species of the protective film, and available examples thereof include cellulose esters such as cellulose acetate, cellulose acetate butylate and cellulose propionate; polycarbonate; polyolefin; polystyrene; and polyester. Retardation value of the protective film exceeding a certain value is, however, not desirable since oblique misalignment between the transparent axis and the orientation axis of the protective film results in conversion of linear polarization into circular polarization. The retardation value of the protective film is preferably small, which is typified by 10 nm or less at 632.8 nm, and more preferably 5 nm or less. Cellulose triacetate is particularly preferable as a polymer for composing the protective film having such a low level of retardation value. Polyolefins such as ZEONEX and ZEONOR (trade names, products of ZEON Corporation, JAPAN), and ARTON (trade name, product of JSR Corporation, JAPAN). Other available examples thereof include non-birefringent optical resin materials described in Japanese Laid-Open Patent Publication Nos. 8-110402 and 11-293116.

Although an adhesive possibly used between the polarizer film and the protective layer is not specifically limited, PVA resins (including PVAs modified with acetoacetyl group, sulfonic acid group, carboxyl group, oxyalkylene group, etc.) and aqueous boron compound solution are available, and among others, the PVA resins are preferable. Thickness of a dried layer of the adhesive preferably falls within a range from 0.01 to 10 micro meters, and more preferably 0.05 to 5 micro meters.

Figure 9:
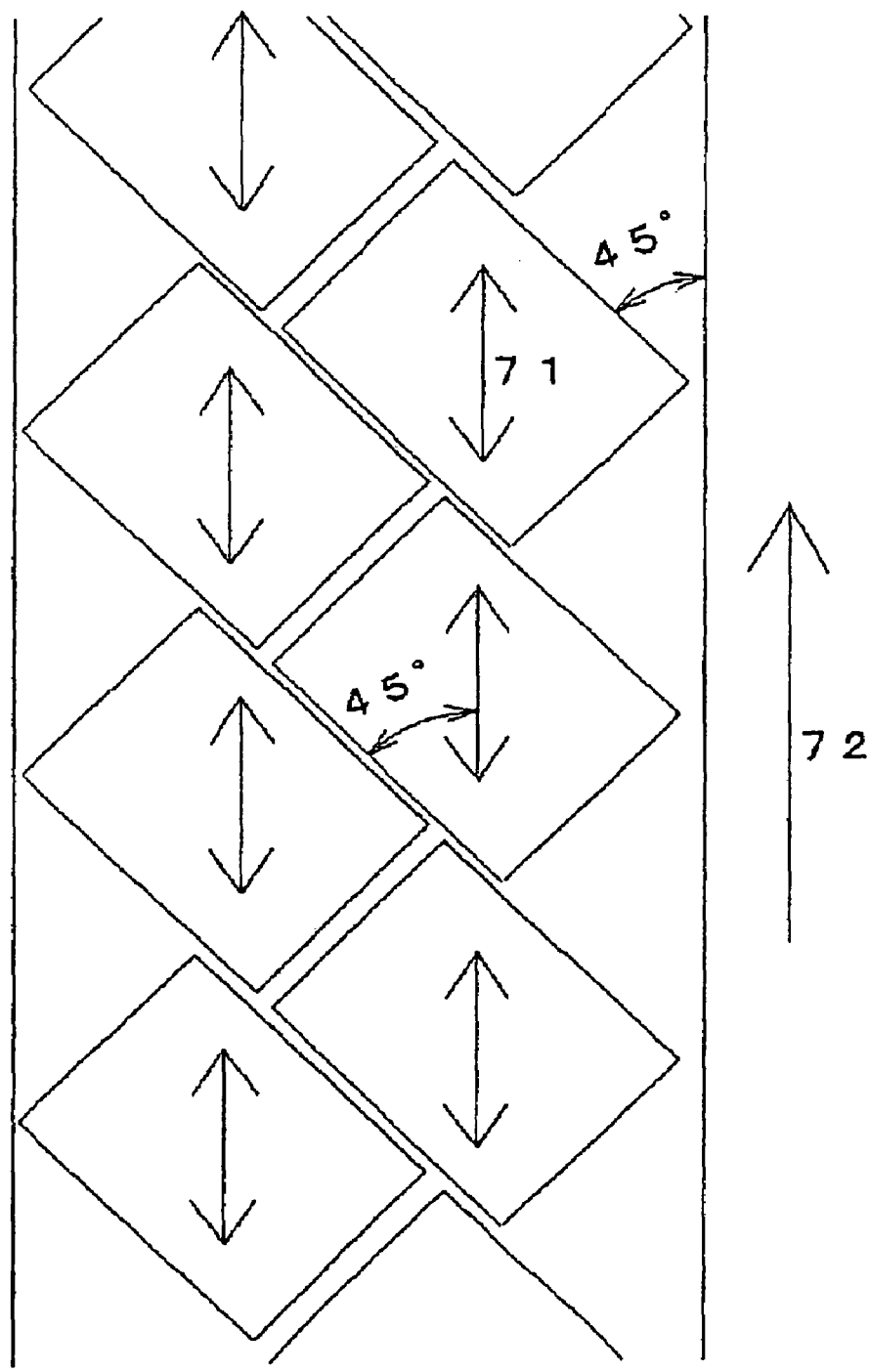
FIG. 9 is a schematic plan view showing an exemplary punching process for producing conventional polarizer plates.
Figure 10:
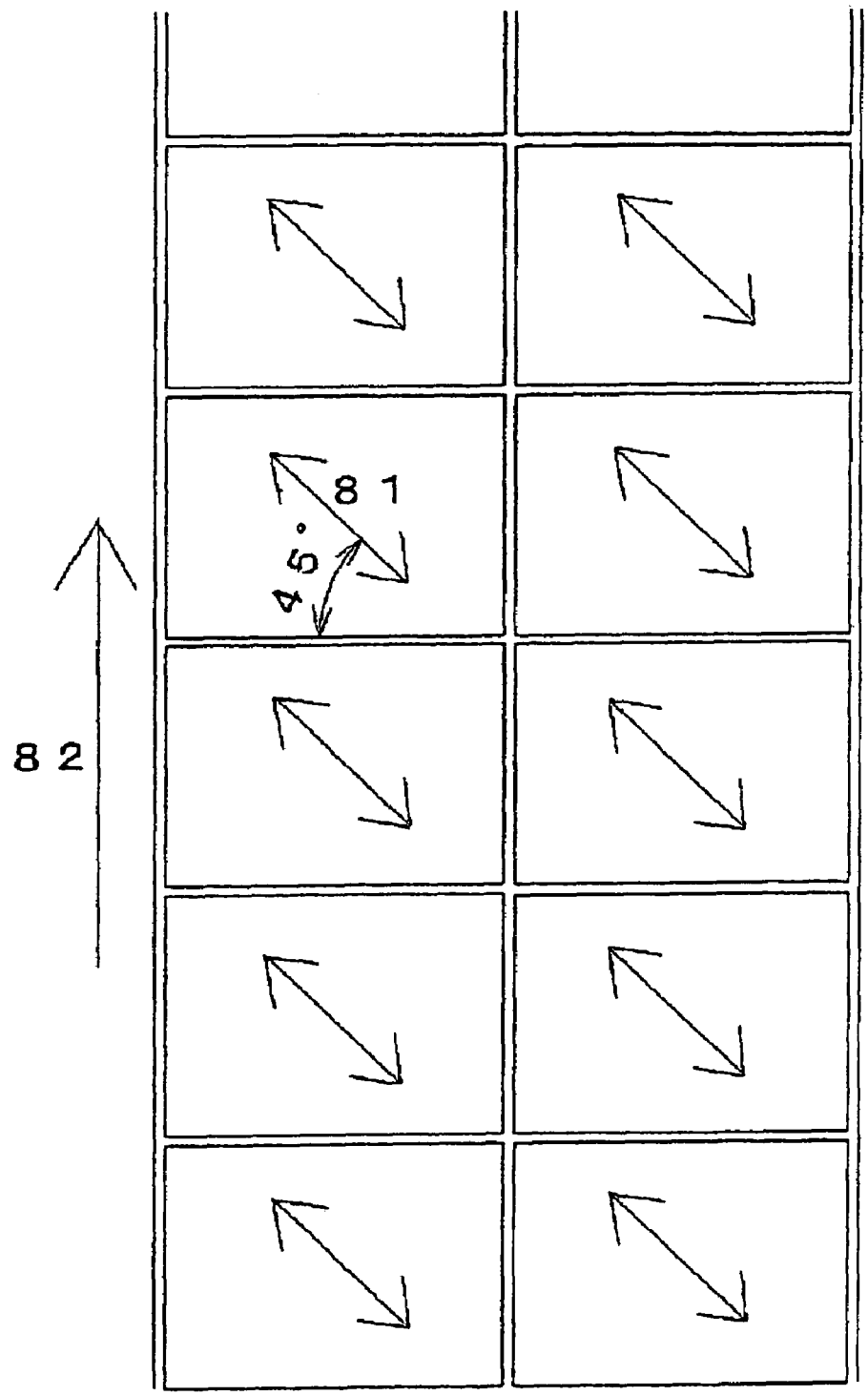
FIG. 10 is a schematic plan view showing an exemplary punching process for producing 45 degrees polarizer plates for use in the present invention.

An exemplary conventional punching pattern of the polarizer plates, and an exemplary inventive punching pattern of the polarizer plates are shown in FIGS. 9 and 10, respectively. The conventional polarizing plates have, as shown in FIG. 9, an absorption axis 71, that is the stretching axis, parallel to the longitudinal direction 72. On the other hand, the polarizer plates of the present invention have, as shown in FIG. 10, an absorption axis 81 of polarization, that is the stretching axis, inclined at 45 degrees relative to the longitudinal direction 82. Thus, it is not necessary to obliquely punch out the film in the punching process. This is also advantageous in that, as is obvious from FIG. 10, the polarizer plates can be produced by slitting along the longitudinal direction, rather than by punching, because the cutting line for producing the polarizer plates prepared by the above mentioned process straightly extends along the longitudinal direction, and this ensures excellence in the productivity.

The linear polarizer plate used in the present invention preferably has a large transmissivity and a large degree of polarization in view of raising contrast of the liquid-crystal display device. The transmissivity is preferably 30% or more at 550 nm, and more preferably 40% or more. The degree of polarization is preferably 95.0% or more at 550 nm, more preferably 99% or more, and still more preferably 99.9% or more. The linear polarizer film generally has protective films on both surfaces thereof. In the present invention, the retarder of the present invention can be functioned as the protective film on one side of the linear polarizer film. For the case where the circular polarizer plate is fabricated using the 45° polarizer film, right and left circular polarizer plates can readily be fabricated in a selective manner by changing the way of stacking.

[Configuration of Circular Polarizer Plate]

Figure 11:
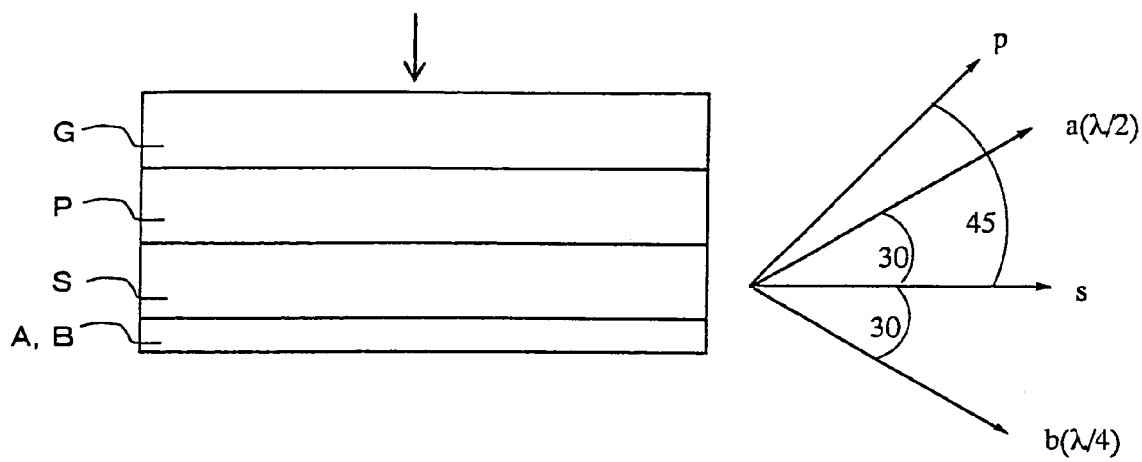
FIG. 11 is a schematic sectional view showing an exemplary layer constitution of the circular polarizer plate of the present invention.

FIG. 11 shows a conceptual drawing of one embodiment of the circular polarizer plate of the present invention.

The circular polarizer plate shown in FIG. 11 is configured so as to stack a 45° polarizer film P and a protective film G on the retarder of the present invention. The retarder comprises an optically anisotropic layers A and B (shown as a single layer in FIG. 11), and a transparent substrate S. The retarder is stacked with the 45° polarizer film P, so that the surface opposite to that having the optically anisotropic layers A and B formed thereon is towards the 45° polarizer film P. In this configuration, the retarder also functions as a protective film for the 45° polarizer film P. FIG. 11 also shows interrelations among the longitudinal direction s of the transparent substrate S, the slow axes a and b of the optically anisotropic layers A and B, and the transparent axis p of the 45° polarizer film P.

In incorporation of the circular polarizer plate shown in FIG. 11 into display devices, the protective film P side is directed to the display surface side (an arrow in the drawing indicates the direction of viewing). Circular polarization obtained by the configuration shown in FIG. 11 is a right circular polarized light. Light comes from the direction indicated by the arrow in FIG. 11 sequentially passes through the polarizer film P and optically anisotropic layers A and B, and goes out as a right circular polarized light.

Figure 12:
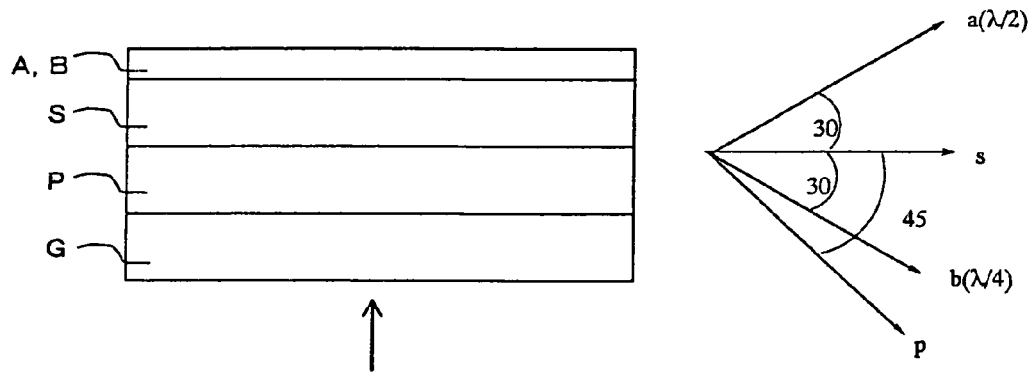
FIG. 12 is a schematic sectional view showing another exemplary layer constitution of the circular polarizer plate of the present invention.

Another exemplary constitution of the circular polarizer plate of the present invention is shown in FIG. 12. The circular polarizer plate shown in FIG. 12 has a configuration in which positions of the protective film G and retarder previously shown in FIG. 11 were exchanged, where protective film G, 45° polarizer film P, transparent substrate S and optically anisotropic layers A and B are stacked in this order. The configured circular polarizer plate can generate a left circular polarized light.

As is obvious from the above, a right circular polarized light and left circular polarized light can selectively be obtained only by changing the top and bottom of the stacking when the protective film G and retarder are bonded to the 45° polarizer film P.

For the case where the protective film is used besides the transparent substrate, the protective film is preferably composed of a cellulose ester film having a high optical isotropy, where triacetyl cellulose film is particularly preferable.

In the present specification, the term of "broadband quarter wave plate" is used for any quarter wave plate having values of {(retardation value/(wavelength)} measured at 450 nm, 550 nm and 650 nm fall within a range from 0.2 to 0.3. The value of retardation value/wavelength is preferably within a range from 0.21 to 0.29, more preferably 0.22 to 0.28, still more preferably 0.23 to 0.27, and most preferably from 0.24 to 0.26.

EXAMPLES

The following paragraphs will further detail the present invention referring to specific examples. Any materials, reagents, ratio of use and operations may properly be modified without departing form the spirit of the present invention. It is therefore be understood that the scope of the present invention is by no means limited by the Examples below.

Example 1

An optically-isotropic triacetyl cellulose, which has an acetylation degree of 60.9%, film in the form of 80 micro meters in thickness, 680 mm in width and 500 m in length was used as a transparent substrate. Both surfaces of the transparent substrate were saponified. A coating solution having a composition described below for an alignment layer (a polymer of the structural formula shown below) was continuously applied to the surface of the transparent substrate and dried to form a layer having a thickness of 1 micro meter. The, a rubbing treatment was continuously performed to a surface of the layer in a direction at +30 degrees relative to the longitudinal direction of the transparent substrate to form an alignment layer.

Composition of coating solution for alignment layer   10 weight parts
Modified polyvinyl alcohol below

——(CH$_2$——CH)$_{87.8}$——
            |
            OH

——(CH$_2$——CH)$_{0.2}$——
            |
            O
            |
            CO
            |
           [benzene ring]
            |
            O——(CH$_2$)$_4$——O——CO——CH=CH$_2$

——(CH$_2$——CH)$_{12.0}$——
            |
            O——CO——CH$_3$

| | |
|---|---|
| Water | 371 weight parts |
| Methanol | 119 weight parts |
| Glutaraldehyde | 0.5 weight parts |

A coating solution of the composition below was continuously applied to the rubbed surface of the alignment layer with a bar coater, dried, heated (matured in alignment) and further irradiated with UV rays to form an optically anisotropic layer (A), in other words a first optically anisotropic layer, having a thickness of 2.0 micro meters. The optically anisotropic layer (A) had a slow axis in a direction at +30 degrees relative to the longitudinal direction of the transparent substrate. The retardation value at 550 nm was 265 nm.

| Composition of the coating solution for the optically anisotropic layer (A) | |
|---|---|
| Rod-like liquid-crystal compound No. I-2 denoted by the Formula (I) | 38.1 wt % |
| Sensitizer (1) below | 0.38 wt % |

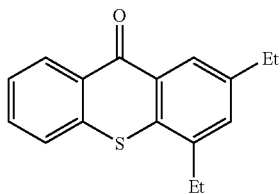

| | |
|---|---|
| Photo-polymerization initiator (1) below | 1.14 wt % |

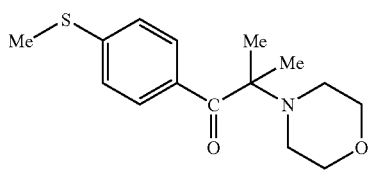

| | |
|---|---|
| Additive (1) below | 0.38 wt % |

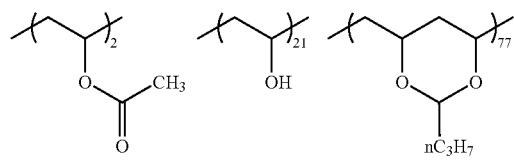

| | |
|---|---|
| Glutaraldehyde | 0.04 wt % |
| Methyl ethyl ketone | 60.00 wt % |

A rubbing treatment was continuously performed to a surface of the layer (A) in a direction at 60 degrees relative to the slow axis of the layer (A) and at −30 degrees relative to longitudinal direction of the transparent substrate. A coating solution of the composition below was continuously applied to the rubbed surface of the layer (A) with a bar coater, and dried and heated (matured in alignment), and further irradiated with UV rays to form an optically anisotropic layer (B) having a thickness of 1.0 micro meters. The retardation value at 550 nm was 135 nm.

| Composition of the coating solution for the optically anisotropic layer (B) | |
|---|---|
| The rod-like liquid-crystal compound No. I-2 denoted by the Formula (I) | 38.4 wt % |
| The sensitizer (1) | 0.38 wt % |
| The photo-polymerization initiator (1) | 1.15 wt % |
| Compound No. V-(27) denoted by the Formula (V) | 0.06 wt % |
| Methyl ethyl ketone | 60.0 wt % |

Example 2

The retarder was prepared in the same manner as Example 1 except that a rod-like liquid-crystal compound No. I-4 was used for preparing the optically anisotropic layers (A) and (B) in the place of the rod-like liquid-crystal compound No. I-2. The resultant optically anisotropic layer (A) was found to have an average retardation value at 550 nm of 251 nm, and the resultant optically anisotropic layer (B) was found to have an average retardation value at 550 nm of 135 nm.

Example 3

The retarder was prepared in the same manner as Example 1 except that a rod-like liquid-crystal compound No. I-15 was used for forming the optically anisotropic layers (A) and (B) in the place of the rod-like liquid-crystal compound No. I-2. The resultant optically anisotropic layer (A) was found to have an average retardation value at 550 nm of 250 nm, and the resultant optically anisotropic layer (B) was found to have an average retardation value at 550 nm of 135 nm.

Comparative Example 1

A trail of fabricating a retarder by replacing the rod-like liquid-crystal compound No. I-2 used for preparing the optically anisotropic layers (A) and (B) in Example 1 with a comparative rod-like liquid-crystal compound (1) shown below resulted in failure, since insoluble matter was generated in the coating solutions. The composition of the coating solutions was then altered as shown below, and except for this alteration, the retarder was fabricated similarly to as described in Example 1 or 2.

| Composition of Coating Solution for Optically anisotropic Layer (A) | |
|---|---|
| Comparative rod-like liquid-crystal compound (1) | 14.5 wt % |

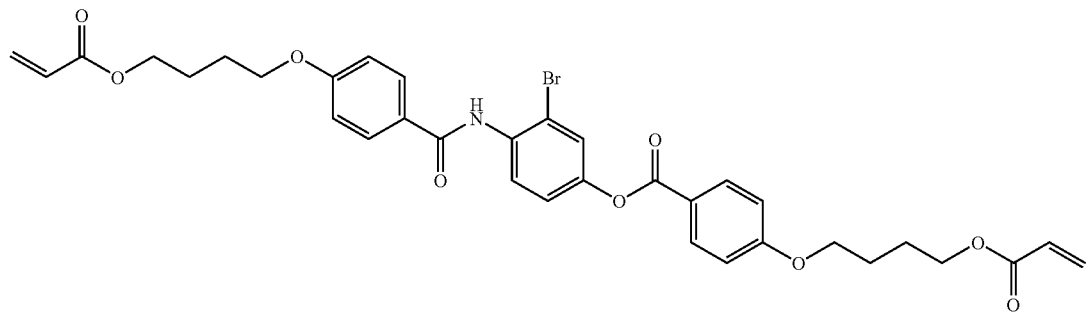

| | |
|---|---|
| The sensitizer (1) | 0.14 wt % |
| The photo-polymerization initiator (1) | 0.43 wt % |
| The additive (1) | 0.14 wt % |
| Glutaraldehyde | 0.02 wt % |
| Methyl ethyl ketone | 84.8 wt % |
| Composition of Coating Solution for Optically anisotropic Layer (B) | |
| The comparative rod-like liquid-crystal compound (1) | 14.5 wt % |
| The sensitizer (1) | 0.14 wt % |
| The photo-polymerization initiator (1) | 0.43 wt % |
| The compound V-(27) denoted by the Formula (V) | 0.02 wt % |
| Methyl ethyl ketone | 84.8 wt % |

Example 4

A PVA film was immersed in an aqueous solution containing 2.0 g/L iodine and 4.0 g/L potassium at 25 degrees Celsius for 240 seconds and subsequently in an aqueous solution of 10 g/L boric acid at 25 degrees Celsius for 60 seconds. The PVA film was introduced into a tenter stretcher same as that shown in FIG. 4 and stretched by 5.3 times. While the tenter was bent far from the stretching direction in the same manner as shown FIG. 4 and the tenter width was kept constant, the PVA film was dried in an atmosphere of 80 degrees Celsius, contracted and put out of the tenter. The PVA film contained 31% moisture before stretching and 1.5% after drying respectively.

The difference in traveling speed between the left and an right tenter clips was less than 0.05%; and an angle between the center line of the PVA film to be introduced into the stretcher and the center line of the PVA film to be sent to a next step was 46°. The used tenter stretcher had |L1–L2| of 0.7 m and W of 0.7 m, that is, satisfying a relation of |L1–L2 |=W. "Ax–Cx", at the exit of the tenter stretcher is inclined at 45 relative to the center line 22 of the PVA film to be sent to a next step. Neither winkle nor deformation of the PVA film was found at the exit of the tenter stretcher.

A commercially available cellulose acetate film ("FUJI-TAC" whose retardation was 3.0 nm, FUJI PHOTO FILM Co., LTD.) was subjected to saponification treatment, and then the film was laminated on the surface of the obtained stretched PVA film with an aqueous solution of 3% PVA (PVA-117H, KRARAY CO., LTD.) as an adhesive, and dried at 80 degrees Celsius. Then, a linear polarizer plate having a working width of 650 mm was obtained.

The obtained linear polarizer plate had an absorption axis in a direction inclined at 45 degrees relative to the longitudinal direction. The polarizer plate had a transmittance of 43.7% and a polarization degree of 99.97%. The polarizer plate was cut into a piece having a dimension of 310 mm×233 mm in the same manner as that shown in FIG. 10. Thus, the polarizer plate having the dimension and an absorption axis in a direction inclined at 45 degrees relative to the side at an area efficiency of 91.5%.

Figure 13:
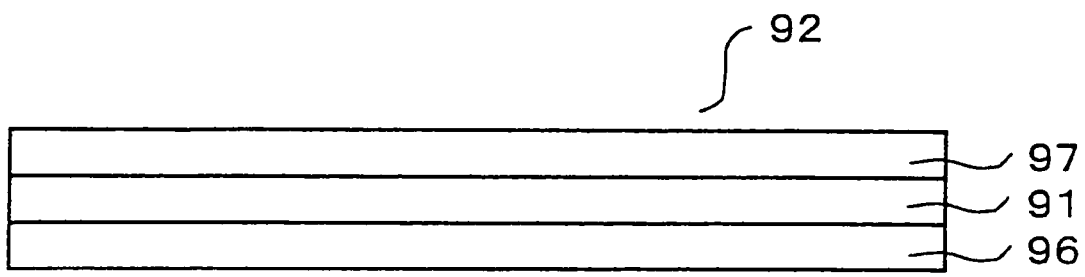
FIG. 13 is a schematic sectional view showing an exemplary layer constitution of the circular polarizer plate fabricated in Example 4.

Next, as shown in FIG. 13, a circular polarizer plate 92 was prepared by laminating the retarder 96 prepared in Example 1 on one surface of the iodine-based linear polarizer film 91 prepared in the above, and by laminating on the opposite surface a saponified antidazzle antireflective film 97. Still other polarizer plates 93 to 95 were similarly prepared except that the retarders prepared in Examples 2, 3 and Comparative Example 1 were used respectively in place of the retarder 96 respectively. In all process for preparing these circular polarizer plates, the linear polarizer film and retarder were laminated so as to conform the longitudinal directions each other.

Each of thus obtained circular polarizer plates 92 to 95 was irradiated with light (450 nm, 550 nm and 650 nm) from the antidazzle antireflective film 97 side, and phase difference (retardation value: Re) of the transmitted light was measured at arbitrary 20 points which fall within an area of 650 mm wide and 1,000 mm long, and the ranges of variation were expressed by the maximum values and minimum values. The retarder before being incorporated in the circular polarizer plate was also observed under a polarizing microscope (×100), and number of alignment defects (average of results from 10 visual fields) were counted. Results were summarized in the table below.

TABLE 1

| Circular polarizer plate No. | Retarder used | Re (450 nm) | Re (550 nm) | Re (650 nm) | Number of Defects |
|---|---|---|---|---|---|
| 92 | Example 1 | 110-113 nm | 133-137 nm | 142-146 nm | 1 |
| 93 | Example 2 | 109-114 nm | 132-138 nm | 141-147 nm | 2 |
| 94 | Example 3 | 110-114 nm | 133-137 nm | 141-147 nm | 1 |
| 95 | Comparative Example 1 | 104-118 nm | 127-143 nm | 136-152 nm | 10 or more |
| | Ideal value | 112.5 nm | 137.5 nm | 157.5 nm | 0 |

As shown in Table 1, according to the present invention, it is successful in preparing circular polarizer plates less in in-plane variation, less in defects, and excellent in stability.

Example 5
(Preparation of Reflective-Type, Liquid-Crystal Display Device)

A polarizer plate and a retarder were removed from a commercial reflective-type, liquid-crystal display device ("Color Zaurus", product of SHARP Corporation, Japan), and the circular polarizer plate 92 to 95 were respectively attached instead.

Evaluated by visual obeservation, it was found that all of these circular polarizer plates 92 to 95 resulted in neutral gray display in either of white display, black display and half tone display, without developing color.

Next, contrast ratio based on reflective luminance was measured using a viewing angle measuring instrument (EZcontrast160D, product of Eldim SA, France). The contrast ratios measured at the front face through the circular polarizer plates comprising the retarders fabricated in Examples 2, 3 and 4 were found to be 10, 9 and 10, respectively, which were practical enough. On the other hand, contrast ratio measured at the front face through the circular polarizer comprising the retarder fabricated in Comparative Example 1 was found to show a large in-plane variation ranging from 6 to 10.

INDUSTRIAL AVAILABILITY

According to the present invention, it is made possible to provide a retarder and a circular polarizer capable of functioning in a broad band, that is, in the visible light wave length region, of contributing to thinning and of contributing to reduction of planar defects occurring as a side effect with widening bandwidth. It is also possible to provide a circular polarizer readily producible by roll-to-roll laminating of the retarder with a polarizer film. And it is also possible to provide a circular polarizer contributing to improvement in image quality of the displayed images when applied to any image display devices.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A retarder comprising:
a substrate, and on or above the substrate
a first optically anisotropic layer formed of a composition comprising a rod-like liquid-crystal compound, in which the rod-like molecules are aligned homogeneously, and substantially generating a phase difference of π at 550 nm, and
a second optically anisotropic layer formed of a composition comprising a rod-like liquid-crystal compound, in which the rod-like molecules are aligned homogeneously, and substantially generating a phase difference of π/2 at 550 nm;
wherein at least one of the rod-like liquid-crystal compounds is denoted by Formula (I) below;

$$Q^1\text{-}L^1\text{-}A^1\text{-}L^3\text{-}M\text{-}L^4\text{-}A^2\text{-}L^2\text{-}Q^2 \quad \text{Formula (I)}$$

where, $Q^1$ and $Q^2$ respectively denote a polymerizable group; $L^1$, $L^2$, $L^3$ and $L^4$ respectively denote a single bond or a divalent linking group provided that at least either of $L^3$ and $L^4$ represents —O—CO—O—; $A^1$ and $A^2$ respectively denote C2-20 spacer group, and M denotes a mesogen group; and
an in-plane slow axis of the second optically anisotropic layer and an in-plane slow axis of the first optically anisotropic layer cross substantially at 60 degrees.

2. The retarder of claim 1, wherein M in the Formula (I) is a group denoted by Formula (II):

$$-(-W^1\text{-}L^5\text{-})_n\text{-}W^2 \quad \text{Formula (II)}$$

where, $W^1$ and $W^2$ respectively denote a divalent alicyclic group, divalent aromatic group or divalent heterocyclic group; $L^5$ denotes a single bond or a linking group; and n is 1, 2 or 3.

3. The retarder of claim 1, wherein the substrate has a longitudinal direction, the in-plane slow axis of the first optically anisotropic layer and the longitudinal direction of the transparent substrate cross substantially at +30 degrees; and the in-plane slow axis of the second optically anisotropic layer and the longitudinal direction of the transparent substrate cross substantially at −30 degrees.

4. The retarder of claim 3, wherein a rubbing axis for predetermining an orientation angle of the rod-like molecules in the first optically anisotropic layer and the longitudinal direction of the transparent substrate cross substantially at 30 degrees; and a rubbing axis for predetermining an orientation angle of the rod-like molecules in the second optically anisotropic layer and the longitudinal direction of the transparent substrate cross substantially at −30 degrees.

5. The retarder of claim 4, wherein a surface of the first optically anisotropic layer has the rubbing axis for predetermining an orientation angle of the rod-like molecules in the second optically anisotropic layer.

6. The retarder of claim 1, wherein at least one of the optically anisotropic layers comprises a compound denoted by Formula (V):

$$(\text{Hb-}L^2\text{-})_n B^1 \quad \text{Formula (V)}$$

where Hb denotes a C6-40 aliphatic group or oligosiloxanoxy group having a C4-40 aliphatic group; $L^2$ represents a divalent linking group selected from the group consisting of —O—, —S—, —CO—, —NR⁵—, —SO₂—, an alkylene group, alkenylene group, arylene group and any combinations thereof; $R^5$ represents a hydrogen atom or a C1-6 alkyl group; n represents an integer from 2 to 12; and $B^1$ represents an n-valent group containing at least three cyclic structures, so that the rod-like molecules in the layer are aligned homogenously with a not greater than 10 degrees tilt angle relative to a layer plane.

7. The retarder of claim 6, wherein $B^{51}$ is an n-valent group denoted by Formula (V-a);

$$(\text{-Cy}^{51}\text{-}L^{53}\text{-})_n \text{Cy}^{52} \quad \text{Formula (V-a)}$$

where $Cy^{51}$ is a divalent cyclic group; $L^{53}$ is a divalent linking group selected from the group consisting of a single bond, -alkylene-, -alkenylene-, -alkynylene-, —O—, —S—, —CO—, —NR—, —SO₂— and any combinations thereof; $Cy^{52}$ is an n-valent cyclic group; and n is an integer from 2 to 12.

8. A circular polarizer comprising:
a linear polarizer film having a transparent axis substantially inclined at +45 degrees or −45 degrees relative to a longitudinal direction thereof,
a substrate having a longitudinal direction,
a first optically anisotropic layer formed of a composition comprising a rod-like liquid-crystal compound, in which the rod-like molecules are aligned homogeneously, and substantially generating a phase difference of n at 550 nm, and
a second optically anisotropic layer formed of a composition comprising a rod-like liquid-crystal compound, in which the rod-like molecules are aligned homogeneously, and substantially generating a phase difference of π/2 at 550 nm;

wherein at least one of the rod-like liquid-crystal compounds is denoted by Formula (I) below;

$Q^1\text{-}L^1\text{-}A^1\text{-}L^3\text{-}M\text{-}L^4\text{-}A^2\text{-}L^2\text{-}Q^2$                          Formula (I)

where, $Q^1$ and $Q^2$ respectively denote a polymerizable group; $L^1$, $L^2$, $L^3$ and $L^4$ respectively denote a single bond or a divalent linking group provided that at least either of $L^3$ and $L^4$ represents —O—CO—O—; $A^1$ and $A^2$ respectively denote a C2-20 spacer group, and M denotes a mesogen group;

the transparent axis of the linear polarizer film and the longitudinal direction of the substrate cross substantially at +45 degrees or −45 degrees; and an in-plane slow axis of the second optically anisotropic layer and an in-plane slow axis of the first optically anisotropic layer cross substantially at 60 degrees.

9. The circular polarizer of claim 8, wherein M in the Formula (I) is a group denoted by denotes is denoted by Formula (II):

—(—$W^1$-$L^5$)$_n$-$W^2$—                          Formula (II)

where, $W^1$ and $W^2$ respectively denote a divalent alicyclic group, divalent aromatic group or divalent heterocyclic group; $L^5$ denotes a single bond or a linking group; and n is 1, 2 or 3.

10. The circular polarizer of claim 8, wherein the in-plane slow axis of the first optically anisotropic layer and a longitudinal direction of the substrate cross substantially at +30 degrees; and the in-plane slow axis of the second optically anisotropic layer and the longitudinal direction of the substrate cross substantially at −30 degrees.

11. The circular polarizer of claim 8, wherein a rubbing axis for predetermining an orientation angle of the rod-like molecules in the first optically anisotropic layer and the longitudinal direction of the substrate cross substantially at +30 degrees; and a rubbing axis for predetermining an orientation angle of the rod-like molecules in the second optically anisotropic layer and the longitudinal direction of the substrate cross substantially at −30 degrees.

12. The circular polarizer of claim 11, wherein a surface of the first optically anisotropic layer has the rubbing axis for predetermining an orientation angle of the rod-like molecules in the second optically anisotropic layer.

13. The retarder of claim 8, wherein at least one of the optically anisotropic layers comprises a compound denoted by Formula (V):

(Hb-$L^2$-)$_n$$B^1$                          Formula (V)

where Hb denotes a C6-40 aliphatic group or oligosiloxanoxy group having a C4-40 aliphatic group; $L^2$ represents a divalent linking group selected from the group consisting of —O—, —S—, —CO—, —$NR^5$—, —$SO_2$—, an alkylene group, alkenylene group, arylene group and any combinations thereof; $R^5$ represents a hydrogen atom or a C1-6 alkyl group; n represents an integer from 2 to 12; and $B^1$ represents an n-valent group containing at least three cyclic structures, so that the rod-like molecules in the layer are tilted at not greater than 10 degrees relative to a layer plane.

14. The circular polarizer of claim 13, wherein $B^{51}$ is an n-valent group denoted by Formula (V-a);

(-$Cy^{51}$-$L^{53}$-)$_n$$Cy^{52}$                          Formula (V-a)

where $Cy^{51}$ is a divalent cyclic group; $L^{53}$ is a divalent linking group selected from the group consisting of a single bond, -alkylene-, -alkenylene-, -alkynylene-, —O—, —S—, —CO—, —NR—, —$SO_2$— and any combinations thereof; $Cy^{52}$ is an n-valent cyclic group; and n is an integer from 2 to 12.

* * * * *